US012046068B2

(12) United States Patent
Alberry et al.

(10) Patent No.: US 12,046,068 B2
(45) Date of Patent: Jul. 23, 2024

(54) METHOD AND SYSTEM FOR DISPLAYING ROUTING DIAGRAM WITH HIGHLIGHTED ROUTABLE COMPONENTS

(71) Applicant: Snap-on Incorporated, Kenosha, WI (US)

(72) Inventors: Michel B. Alberry, Lakeside, CA (US); Lester B. Johnson, Escondido, CA (US); Michael S. Knize, Oceanside, CA (US); John P. McGraw, Cardiff by the Sea, CA (US); Robert Pilz, Santee, CA (US); Thomas A. Southward, San Diego, CA (US); Thomas W. Tipps, San Diego, CA (US); Eric J. Wade, El Cajon, CA (US); Patrick S. Merg, Hollister, CA (US); Roy Steven Brozovich, Campbell, CA (US); Todd Mercer, Descanso, CA (US)

(73) Assignee: Snap-on Incorporated, Kenosha, WI (US)

( * ) Notice: Subject to any disclaimer, the term of this patent is extended or adjusted under 35 U.S.C. 154(b) by 1017 days.

(21) Appl. No.: 16/460,736

(22) Filed: Jul. 2, 2019

(65) Prior Publication Data
US 2021/0004585 A1 Jan. 7, 2021

(51) Int. Cl.
*G06V 30/00* (2022.01)
*G06V 30/422* (2022.01)

(52) U.S. Cl.
CPC .................................. *G06V 30/422* (2022.01)

(58) Field of Classification Search
CPC ................................................... G06V 30/422
See application file for complete search history.

(56) References Cited

U.S. PATENT DOCUMENTS 5,831,618 A 11/1998 Fuji et al.
6,606,731 B1 * 8/2003 Baum .................. G06V 30/422
716/139

(Continued)

FOREIGN PATENT DOCUMENTS

| EP | 187860 A2 | 12/2007 |
| EP | 1868146 A1 | 12/2007 |
| EP | 1870860 A2 | 12/2007 |

OTHER PUBLICATIONS

Quadcept, "Schematic Capture: Placing Labels", p. 1-6, Jul. 27, 2017 https://web.archive.org/web/20170727233759/https://www.quadcept.com/en/manual/schematic/post-100.*
Jdonbavand, "Microsoft Excel—setting same zoom level for several worksheets", Apr. 5, 2014, 1 page https://ifonlyidknownthat.wordpress.com/2014/04/05/microsoft-excel-setting-same-zoom-level-for-several-worksheets/.*

(Continued)

*Primary Examiner* — William L Bashore
*Assistant Examiner* — David Faber
(74) *Attorney, Agent, or Firm* — McDonnell Boehnen Hulbert & Berghoff LLP

(57) ABSTRACT

A method includes transmitting a request for a computer-readable routing diagram, such as a wiring diagram, a pneumatic or hydraulic line diagram, or an optical cable diagram. The method also includes receiving, in response to the request, a routing diagram including a connectable component and at least a portion of a routing set. The connectable component is associated with both a connectable component identifier and the routing set. The routing set contains one or more routable components, such as electrical circuits, pneumatic or hydraulic lines, or optical cables. Further, the method includes displaying, on a display, the routing diagram and at least the portion of the routing set highlighted. Displaying at least the portion of the routing set (Continued)

highlighted occurs in response to an occurrence of the connectable component being selected from the routing diagram displayed on the display or in response to the request including the connectable component identifier.

42 Claims, 26 Drawing Sheets

(56) References Cited

U.S. PATENT DOCUMENTS

| | | | | |
|---|---|---|---|---|
| 7,149,975 | B1 | 12/2006 | Johnson et al. | |
| 7,499,601 | B2* | 3/2009 | Nuno | G06Q 10/06 382/305 |
| 7,865,278 | B2 | 1/2011 | Underdal et al. | |
| 8,924,913 | B1* | 12/2014 | Goh | G06F 30/30 716/139 |
| 9,881,119 | B1* | 1/2018 | Kukal | G06F 30/367 |
| 11,210,434 | B2* | 12/2021 | Wolfe | G06F 3/04815 |
| 2003/0025734 | A1* | 2/2003 | Boose | G06T 11/60 715/765 |
| 2004/0243944 | A1* | 12/2004 | Sabiers | G06F 9/451 715/854 |
| 2006/0142910 | A1* | 6/2006 | Grier | G06Q 10/06 701/31.4 |
| 2006/0238036 | A1* | 10/2006 | Nagata | H05K 1/0266 307/147 |
| 2007/0208840 | A1 | 9/2007 | McConville et al. | |
| 2007/0271499 | A1* | 11/2007 | Feng | G06F 30/20 715/209 |
| 2007/0294002 | A1 | 12/2007 | Underdal et al. | |
| 2012/0179977 | A1 | 7/2012 | Rounding et al. | |
| 2013/0031509 | A1* | 1/2013 | Curtis | G06F 30/394 715/810 |
| 2014/0169217 | A1 | 6/2014 | Coroy et al. | |
| 2016/0012179 | A1* | 1/2016 | Zoukari | G06F 30/15 703/8 |
| 2017/0032071 | A1* | 2/2017 | Jummel | G06F 30/392 |
| 2017/0177757 | A1* | 6/2017 | Thorley | G06T 30/20 |
| 2018/0095638 | A1* | 4/2018 | Merg | G06F 3/04817 |
| 2019/0042684 | A1* | 2/2019 | Toub | G06F 30/327 |
| 2019/0108294 | A1* | 4/2019 | Anderson | G06F 30/30 |
| 2019/0114387 | A1* | 4/2019 | Wolfe | B64F 5/40 |
| 2019/0384885 | A1* | 12/2019 | Lau | G06F 30/398 |
| 2020/0184745 | A1* | 6/2020 | Merg | G07C 5/008 |

OTHER PUBLICATIONS

Microsoft Excel 2019 (copyrighted 2019)(Screenshots (SS0-7).*
Spataro, Jared, "Office 2019 is now available for Windows and Mac", Microsoft, Sep. 24, 2018, 5 pages.*
Adobe, "Adjusting PDF views", Jun. 2, 2018, 13 pages https://web.archive.org/web/20180602214401/https://helpx.adobe.com/acrobat/using/adjusting-pdf-views.html.*
World Wide Web Consortium (W3C); Scalable Vector Graphics (SVG) 2, W3C Candiate Recommendation Oct. 4, 2018, Chapter 8: Coordinate Systems, Transformations and Units; downloaded from the world wide web at https://www.w3.org/TR/SVG/coords.html#ViewBoxAttribute on Jun. 9, 2019, pp. 1-21.
Michael, Research as a Hobby; How to Display Additional Information by Clicking Image Components? Easy and for Free (WP, SVG); Oct. 18, 2018; pp. 1-10 (14 total pages).
Bracey, Kezz; SVG Viewport and viewBox (For Complete Beginners), Mar. 29, 2018; pp. 1-6 (11 total pages).
Wikipedia; Web Service; downloaded from the world wide web at https://en.wikipedia.org/wiki/Web_service on Jun. 19, 2019; pp. 1-3 (4 total pages).
Alldata diy.com; Access Factory Repair Information, Beyond the Printed Manual; downloaded from the world wide web at http://web.archive.org/web/20190402040954/http://www.alldaydatadiy.com/about_alldate/repair.html; archived Apr. 2, 2019; p. 1 (2 total pages).
ALLDATA LLC; All Data—OEM Automotive Mechanical Repair Information, Jumpstart your Shop's Success with ALLDATA Repair; downloaded from the world wide web at http://web.archive.org/web/20190208023756/https://www.alldata.com/alldata-repair; archived Feb. 8, 2019; pp. 1-2 (5 total pages).
W3SCHOOLS.COM; Svg Stroke Properties; downloaded from the world wide web at https://web.archive.org/ web/20190701234417/https://www.w3schools.com/graphics/svg_stroking.asp; Jul. 1, 2019; 4 pages.
World Wide Web Consortium (W3C); Scalable Vector Graphics (SVG) 2, W3C Candidate Recommendation published on Oct. 4, 2018, Chapter 8: Coordinate Systems, Transformations and Units; downloaded from the world wide web at https://www.w3.org/TR/SVG/coords.html#ViewBoxAttribute on Jun. 9, 2019, pp. 1-21.
Alldata Diy.Com; Access Factory Repair Information, Beyond the Printed Manual; downloaded from the world wide web at http://web.archive.org/web/20190402040954/http://www.alldaydatadiy.com/about_alldata/repair.html; archived Apr. 2, 2019; p. 1 (2 total pages).

* cited by examiner

FIG. 9

METHOD AND SYSTEM FOR DISPLAYING ROUTING DIAGRAM WITH HIGHLIGHTED ROUTABLE COMPONENTS

BACKGROUND

To assist repair personnel, technicians, or other individuals, some manufacturers or information suppliers produce wiring diagrams that show representations of electrical circuits (i.e., wires) and electrical components (connectable to the electrical circuits) of a serviceable device, such as a vehicle.

The level of complexity of a wiring diagram can vary for various reasons, such as the size of the diagram, the number of electrical components and/or wires shown on the diagram, and the proximity of the wires to one another on the diagram. As the complexity of a routable diagram increases, the ease of tracing a wire on the wiring diagram decreases.

Early on, a wiring diagram was printed on paper. In such cases, a person may have used a highlighter pen to permanently alter the wiring diagram printed on the paper by placing ink on the wiring diagram to trace a wire on the wiring diagram from a first location to a second location.

More recently, a wiring diagram has become available for display on a computing device display. In some cases, the computing device does not provide for highlighting a wire on the wiring diagram. In other cases, the computing device provides for highlighting a wire within a single wiring diagram, but does not provide for highlighting the wire beyond a single wiring diagram if that wire extends to one or more other wiring diagrams.

Furthermore, in some cases a wire on wiring diagram extends to a fuse, a splice, or an inline connector. In those cases, the wire has a respective segment on different sides of the fuse, splice, or inline connector. The computing device that provides for highlighting a wire on the wiring diagram requires selection of each respective segment of the wire to highlight those segments of the multi-segmented wire.

OVERVIEW

This description pertains to wiring diagram(s). More generally, this description pertains to routing diagram(s). A routing diagram can, but need not necessarily, be arranged as a wiring diagram, a pneumatic line diagram, a hydraulic line diagram, an optical cable diagram, or some other routing diagram that shows routable component(s) and/or connectable component(s). Routable and connectable components can include connectors that are connectable to one another. The connectors can, but need not necessarily, include connectors that are arranged as male/female connectors. The connectors can, but need not necessarily, be releasably connectable to each other via threads.

A routable component on a wiring diagram can include one or more wires (e.g., a 16 gauge copper wire coated with insulation or multiple wires within a wire harness) that extend from a first location to a second location for transporting an electrical current and/or establishing a voltage potential at a node. A component that is connectable to a wire is referred to as a connectable component. Examples of a connectable component on a wiring drawing include an electrical motor, a solenoid, a sensor, a battery, and a switch, among other examples.

A routable component on a pneumatic line diagram can include a pneumatic line (e.g., a hose or a metal tube) that extends from a first location to a second location for transporting one or more gases. The one or more gases can include air extracted from a local environment. A component that is connectable to a pneumatic line is referred to as a connectable component. Examples of a connectable component on a pneumatic line drawing include an air pump and an air compressor.

A routable component on a hydraulic line diagram can include a hydraulic line (e.g., a hose or a metal tube) that extends from a first location to a second location for transporting a liquid. The liquid can, but need not necessarily, include a transmission fluid and/or a liquid coolant. A component that is connectable to a hydraulic line is referred to as a connectable component. Examples of a connectable component on a hydraulic line drawing include a pump, a control valve, a filter, and a reservoir.

A routable component on an optical cable diagram can include an optical cable (e.g., a fiber optic cable) that extends from a first location to a second location for transporting optical signals. A component that is connectable to an optical cable is referred to as a connectable component. Examples of a connectable component on an optical cable drawing include a fiber optic sensor and a fiber optic repeater.

In a first implementation, a method is provided. The method includes transmitting a request for a computer-readable routing diagram. The method also includes receiving, in response to the request, a routing diagram including a first connectable component and at least a first portion of a first routing set. The first connectable component is associated with both a first connectable component identifier and the first routing set. The first routing set contains one or more routable components. Further, the method includes displaying the routing diagram on a display. Further still, the method includes displaying, on the display, at least the first portion of the first routing set highlighted. Displaying at least the first portion of the first routing set highlighted occurs in response to determining a first occurrence of the first connectable component being selected from the routing diagram displayed on the display or in response to the request including the first connectable component identifier.

In a second implementation, a computing system is provided. The computing system includes a processor and a non-transitory computer readable medium configured to store at least executable instructions. The executable instructions, when executed by the processor, cause the computing system to perform a set of functions. The set of functions include transmitting a request for a computer-readable routing diagram. The set of functions also include receiving, in response to the request, a routing diagram including a first connectable component and at least a first portion of a first routing set. The first connectable component is associated with both a first connectable component identifier and the first routing set. The first routing set contains one or more routable components. Further, the set of functions include displaying the routing diagram on a display. Further still, the set of functions include displaying, on the display, at least the first portion of the first routing set highlighted. Displaying at least the first portion of the first routing set highlighted occurs in response to determining a first occurrence of the first connectable component being selected from the routing diagram displayed on the display or in response to the request including the first connectable component identifier.

In a third implementation, a non-transitory computer-readable memory is provided. The non-transitory computer readable medium has stored therein instructions executable by one or more processors to cause a computing system to perform a set of functions. The set of functions include transmitting a request for a computer-readable routing diagram. The set of functions also include receiving, in response to the request, a routing diagram including a first connectable component and at least a first portion of a first routing set. The first connectable component is associated with both a first connectable component identifier and the first routing set. The first routing set contains one or more routable components. Further, the set of functions include displaying the routing diagram on a display. Further still, the set of functions include displaying, on the display, at least the first portion of the first routing set highlighted. Displaying at least the first portion of the first routing set highlighted occurs in response to determining a first occurrence of the first connectable component being selected from the routing diagram displayed on the display or in response to the request including the first connectable component identifier.

Other implementations will become apparent to those of ordinary skill in the art by reading the following detailed description, with reference where appropriate to the accompanying drawings.

BRIEF DESCRIPTION OF THE DRAWINGS

Example implementations are described herein with reference to the drawings.

Figure 9:
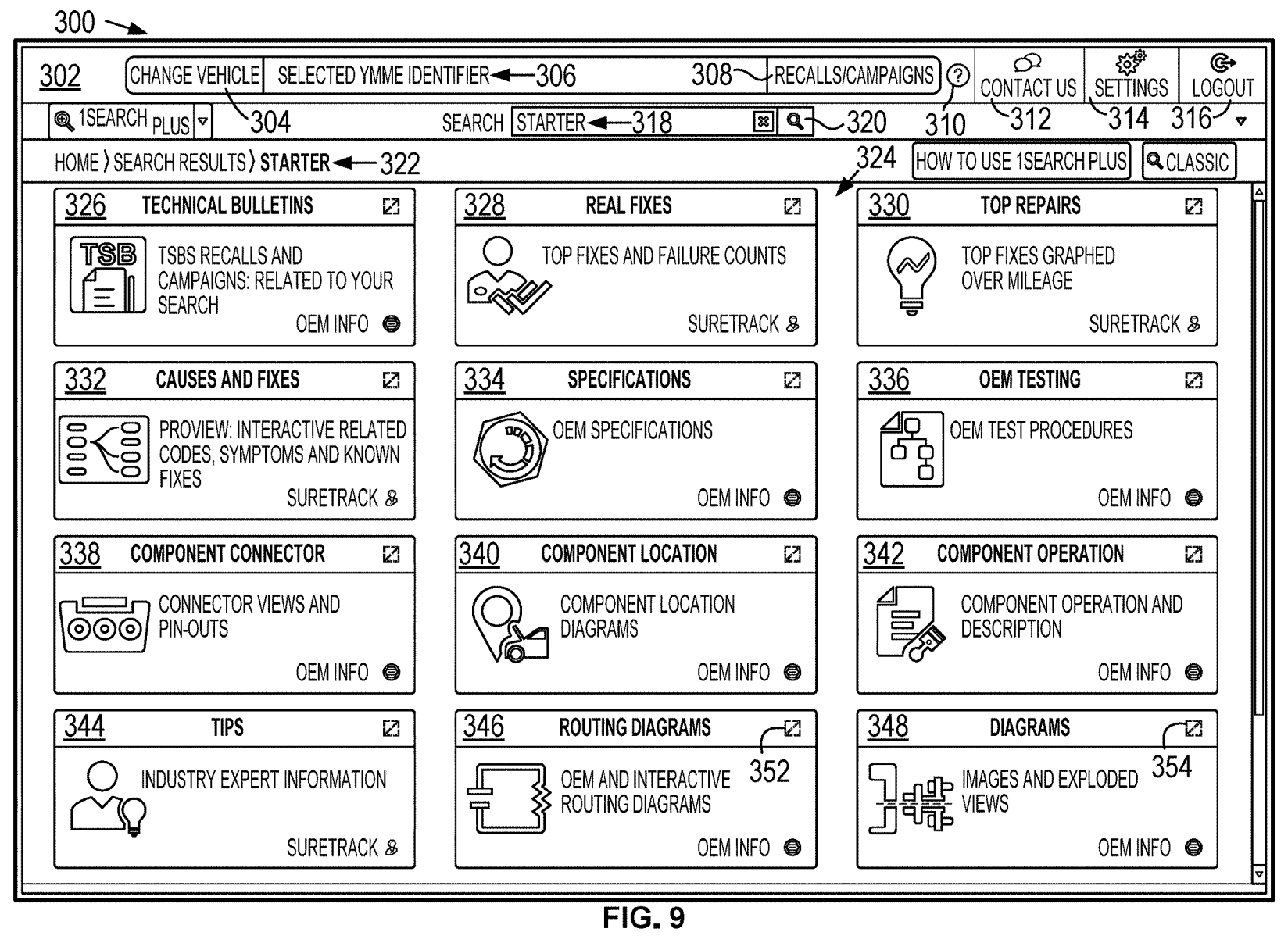

FIG. 9, FIG. 10, FIG. 11, and FIG. 12 show screen shots of a display in accordance with example implementation(s) described herein.

DETAILED DESCRIPTION

I. Introduction

This description describes several example implementations that pertain to systems, devices, computer-readable memories, and methods for displaying a routing diagram or a portion of a routing diagram. The routing diagram can represent routable components of a device-under-service (DUS) that are routed throughout different portions of the DUS. The routing diagram can represent other components, i.e., connectable components, of the DUS that operatively connect to the routable components. In at least some implementations, the DUS is a vehicle. In at least some of those implementations, the routable components include electrical circuits, optical circuits, hydraulic lines, and/or pneumatic lines. The electrical circuits can be arranged as or part of a wiring harness including multiple electrical circuits and a wiring harness sleeve that provides for protection of the electrical circuits. In accordance with those implementations, the routing diagram can include an electrical routing diagram, an optical routing diagram, a hydraulic routing diagram, or a pneumatic routing diagram, respectively. In at least some of the implementations, the routing diagram includes a schematic diagram that represents functionality of the routable components and connectable components using graphical symbols rather than real images of the components in the DUS.

II. Example Apparatus and Systems

Figure 1:
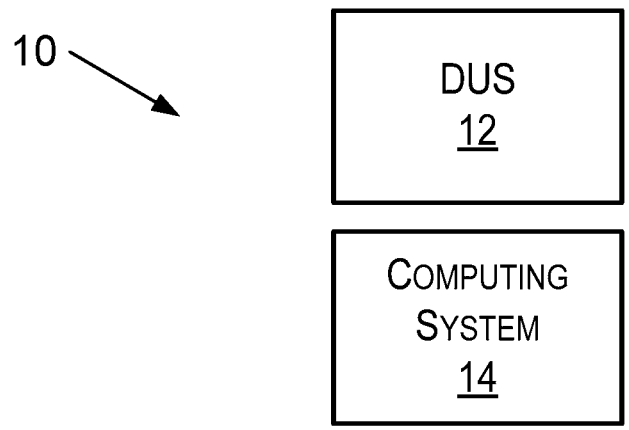
FIG. 1 and FIG. 2 show operating environments in accordance with example implementation(s) described herein.

FIG. 1 shows an operating environment 10 in accordance with at least some of the example implementations. The operating environment 10 includes a DUS 12 and a computing system 14. In at least some implementations, the computing system 14 does not communicate with the DUS 12. In at least some other implementations, the computing system 14 communicates with the DUS 12. In at least some implementations, the DUS 12 is and/or includes a vehicle. Details regarding example vehicles are described elsewhere in this description. The computing system 14 can display a routing diagram when the computing system 14 is being used to service the DUS 12.

Figure 2:
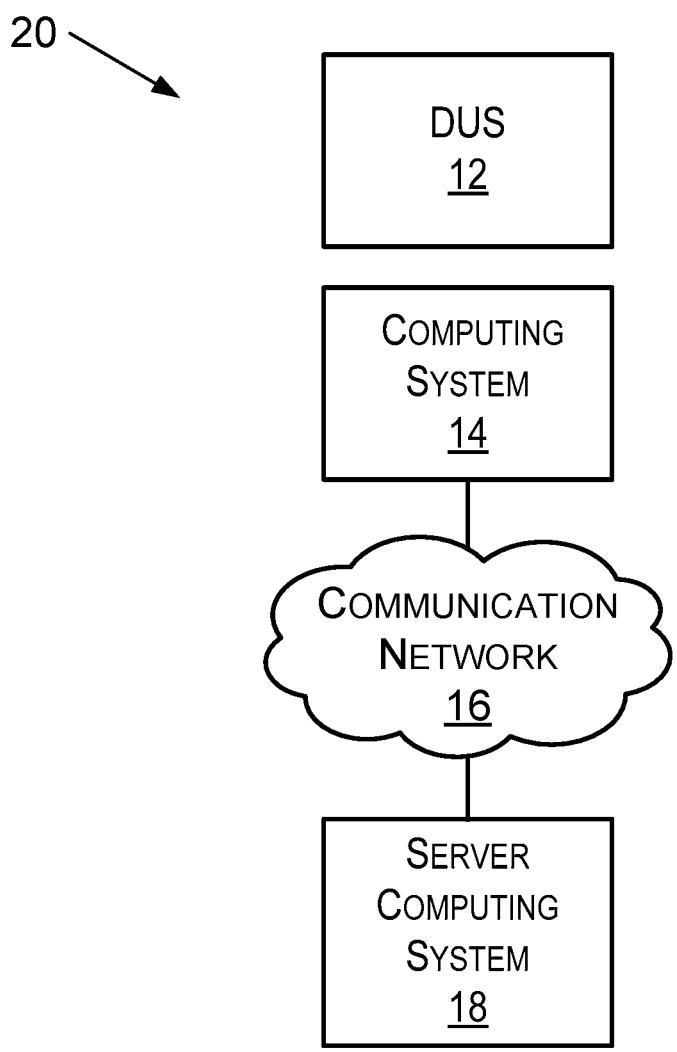

FIG. 2 shows an operating environment 20 in accordance with at least some of the example implementations. The operating environment 20 includes the DUS 12, the computing system 14, a communication network 16, and a server computing system 18. The DUS computing system 14 can provide the server computing system 18 with a request for a routing diagram. The server computing system 18 can provide the computing system 14 with a routing diagram in response to the request.

Figure 3:
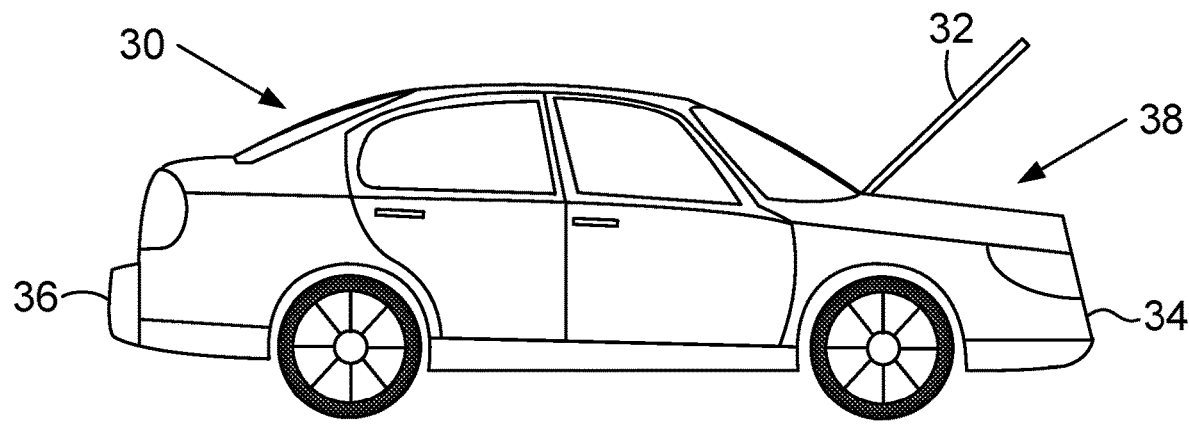
FIG. 3 shows a device-under-service in accordance with example implementation(s) described herein.

FIG. 3 shows, in accordance with an example implementation, a DUS 30 configured as a vehicle. In particular, the DUS 30 is configured as a four door automobile. The DUS 30 include a hood 32, a front end 34, and a rear end 36. In some geographical locations, a hood is referred to as a bonnet. As shown in FIG. 3, a front end of the hood 32 is positioned in an elevated position so as to enable a view of an engine compartment contained within the DUS 30 when looking in a direction shown by an arrow 38. Additional details regarding a vehicle are described elsewhere in this description.

Figure 4:
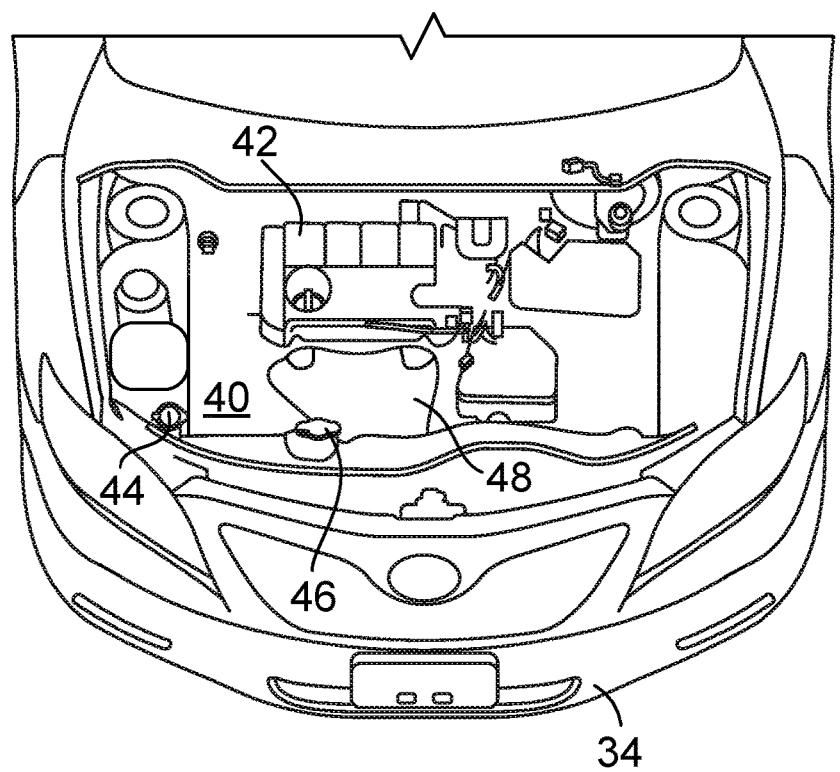
FIG. 4 shows an engine compartment of the example device-under-service shown in FIG. 3 in accordance with example implementation(s) described herein.
Figure 23:
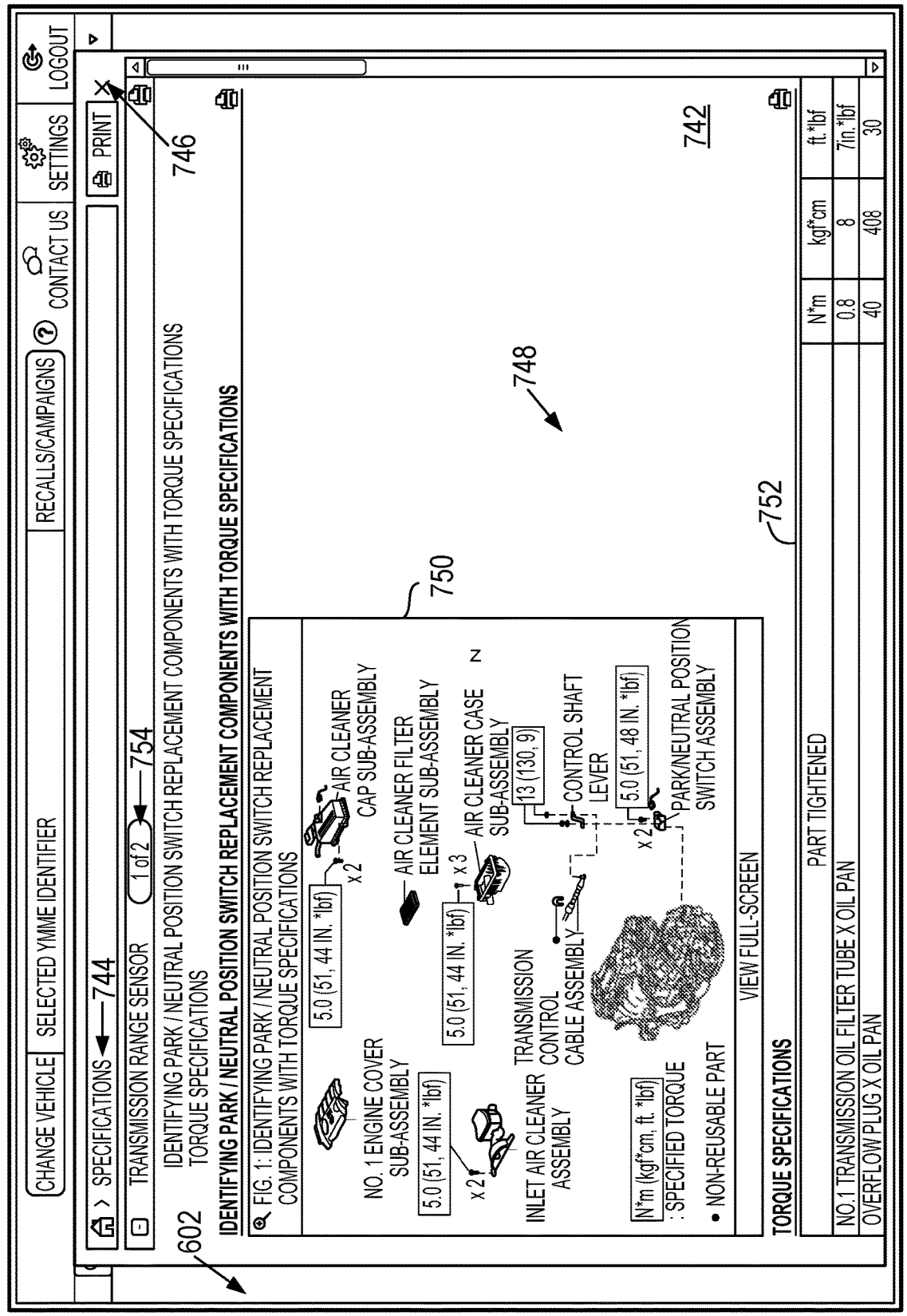

FIG. 4 shows an engine compartment 40 in accordance with the example implementations. The DUS 30 includes a component. Since DUS 30 is configured as a vehicle, a component contained in the DUS 30 can be referred to as a vehicle component. FIG. 4 shows the following example components: an intake manifold 42, a windshield washer fluid reservoir 44, a radiator cap 46, and an exhaust manifold 48, among other components. FIG. 23 shows further examples of components of the DUS 30 that are not shown in FIG. 4.

Figure 5:
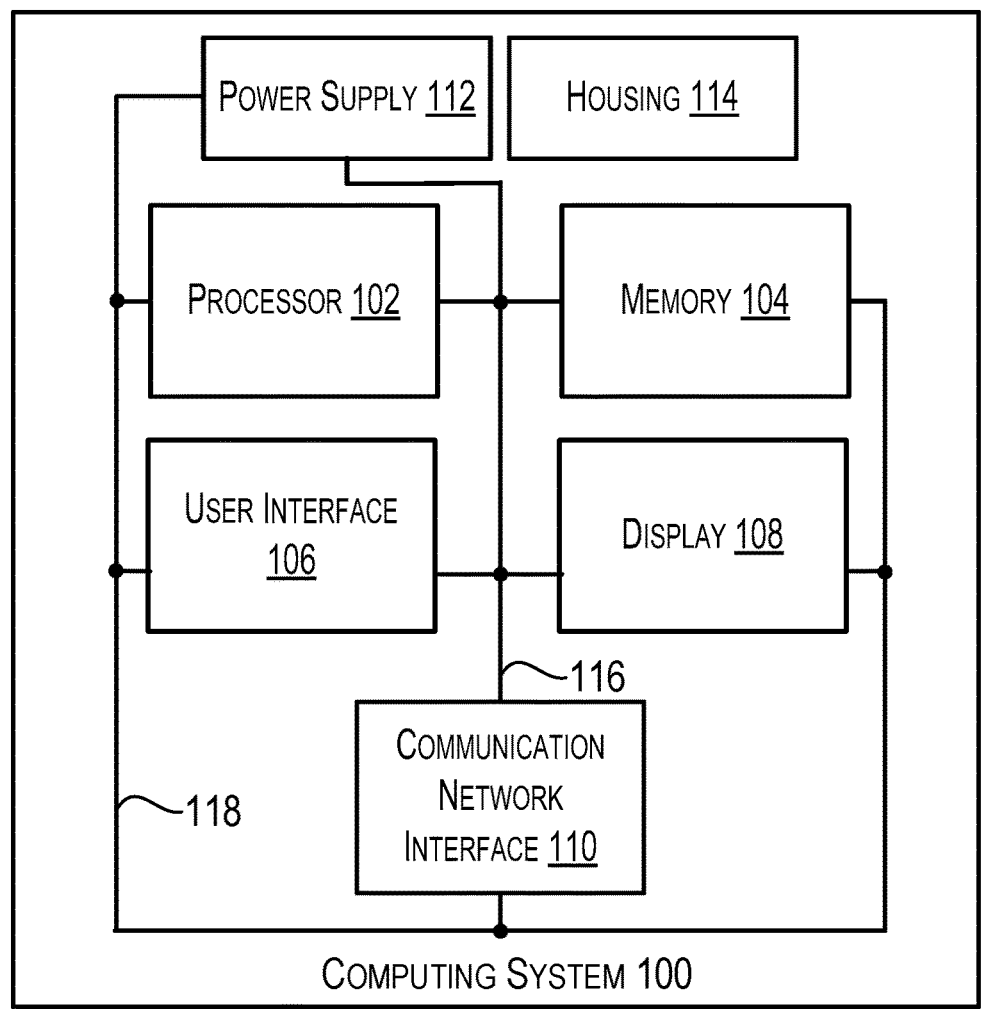
FIG. 5 is a block diagram of a computing system in accordance with example implementation(s) described herein.

Next, FIG. 5 is a block diagram of a computing system 100. The computing system 100 can include a processor 102, a memory 104, a user interface 106, a display 108, a communication network interface 110, a power supply 112, and/or a housing 114. The computing system 100 can also include a data bus 116 to operatively couple the processor 102, the memory 104, the user interface 106, the display 108, and/or the communication network interface 110 to each other. The computing system 100 can also include an electrical circuit 118 to couple the power supply 112 to the processor 102, the memory 104, the user interface 106, the display 108, and/or the communication network interface 110. The computing system 14 can be arranged like the computing system 100. The computing system 100 can operate within the operating environment 10, 20 like the computing system 14.

Figure 6:
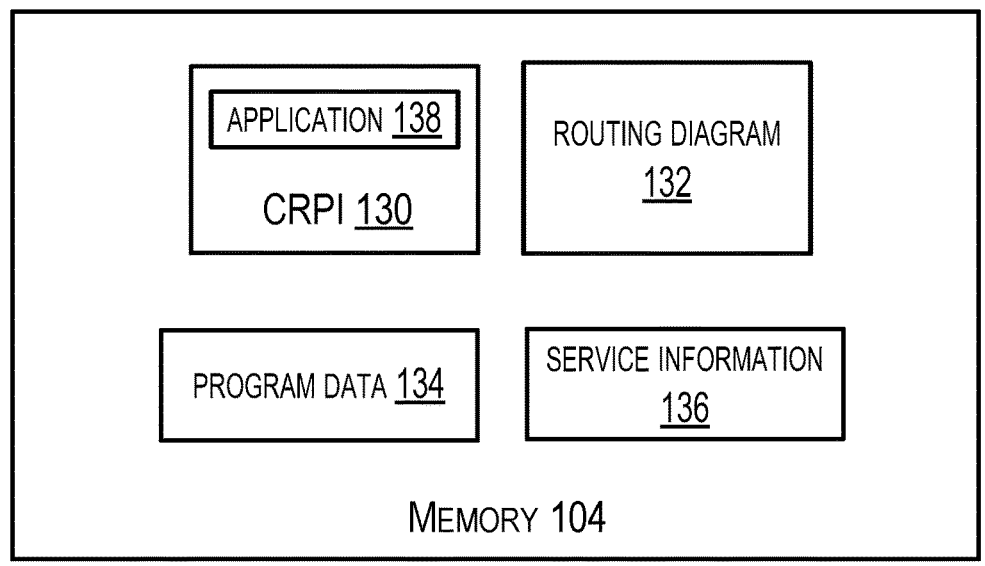
FIG. 6 shows content of a memory of the computing system shown in FIG. 5 in accordance with example implementation(s) described herein.

Next, FIG. 6 shows content of the memory 104 in accordance with the example implementations. As shown in FIG. 6, the memory 104 includes computer-readable program instructions (CRPI) 130, a routing diagram 132, program data 134, and/or service information 136. Other examples of data stored in the memory 104 are also possible.

The CRPI 130 can comprise a plurality of program instructions. The CRPI 130 and any other CRPI described in this description can include data structures, objects, programs, routines, or other program modules that can be accessed by a processor and executed by the processor to perform a particular function or group of functions and are examples of program codes for implementing steps for methods described in this description.

In general, the CRPI 130 can include program instructions to cause the computing system 100 to perform any function described herein as being performed by the computing system 100 or to cause any component of the computing system 100 to perform any function herein as being performed by that component of the computing system 100. As an example, the CRPI 130 can include program instructions to perform the set of functions 900 shown in FIG. 30.

More particularly, the CRPI 130 can include program instructions arranged as an application 138 executable by the processor 102. In accordance with at least some implementations, the application 138 can include an application executable by the processor 102 to cause the display 108 to display a routing diagram and to receive a user input of connectable component shown on the routing diagram and responsively highlight or un-highlight a set of routable components on the routing diagram. In accordance with those or other implementations, the application 138 can include a web-browser application that is executable to request a routing diagram from the server computing system 200 and to receive a routing diagram from the server computing system 200.

The routing diagram 132 can include one or more routing diagrams. In accordance with at least some implementations, the routing diagram 132 includes a connectable component and at least a portion of a routing set that includes one or more routable components.

In accordance with at least some implementations, the routing diagram 132 includes an electrical wiring diagram, the connectable component includes an electrical component, and the one or more routable components include one or more electrical circuits.

In accordance with at least some implementations, the routing diagram 132 includes an optical cable diagram, the connectable component includes an optical component, and the one or more routable components include one or more optical cables.

In accordance with at least some implementations, the routing diagram 132 includes a hydraulic line diagram, the connectable component includes a hydraulic component, and the one or more routable components include one or more hydraulic lines.

In accordance with at least some implementations, the routing diagram 132 includes a pneumatic line diagram, the connectable component includes a pneumatic component, and the one or more routable components include one or more pneumatic lines.

In accordance with at least some implementations, the routing diagram 132 includes at least two different types of connectable components selected from among an electrical component, an optical component, a hydraulic component, and a pneumatic component, and includes at least two different types of routable components selected from an electrical circuit, an optical cable, a hydraulic line, and a pneumatic line.

In cases in which the routing diagram 132 includes multiple routing diagrams, two or more of the routing diagrams can be part of a set of related routing diagrams. Two or more related routing diagrams can include change-diagram nodes. A number of change-diagram nodes on one routing diagram correspond to an equivalent number of change-diagram nodes on another routing diagram. The change-diagram nodes indicate that a routable component on one routing diagram extends to a routable component on another routing diagram and/or from the routable component on the other routing diagram.

The program data 134 can include program data indicative of selections made by a user of the computing system 100, such as selections made using the application 138. In at least some implementations, the program data 134 can include a DUS identifier, such as a vehicle identifier, and/or a component identifier, such as a vehicle component identifier. In at least some implementations, the program data 134 includes a zoom setting selected using controls of a GUI, such as a zoom user-selectable control 410 (shown in at least FIG. 10). In at least some implementations, the program data 134 includes one or more coordinates indicative of a pan setting selected using controls of a GUI, such as a pan selector 418 (shown in at least FIG. 10).

In at least some implementations, the program data 134 includes data indicating a state of whether or not a routable component on a routing diagram and/or a segment of a routable component should be highlighted (e.g., a highlighted state) or un-highlighted (e.g., an un-highlighted state). Other examples of the program data 134 are also possible.

The service information 136 can include service information regarding the DUS 12, 30. The service information 136 can, but need not necessarily, include a technical bulletin, a real fix tip, top repair information, causes and fixes information, specification data, original equipment manufacturer (OEM) testing data, connectable component connector information, connectable component location information, component operation information, tip information, routable diagrams, and/or images and exploded view images.

Figure 7:
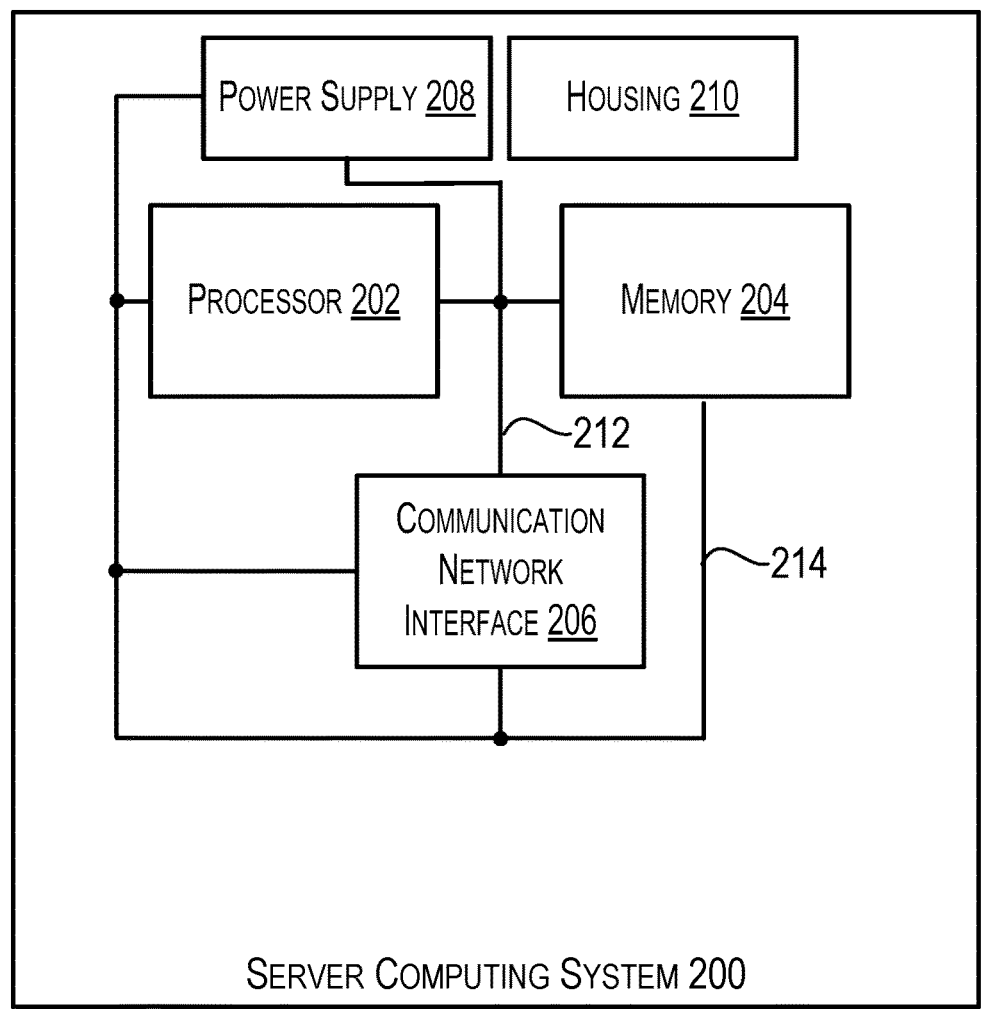
FIG. 7 is a block diagram of a server computing system in accordance with example implementation(s) described herein.

Next, FIG. 7 is a block diagram of a server computing system 200. The server computing system 200 can include a processor 202, a memory 204, a communication network interface 206, a power supply 208, and/or a housing 210. The server computing system 200 can also include a data bus 212 to operatively couple the processor 202, the memory 204, the communication network interface 206, and/or the power supply 208 to each other. The server computing system 200 can also include an electrical circuit 214 to couple the power supply 208 to the processor 202, the memory 204, and/or the communication network interface 206. The server computing system 18 can be arranged like the server computing system 200. The server computing system 200 can operate within the operating environment 10, 20 like the server computing system 18.

Figure 8:
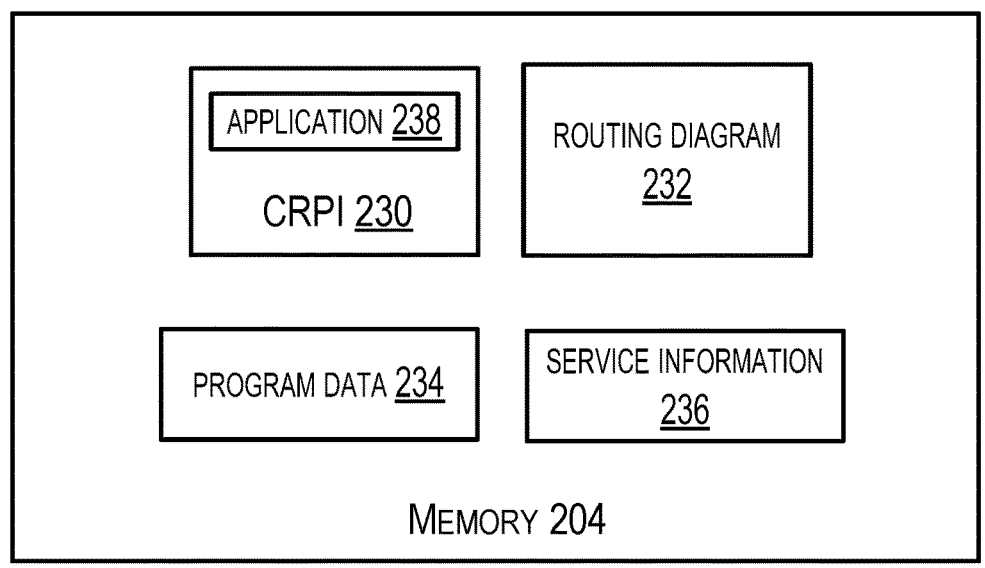
FIG. 8 shows content of a memory of the computing system shown in FIG. 7 in accordance with example implementation(s) described herein.

Next, FIG. 8 shows content of the memory 204 in accordance with the example implementations. As shown in FIG. 8, the memory 204 includes computer-readable program instructions (CRPI) 230, a routing diagram 232, and/or program data 234. Other examples of data stored in the memory 204 are also possible.

The CRPI 230 can comprise a plurality of program instructions. In general, the CRPI 230 can include program instructions to cause the server computing system 200 to perform any function described herein as being performed by the server computing system 200 or to cause any component of the server computing system 200 to perform any function herein as being performed by that component of the server computing system 200.

More particularly, the CRPI 230 can include program instructions arranged as an application 238 executable by the processor 202. In accordance with at least some implementations, the application 238 can include an application executable by the processor 202 to provide the computing system 100 with a routing diagram for displaying on the display 108 and to receive a user input of connectable component shown on the routing diagram and responsively cause the display 108 to highlight or un-highlight a set of routable components on the routing diagram displayed on the display 108. In accordance with those or other implementations, the application 138 can include a web-browser application that is executable to receive, from the computing system 100, a request for a routing diagram and to provide a routing diagram from the server computing system 200 to the computing system 100.

The routing diagram 232 can include one or more routing diagrams. In accordance with at least some implementations, the routing diagram 232 includes a connectable component and at least a portion of a routing set that includes one or more routable components.

In accordance with at least some implementations, the routing diagram 232 includes an electrical wiring diagram, the connectable component includes an electrical component, and the one or more routable components include one or more electrical circuits.

In accordance with at least some implementations, the routing diagram 232 includes an optical cable diagram, the connectable component includes an optical component, and the one or more routable components include one or more optical cables.

In accordance with at least some implementations, the routing diagram 232 includes a hydraulic line diagram, the connectable component includes a hydraulic component, and the one or more routable components include one or more hydraulic lines.

In accordance with at least some implementations, the routing diagram 232 includes a pneumatic line diagram, the connectable component includes a pneumatic component, and the one or more routable components include one or more pneumatic lines.

In accordance with at least some implementations, the routing diagram 232 includes at least two different types of connectable components selected from among an electrical component, an optical component, a hydraulic component, and a pneumatic component, and includes at least two different types of routable components selected from an electrical circuit, an optical cable, a hydraulic line, and a pneumatic line.

In cases in which the routing diagram 232 includes multiple routing diagrams, two or more of the routing diagrams can be part of a set of related routing diagrams. Two or more related routing diagrams can include change-diagram nodes. A number of change-diagram nodes on one routing diagram correspond to an equivalent number of change-diagram nodes on another routing diagram. The change-diagram nodes indicate that a routable component on one routing diagram extends to a routable component on another routing diagram and/or from the routable component on the other routing diagram.

The program data 234 can include program data indicative of selections made by a user of the computing system 100, such as selections made using the application 138. In at least some implementations, the program data 234 can include a DUS identifier, such a vehicle identifier, and/or a component identifier, such as a vehicle component identifier. In at least some implementations, the program data 234 includes a zoom setting selected using controls of a GUI, such as zoom user-selectable control 410 (shown in at least FIG. 10). In at least some implementations, the program data 234 includes one or more coordinates indicative of a pan setting selected using controls of a GUI, such as a pan selector 418 (shown in at least FIG. 10). Other examples of the program data 234 are also possible.

The service information 236 can include service information regarding the DUS 12, 30. The service information 236 can, but need not necessarily, include one or more of the following items of service information a technical bulletin, a real fix tip, top repair information, causes and fixes information, specification data, OEM testing data, connectable component connector information, connectable component location information, component operation information, tip information, routable diagrams (e.g., wiring, pneumatic line, hydraulic line and/or optical cable diagrams), waveform information (e.g., oscilloscope waveforms), PID data, after-repair information, parts & labor information (e.g., part numbers and labor operation codes), community information, and/or images and exploded view images. The server computing system 200 can provide the computing system 100 with a portion of the service information 236 in response to a request for service information.

III. Example System Components

1. Processor

A processor, such as the processor 102, the processor 202, and/or any other processor discussed in this description, can include one or more processors. Any processor discussed in this description can thus be referred to as "at least one processor" or "one or more processors." Any processor discussed in this description can include a general purpose processor (e.g., an INTEL® single core microprocessor or an INTEL® multicore microprocessor), and/or a special purpose processor (e.g., a digital signal processor, a graphics processor, an embedded processor, or an application specific integrated circuit (ASIC) processor). Furthermore, any processor discussed in this description can include and/or be operatively connected to a memory controller that controls a flow of data going to and from a memory, such as the processor 102 including and/or being operatively coupled to the memory 104, and/or the processor 202 including and/or being operatively coupled to the memory 204. In at least some implementations of the server computing system 200, the INTEL® multicore microprocessor can include one or more INTEL® XEON® processors having between four and twenty-eight cores.

Any processor discussed in this description can be configured to execute computer-readable program instructions (CRPI). Any CRPI discussed in this description can, for example, include assembler instructions, machine instructions, machine dependent instructions, microcode, firmware instructions, state-setting data, and/or either source code or object code written in one or any combination of two or more programming languages. As an example, a programming language can include an object oriented programming language such as Java, Python, or C++, or a procedural programming language, such as the "C" programming language. Any processor discussed in this description can be configured to execute hard-coded functionality in addition to or as an alternative to software-coded functionality (e.g., via CRPI). In at least some implementations of the computing system 100, the processor 102 can be programmed to perform any function(s) described in this description as being performed by the computing system 14. Similarly, in at least some implementations of the server computing system 200, the processor 202 can be programmed to perform any function(s) described in this description as being performed by the server computing system 18.

An embedded processor refers to a processor with a dedicated function or functions within a larger electronic, mechanical, pneumatic, and/or hydraulic device, and is contrasted with a general purpose computer. The embedded processor can include a central processing unit chip used in a system that is not a general-purpose workstation, laptop, or desktop computer. In some implementations, the embedded processor can execute an operating system, such as a real-time operating system (RTOS). As an example, the RTOS can include the SMX® RTOS developed by Micro Digital, Inc., such that the embedded processor can, but need not necessarily, include (a) an advanced RISC (reduced instruction set computer) machine (ARM) processor (e.g., an AT91SAM4E ARM processor provided by the Atmel Corporation, San Jose, California), or (b) a COLDFIRE® processor (e.g., a 52259 processor) provided by NXP Semiconductors N.V., Eindhoven, Netherlands. A general purpose processor, a special purpose processor, and/or an embedded processor can perform analog signal processing and/or digital signal processing.

2. Memory

A memory, such as the memory 104, the memory 204, and/or any other memory discussed in this description, can include one or more memories. Any memory discussed in this description can thus be referred to as "at least one memory" or "one or more memories." A memory can include a non-transitory memory, a transitory memory, or both a non-transitory memory and a transitory memory. A non-transitory memory, or a portion thereof, can be located within or as part of a processor (e.g., within a single integrated circuit chip). A non-transitory memory, or a portion thereof, can be separate and distinct from a processor.

A non-transitory memory can include a volatile or non-volatile storage component, such as an optical, magnetic, organic or other memory or disc storage component. Additionally or alternatively, a non-transitory memory can include or be configured as a random-access memory (RAM), a read-only memory (ROM), a programmable read-only memory (PROM), an erasable programmable read-only memory (EPROM), a flash memory, an electrically erasable programmable read-only memory (EEPROM), or a compact disk read-only memory (CD-ROM). The RAM can include static RAM or dynamic RAM. A non-transitory memory can be configured as a removable storage device, a non-removable storage device, or a combination thereof. A removable storage and/or a non-removable storage device can, but need not necessarily, include a magnetic disk device such as a flexible disk drive or a hard-disk drive (HDD), an optical disk drive such as a compact disc (CD) drive and/or a digital versatile disk (DVD) drive, a solid state drive (SSD), or a tape drive.

A transitory memory can include, for example, CRPI provided over a communication network, such as the communication network 16.

A "memory" can be referred to by other terms such as a "computer-readable memory," a "computer-readable medium," a "computer-readable storage medium," a "data storage device," a "memory device," "computer-readable media," a "computer-readable database," "at least one computer-readable medium," or "one or more computer-readable mediums." Any of those alternative terms can be preceded by the prefix "transitory" if the memory is transitory or "non-transitory" if the memory is non-transitory. For a memory including multiple memories, two or more of the multiple memories can be the same type of memory or different types of memories.

3. User Interface

A user interface, such as user interface 106 or any other user interface described in this description, can include one or more user interface components. A user interface component can be configured for use by a user to enter data and/or a selection to the computing system 100 and/or to present an output, such as a visual, audible, or haptic output. In at least some example implementations, the user interface 106 can be configured to make a selection on a graphical user interface (GUI). As an example, the selection on the graphical user interface can include a selection of a connectable component, a component identifier, or a routable component. Both of those components and the identifier can be located on a routing diagram shown on the GUI.

In at least some implementations, the user interface 106 includes a keyboard having one or more components configured for entering data and/or a selection into the computing system 100. The keyboard can include one or more keys. In at least some implementations, each key includes a push button, such as a press-and-hold button or a press-and-release button. In at least some implementations, at least a portion of the keyboard is implemented as part of a touch screen display that includes soft keys, such as capacitive or resistive keys of a touch screen display. In still other implementations, the soft keys of the keyboard on the touch screen display can include a power on/off key, a yes key and a no key, and/or four directional cursor keys (such as left, up, right, down keys). The keyboard can, but need not necessarily, include a QWERTY keyboard. In at least some implementations, the user interface 106 can include a pointing device such as a computing device mouse, a joystick, and/or or a microphone for receiving spoken inputs.

4. Display

A display, such as the display 108 or any other display described in this description, can include one or more displays. As an example, a display can include a capacitive touch screen display, a resistive touch screen display, a plasma display, a light emitting diode (LED) display, a cathode ray tube display, an organic light-emitting diode (OLED) display, or a liquid crystal display (LCD). An OLED display can include an active-matrix OLED or a passive-matrix OLED. The LCD can include a backlit, color LCD. The display 108 can include a touch screen display with the LCD. For instance, the display 108 can include a capacitive or resistive touch screen display. Other examples of the display 108 are also possible. The touch screen display can be configured to select any item shown on the display 108. The processor 102 can determine any and each selection made using the touch screen display.

In some implementations, the display 108 is configured to display a GUI. In at least some of those implementations, the GUI can be displayed in response to the processor 102 executing the application 138 stored in the memory 104. In those or in other implementations, the GUI can be arranged like a GUI or some portion of a GUI shown in any one or more of FIG. 9 to FIG. 27. In at least some of those implementations or other implementations, the display 108 is configured to display a routing diagram and/or a panel of a routing diagram. Further, in at least some of the described implementations, the display 108 is configured to display a still image (such as a visible light image, a thermal image, and/or a blended image), a video, a text file (such as a text file with a PDF file extension or an XML file extension), a hypertext markup language file, a web page, and/or some other visual content configured to be displayed on a display. The display 108 can be a component of the user interface 106.

5. Communication Network Interface

A communication network interface, such as the communication network interface 110, the communication network interface 206, and/or any other communication network interface described in this description, can include one or more communication network interfaces configured for transmitting data to the communication network 16 and/or receiving data from the communication network 16. The communication network interface can include one or more transceivers. Each transceiver includes one or more transmitters configured to transmit data onto a network, such as the communication network 16, a data bus, and/or some other type of connection mechanism. Each transceiver includes one or more receivers configured to receive data or a communication carried over a network, such as the communication network 16, a data bus, and/or some other type of connection mechanism. Unless stated differently, any data described as being transmitted to a device or system is considered to be received by that device or system. Similarly, unless stated differently, any data described as being received from a device or system is considered to be transmitted by that device or system directly or indirectly to the receiving device or system. For some implementations, a transceiver can include a transmitter and a receiver in a single semiconductor chip. In at least some of those implementations, the semiconductor chip can include a processor.

In at least some of the example implementations, a transmitter, such as a transmitter within any transceiver described in this description, transmits radio signals carrying data, and a receiver, such as a receiver within any transceiver described in this description, receives radio signals carrying data. A transceiver with a radio transmitter and radio receiver can include one or more antennas and can be referred to as a "radio transceiver," an "RF transceiver," or a "wireless transceiver." "RF" represents "radio frequency."

A radio signal transmitted or received by a radio transceiver can be arranged in accordance with one or more wireless communication standards or protocols such as an IEEE® standard, such as (i) an IEEE® 802.11 standard for wireless local area networks (wireless LAN) (which is sometimes referred to as a WI-FI® standard) (e.g., 802.11a, 802.11b, 802.11g, 802.11n or 802.11ac), (ii) an IEEE® 802.15 standard (e.g., 802.15.1, 802.15,3, 802.15.4 (ZIG-BEE®), or 802.15.5) for wireless personal area networks (PANs), (iii) a BLUETOOTH® version 4.1 or 4.2 standard developed by the Bluetooth Special Interest Group (SIG) of Kirkland, Wash., (iv) a cellular wireless communication standard such as a long term evolution (LTE) standard, (v) a code division multiple access (CDMA) standard, (vi) an integrated digital enhanced network (IDEN) standard, (vii) a global system for mobile communications (GSM) standard, (viii) a general packet radio service (GPRS) standard, (ix) a universal mobile telecommunications system (UMTS) standard, (x) an enhanced data rates for GSM evolution (EDGE) standard, (xi) a multichannel multipoint distribution service (MMDS) standard, (xii) an International Telecommunication Union (ITU) standard, such as the ITU-T G.9959 standard referred to as the Z-Wave standard, (xiii) a 6LoWPAN standard, (xiv) a Thread networking protocol, (xv) an International Organization for Standardization (ISO/International Electrotechnical Commission (IEC) standard such as the ISO/IEC 18000-3 standard for Near Field Communication (NFC), (xvi) the Sigfox communication standard, (xvii) the Neul communication standard, or (xviii) the LoRaWAN communication standard. Other examples of the wireless communication standards or protocols are possible.

In at least some of the implementations, a transmitter, such as a transmitter within any transceiver described in this description, can be configured to transmit a signal (e.g., one or more signals or one or more electrical waves) carrying or representing data onto an electrical circuit (e.g., one or more electrical circuits). Similarly, a receiver, such as a receiver within any transceiver described in this description, can be configured to receive via an electrical circuit a signal carrying or representing data over the electrical circuit. The electrical circuit can be part of a network, such as the communication network 16, or a data bus, such as the data bus 116 or the data bus 212. The signal carried over an electrical circuit can be arranged in accordance with a wired communication standard such as a Transmission Control Protocol/Internet Protocol (TCP/IP), an IEEE® 802.3 Ethernet communication standard for a LAN, a data over cable service interface specification (DOCSIS standard), such as DOCSIS 3.1, a universal serial bus (USB) specification, or some other wired communication standard. In accordance with at least some implementations, an electrical circuit can include a wire, a printed circuit on a substrate, and/or a network cable (e.g., a single wire, a twisted pair of wires, a fiber optic cable, a coaxial cable, a wiring harness, a power line, a printed circuit, a CAT5 cable, and/or CAT6 cable). The wire can be referred to as a "conductor". As an example, transmission of data over the conductor can occur electrically and/or optically.

A transceiver that is configured to carry out communications over the communication network 16 can include a modem, a network interface card, a local area network (LAN) on motherboard (LOM), and/or a chip mountable on a circuit board. As an example the chip can include a CC3100 Wi-Fi® network processor available from Texas Instruments, Dallas, Texas, a CC256MODx Bluetooth® Host Controller Interface (HCI) module available from Texas instruments, or a different chip for communicating via Wi-Fi®, Bluetooth® or another communication protocol.

A network device within and/or operatively coupled to the communication network 16 and/or that communicates via the communication network 16 using a packet-switched technology can be locally configured for a next 'hop' in the communication network 16 (e.g., a device or address where to send data to, and where to expect data from). As an example, a device (e.g., a transceiver) configured for communicating using an IEEE® 802.11 standard can be configured with a network name, a network security type, and a password. Some devices auto-negotiate this information through a discovery mechanism (e.g., a cellular phone technology).

The data transmitted by a communication network interface can include a destination identifier or address of a computing system to which the data is to be transmitted. The data or communication transmitted by a communication network interface can include a source identifier or address of the computing system including the communication network interface. The source identifier or address can be used to send a response to the computing system that includes the communication network interface that transmitted the data.

6. Power Supply

A power supply, such as the power supply 112, the power supply 208, and/or any other power supply described in this description can be arranged in various configurations. As an example, the power supply 112 and/or the power supply 208 can include circuitry to receive AC current from an AC electrical supply (e.g., electrical circuits operatively connected to an electrical wall outlet) and a converter to convert the AC current to a DC current for supplying to one or more of the components of the computing system 100 or the server computing system 200, respectively. As another example, the power supply 112 and/or the power supply 208 can include a battery or be battery operated. As yet another example, the power supply 112 and/or the power supply 208 can include a solar cell or be solar operated. The power supply 112 can include and/or operatively connect to electrical circuits arranged to distribute electrical current throughout the power supply 112 and/or the computing system 100. Likewise, the power supply 208 can include and/or operatively connect to electrical circuits arranged to distribute electrical current throughout the power supply 208 and/or the server computing system 200. Other examples of the power supply 112 and/or the power supply 208 are also possible.

7. Housing

A housing, such as the housing 114, the housing 210, and/or any other housing described in this description, can be configured in any of a variety of configurations. In at least some implementations of the computing system 100, the housing 114 surrounds and/or supports at least a portion of one other component of the computing system 100. For example, the housing 114 can surround and/or support at least a portion of the processor 102, the memory 104, the user interface 106, the display 108, the communication network interface 110, and/or the power supply 112. Similarly, in at least some implementations of the server computing system 200, the housing 210 surrounds and/or supports at least a portion of one other component of the server computing system 200. For example, the housing 210 can surround and/or support at least a portion of the processor 202, the memory 204, the communication network interface 206, and/or the power supply 208. A housing can be made from various materials. In some example implementations, at least a portion of the housing is made from a plastic material (e.g., acrylonitrile butadiene styrene (ABS)). In those or in other implementations, at least a portion of the housing is metallic.

IV. Example Graphical User Interfaces

Next, FIG. 9 shows a screen shot 300 of a display, such as the display 108. The screen shot 300 includes a GUI 302. Some of the features of the GUI 302 are shown in one or more other screens shots shown in FIG. 10 to FIG. 25. Those features use the same drawings reference number.

As shown in FIG. 9, the GUI 302 includes a DUS GUI selector 304, a selected DUS identifier 306, a recalls/campaigns GUI selector 308, a help GUI selector 310, a contact GUI selector 312, a settings GUI selector 314, a logout GUI selector 316, a further search field 318, a search user-selectable control 320, a search result identifier 322, and a set of display cards 324. Any and/or each display card of the set of display cards 324 is selectable (using the user interface 106) and/or expandable on the display 108.

The DUS GUI selector 304 is selectable to cause the processor 102 to enter a mode for changing which DUS is identified in the selected DUS identifier 306. In some implementations, entering this mode can include clearing the selected DUS identifier 306 so that no DUS is indicated by the selected DUS identifier 306. In at least some implementations, entering this mode can include the processor 102 outputting a menu from which a DUS can be selected and entering an identifier of the selected DUS into the selected DUS identifier 306.

The selected DUS identifier 306 is selectable to cause the processor 102 to output on the display 108 an identifier of a selected DUS. In accordance with the implementations, in which the DUS includes a vehicle, the selected DUS identifier 306 can indicate a year/make/model/engine (YMME) or some other type of vehicle identifier. Other types of identifiers can be used for other types of DUS.

The recalls/campaigns GUI selector 308 is selectable to cause the processor 102 to perform a search of the memory 104 and/or to transmit to the server computing system 200 a request to search the memory 204 for information regarding recalls or campaigns, such as recalls or campaigns generated by an OEM of the DUS indicated in the selected DUS identifier 306 and/or an OEM of a component identified in the further search field 318 for the DUS indicated in the selected DUS identifier 306. The search performed or requested can be based on the text entered into the further search field 318 and/or the DUS indicated at the selected DUS identifier 306. Upon locating and/or receiving the information regarding recalls or campaigns, the processor 102 outputs the information regarding recalls or campaigns on the display 108.

The help GUI selector 310 is selectable to cause the processor 102 to output on the display 108 a GUI configured for a user to enter a selection to search for and/or request help regarding the application 138.

The contact GUI selector 312 is selectable to cause the processor 102 to output on the display 108 a GUI configured for a user to enter a selection to search for and/or request information on how to contact an entity associated with the application 138.

The settings GUI selector 314 is selectable to cause the processor 102 to output on the display 108 one or more application settings and options for changing the application setting(s). As an example, the application setting can, but need not necessarily, include a font size setting, a communication network setting, a password setting, or some other application setting.

The logout GUI selector 316 is selectable to cause the processor 102 to log out of the application 138. Logging out of the application 138 could include the processor 102 transmitting to the server computing system 200 a messaging indicating logging out has been requested.

The further search field 318 can include a text field to enter text indicative of a further search criterion, such as a component identifier. Text could be entered into the further search field 318 using the user interface 106. As an example, the text entered into the further search field could be indicative of a component located on the DUS indicated in the selected DUS identifier 306. As shown in FIG. 9, the text could include the search term "Starter" indicative of an electrical starter motor.

The search user-selectable control 320 is selectable to cause the processor 102 to perform a search of the memory 104 and/or to transmit to the server computing system 200 a request to search the memory 204. The search performed or requested can be based on the text entered into the further search field 318 and/or the DUS indicated at the selected DUS identifier 306.

The search result identifier 322 indicates one or more search terms used to obtain data to populate the set of display cards 324. In at least some implementations, the search result identifier 322 indicates a search term entered at the selected DUS identifier 306 and/or at the further search field 318.

Each display card of the set of display cards 324 pertains to one or more categories of service information that is displayable in the display card. In at least some implementations, each display card of the set of display cards 324 includes a service information category title to indicate what type of service information will be displayed if that display card is selected and/or expanded. A display card can be referred to by its service information category title. Accordingly, the set of display cards 324 include a technical bulletins display card 326, a real fixes display card 328, a top repairs display card 330, a causes and fixes display card 332, a specifications display card 334, an OEM testing display card 336, a component connector display card 338, a component location display card 340, a component operation display card 342, a tips display card 344, a routing diagrams display card 346, and a diagrams display card 348. Each display card of the set of display cards 324 includes a card expander selector. A card expander selector 352 of the routing diagrams display card 346 and a card expander selector 354 of the diagrams display card 348 are specifically identified.

As an example, the processor 102 can determine that a wiring diagrams display card, such as the routing diagrams display card 346, is selected from a GUI, such as the GUI 302, and responsively display a GUI with a list of selectable wiring diagrams for a DUS identified by the selected DUS identifier 306 and/or an entry in the further search field 318, such as a starter. The processor 102 can, but need not necessarily, request and receive from the server computing system 200 the list of selectable wiring diagrams. The processor 102 can determine a particular wiring diagram is selected from the displayed list of selectable wiring diagrams, such as a routing diagram 404 (shown in FIG. 10), arranged as a wiring diagram showing an automatic air conditioning circuit with navigation. The processor 102 can, but need not necessarily, request and receive from the server computing system 200 the routing diagram 404. In a variation of the GUI 302, the routing diagrams display card 346 could be alternatively titled "electrical wiring diagrams," "optical cable diagrams," "hydraulic line diagrams," or "pneumatic line diagrams" instead of "routing diagrams."

Figure 10:
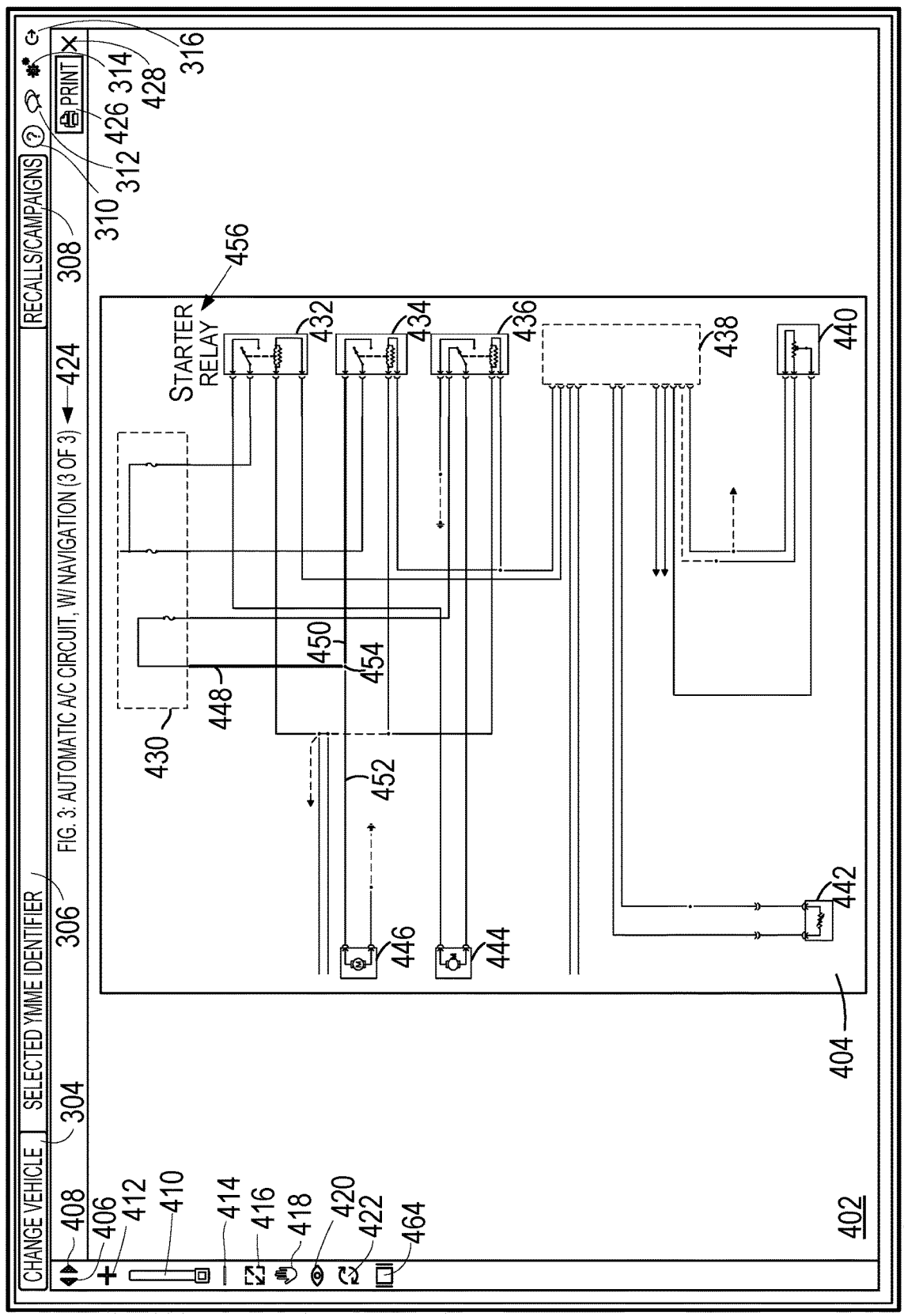

Next, FIG. 10 shows a screen shot 399 of a display, such as the display 108. The screen shot 399 includes a GUI 402. Some of the features of the GUI 402 are shown in one or more other screens shots shown in FIG. 11, FIG. 12, and FIG. 14 to FIG. 25. Those features use the same drawings reference number.

As shown in FIG. 10, the GUI 402 includes the DUS GUI selector 304, the selected DUS identifier 306, the recalls/campaigns GUI selector 308, the help GUI selector 310, the contact GUI selector 312, the settings GUI selector 314, and the logout GUI selector 316. The GUI 402 also includes a routing diagram 404, a routing diagram selector 406, a routing diagram selector 408, a zoom user-selectable control 410 having a zoom-in selector 412 and a zoom-out selector 414, a resize user-selectable control 416, a pan selector 418, a hide-or-show user-selectable control 420, a reset routable components user-selectable control 422, a multi-diagram view selector 464, a routing diagram identifier 424, a print user-selectable control 426, and a close GUI user-selectable control 428.

The routing diagram selector 406 is selectable to select a routing diagram (of a set of multiple routing diagrams) that is not currently displayed on the display 108. Similarly, the routing diagram selector 408 is selectable to select a routing diagram (of a set of multiple routing diagrams) that is not currently displayed on the display 108.

The zoom user-selectable control 410 has a zoom-in selector 412 and a zoom-out selector 414. The zoom-in selector 412 is selectable to cause the processor 102 to zoom in on one or more routing diagrams displayed on the display 108. The zoom-out selector 414 is selectable to cause the processor 102 to zoom out on one or more routing diagrams displayed on the display 108.

The resize user-selectable control 416 is selectable to cause the processor 102 to change a size of a routable diagram displayed on the display 108. As an example, in response to determining the resize user-selectable control 416 has been selected when the displayed routing diagram is not a default drawing size, the processor 102 can change the size of the drawing displayed on the display to the default drawing size. As an example, the default drawing size of can be a size to accommodate a fit-drawing-to-page size such that the routing diagram is displayed in its entirety on the display.

The pan selector 418 is selectable to cause the processor 102 to move a routing diagram displayed on the display, such a moving the routing diagram horizontally, vertically, or a combination of horizontally and vertically.

The hide-or-show user-selectable control 420 is selectable to cause the processor 102 to hide particular component(s) of a routing diagram displayed on the display 108 if those particular component(s) are not currently hidden and to unhide the particular component(s) of the routing diagram on the display 108 if those particular component(s) are currently hidden. The particular components are not visible when hidden, but are visible when not hidden. As an example, the particular components can be the routable components on a routing diagram. As another example, the particular components can be the connectable components on a routing diagram.

The reset routable components user-selectable control 422 is selectable to cause the processor 102 to un-highlight any routable component(s) disposed on a routing diagram and currently displayed as highlighted. Moreover, the processor 102 can modify the program data 134 to indicate that any segment of a routable component disposed on a routing diagram that is not currently displayed but is part of a routable component having a segment disposed on a routable diagram currently displayed and highlighted is associated with an un-highlighted state.

The routing diagram identifier 424 includes a textual identifier of a routing diagram or a set of routing diagrams that include a routing diagram currently displayed on the display.

The print user-selectable control 426 can be configured for performing various functions. In at least some implementations, the print user-selectable control 426 is selectable to cause the processor 102 to open a window including a user-selectable control that is selectable to cause the processor 102 to send the GUI including a routing diagram and/or the routing diagram displayed with the print user-selectable control 426 to a printer. In at least some other implementations, the print user-selectable control 426 is selectable to cause the processor 102 to directly send the GUI including a routing diagram and/or the routing diagram displayed with the print user-selectable control 426 to a printer.

The close GUI user-selectable control 428 is selectable to cause the processor 102 to close the GUI including the GUI user-selectable control 428. In accordance with at least some implementations, the processor 102 causes the display to display another GUI, such as the GUI 302, in response to determining the GUI user-selectable control 428 has been selected.

The routing diagram 404 includes a connectable component 430, 432, 434, 436, 438, 440, 442, 444, 446. The routing diagram 404 includes a node 454 and a plurality of routable components. Those routable components include a routable component 448, 450, 452 among other routable components on the routing diagram 404. One or more and/or all connectable components disposed on a routing diagram, such as the routing diagram 404, can be associated with a component identifier disposed on the routing diagram in proximity to or within the connectable component. A component identifier 456 is associated with the connectable component 432. For clarity of FIG. 10, a respective component identifier associated with the connectable component 430, 434, 436, 438, 440, 442, 444, 446 is not shown.

In prior systems, a connectable component is not selectable to cause each routable component connected to that connectable component to become highlighted if un-highlighted or to become un-highlighted if highlighted. Similarly, in the prior systems, a component identifier on a routing diagram is not selectable to cause a menu, such as the menu 640 (shown in FIG. 20), to be displayed.

A node on a routing diagram can include a representation of where two or more segments of a routable component meet. For a routing diagram arranged as a wiring diagram, a node can, but need not necessarily, represent a wire splice or junction at which two or more wires meet, a connector pin, a connector terminal, or a ground lug. For a routing diagram arranged as an optical cable diagram, a node can, but need not necessarily, represent an optical cable splice or junction at which two or more optical cables meet, a connector pin, or a connector terminal. For a routing diagram arranged as a hydraulic or pneumatic line diagram, a node can, but need not necessarily, represent a tee connector, a line coupling, or a line tap. Additionally or alternatively, a node on a routing diagram can include a change-diagram node that represents a segment of a routable component continues on another routing diagram.

Figure 11:
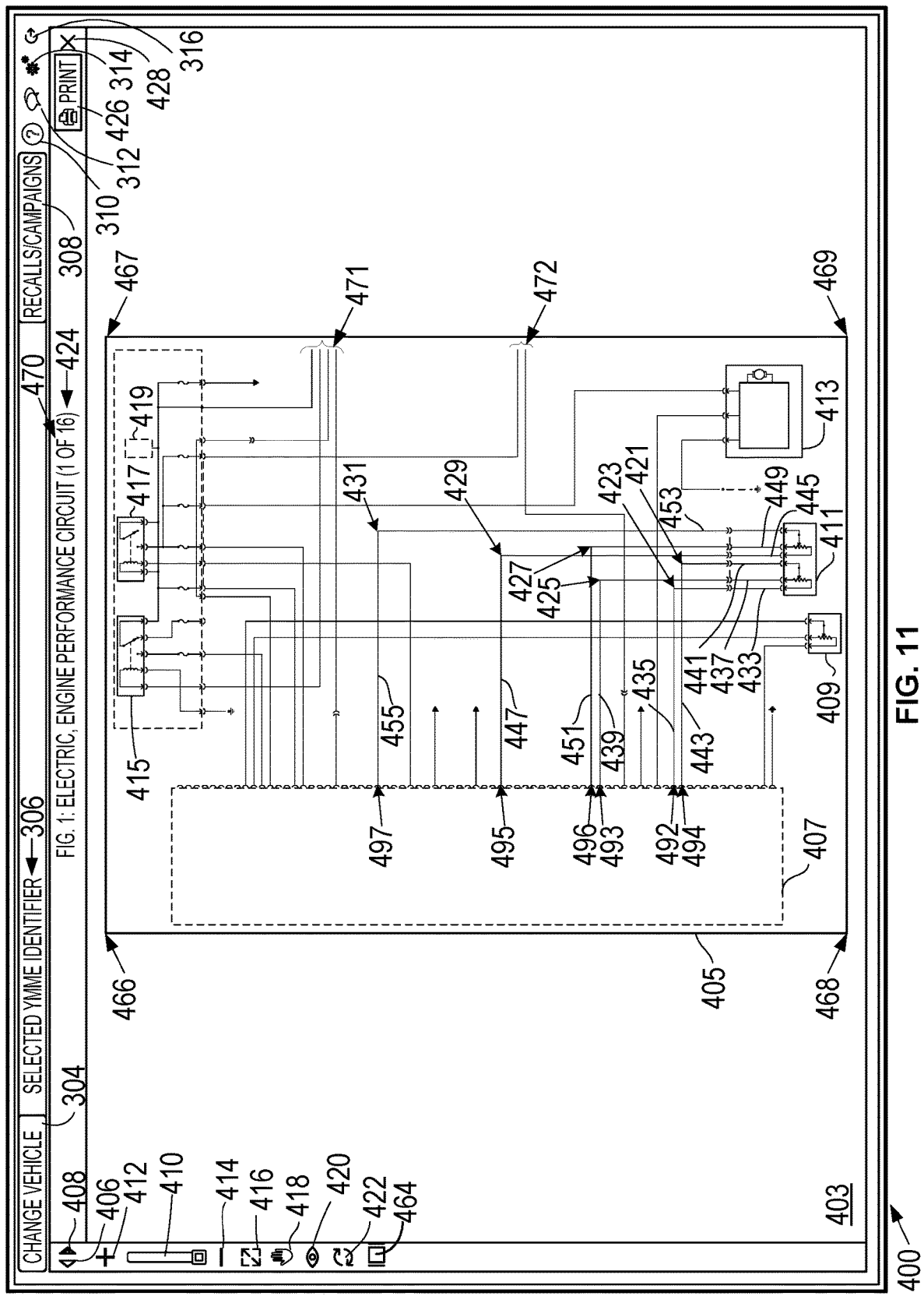

Next, FIG. 11 shows a screen shot 400 of a display, such as the display 108. Compared to the screen shot 399 shown in FIG. 10, the screen shot 400 shows that the GUI 403 includes a routing diagram 405 instead of the routing diagram 404, and the routing diagram identifier 424 on the GUI 403 indicates the routing diagram 405 is for an engine performance circuit instead of an automatic air conditioning circuit with navigation. The routing diagram 405 includes a corner 466, 467, 468, 469.

The routing diagram 405 includes a connectable component 407, 409, 411, 413, 415, 417, 419. The routing diagram includes a routable component 421, 423, 425, 427, 429, 431 among other routable components. The routable component 421 includes a routable component segment 433, 435. The routable component 423 includes a routable component segment 437, 439. The routable component 425 includes a routable component segment 441, 443. The routable component 427 includes a routable component segment 445, 447. The routable component 429 includes a routable component segment 449, 451. The routable component 431 includes a routable component segment 453, 455. For clarity of the routing diagram 405, component identifiers (e.g., a textual description of a connectable component) are not shown. In some implementations, however, each connectable component on a routing diagram is identifiable by a component identifier located within or in proximity to the connectable component.

The routing diagram 405 and components within the routing diagram 405 are associated with one or more pairs of coordinates. In at least some implementations, the coordinates are referred to as X coordinates and Y coordinates. In those implementations, each coordinate pair includes an X coordinate and a Y coordinate. Each coordinate pair can pertain to a pixel of the display 108. In accordance with an example implementation, the routing diagram 405 covers 600,000 pixels arranged in 1,000 rows and 600 columns. Table 1 below shows a coordinate pair for each of drawing reference numbers 466 to 491 (shown in FIG. 11, FIG. 12, and/or FIG. 13).

TABLE 1

| Drawing Reference Number | X Coordinate | Y Coordinate |
| --- | --- | --- |
| 466 | 0 | 0 |
| 467 | 599 | 0 |
| 468 | 0 | 999 |
| 469 | 599 | 999 |
| 370 | 285 | 990 |
| 371 | 315 | 990 |
| 372 | 285 | 970 |
| 373 | 315 | 970 |
| 474 | 289 | 967 |
| 475 | 292 | 967 |
| 476 | 298 | 967 |
| 477 | 302 | 967 |
| 478 | 308 | 967 |
| 479 | 311 | 967 |
| 480 | 289 | 920 |
| 481 | 292 | 920 |
| 482 | 298 | 920 |
| 483 | 302 | 920 |
| 484 | 308 | 920 |
| 485 | 311 | 920 |
| 486 | 289 | 917 |
| 487 | 292 | 917 |
| 488 | 298 | 917 |
| 489 | 302 | 917 |
| 490 | 308 | 917 |
| 491 | 311 | 917 |

The routing diagram identifier 424 in the screen shot 400 includes an indicator 470 that indicates the routing diagram 405 is "1 of 16", i.e., a first routing diagram of sixteen related routing diagrams. The routing diagram 405 includes a bracket 471, 472 to indicate a set of change-diagram nodes. A change-diagram node indicates that a routable component continues on another routing diagram. In accordance with the implementation shown in FIG. 11, the routable component continues on a second routing diagram of the sixteen related routing diagrams. The routing diagram selector 408 could be used to cause the display to show "FIG. 2: Routing Diagram Identifier (2 of 16)" in the routing diagram identifier 424, where the Routing Diagram Identifier includes a textual description of that figure on the GUI.

The routing diagram 405 includes additional routable components in addition to the routable components 421 to 431. In FIG. 11, routable components 421, 423, 425, 427, 429, 431 and all other routable components in the routing diagram 405 are un-highlighted.

Figure 12:
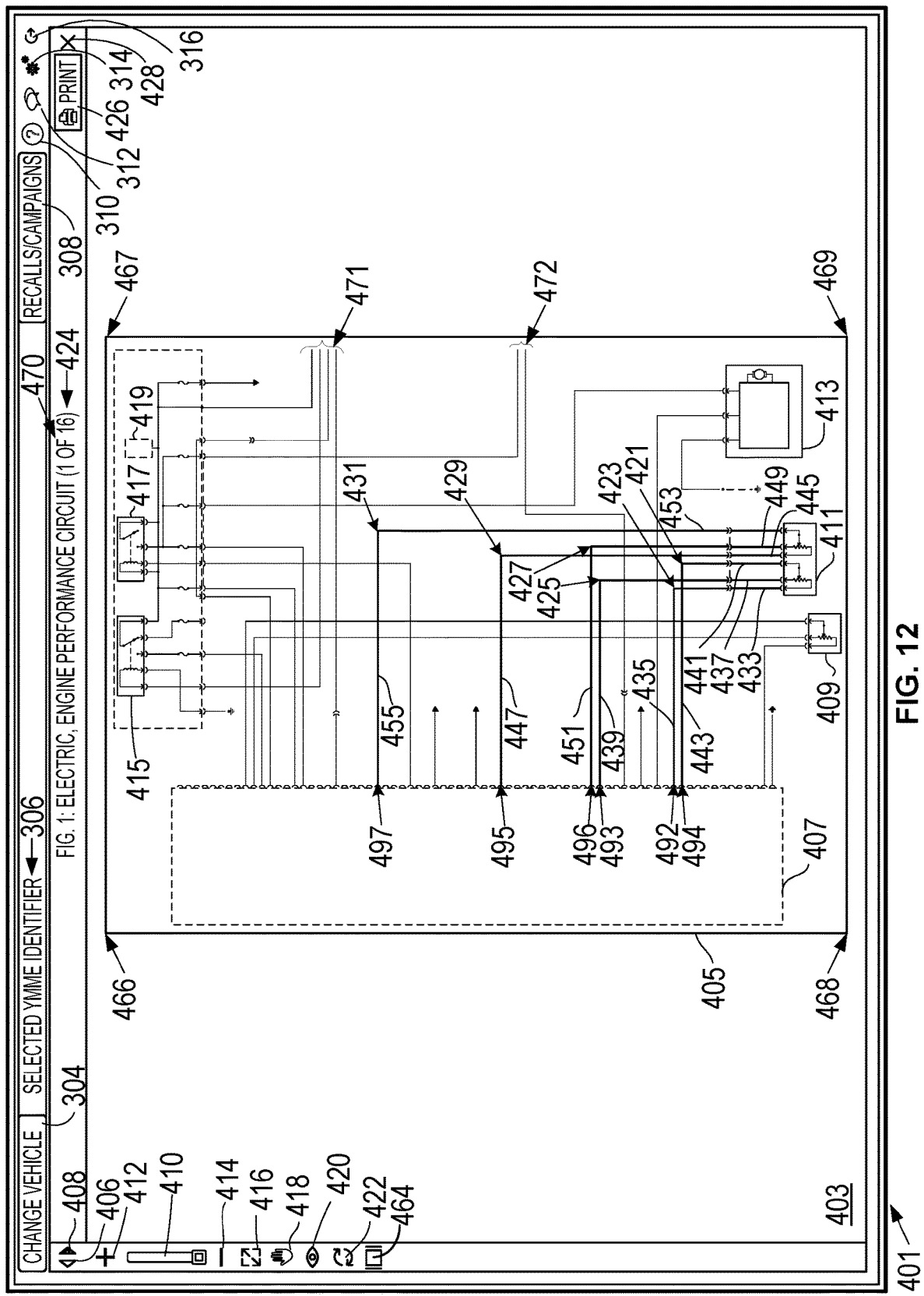

Next, FIG. 12 shows a screen shot 401 of a display, such as the display 108. The screen shot 401 shows a variation of the GUI 403 shown in FIG. 11. In the screen shot 401, the routable components 421, 423, 425, 427, 429, 431 in the routing diagram 405 are highlighted and all other routable components in the routing diagram 405 are un-highlighted. In an example implementation, the processor 102 can highlight the routable components 421, 423, 425, 427, 429, 431 in response to the processor 102 determining that the connectable component 411 has been selected. In accordance with that implementation, the processor 102 causes multiple routable components leading to and/or from the selected connectable component to be highlighted in response to a single selection from the routing diagram 405.

In accordance with an example implementation, the processor 102 can determine that the connectable component 411 is disposed on the routing diagram 405 within an area bounded by the corners 370, 371, 372, 373 and/or within an area bounded by coordinates associated with the corners 370, 371, 372, 373. Referring to Table 1, an area bounded by the coordinates associated with the corners 370, 371, 372, 373 includes an area bounded by the coordinates 285 to 315 in the X direction and the coordinates 970 to 990 in the Y direction. The processor 102 can determine the connectable component is selected by determining that a selection on the display within the area bounded by the coordinates 285 to 315 in the X direction and the coordinates 970 to 990 in the Y direction is made.

The perimeter of the area bounded by the coordinates 285 to 315 in the X direction and the coordinates 970 to 990 include the following coordinate pairs written in the form (x coordinate, y coordinate): (285, 970), (285, 971), (285, 972), (285, 973), (285, 974), (285, 975), (285, 976), (285, 977), (285, 978), (285, 979), (285, 980), (285, 981), (285, 982), (285, 983), (285, 984), (285, 985), (285, 986), (285, 987), (285, 988), (285, 989), (285, 990), (286, 970), (287, 970), (288, 970), (289, 970), (290, 970), (291, 970), (292, 970), (293, 970), (294, 970), (295, 970), (296, 970), (297, 970), (298, 970), (299, 970), (300, 970), (301, 970), (302, 970), (303, 970), (304, 970), (305, 970), (306, 970), (307, 970), (308, 970), (309, 970), (310, 970), (311, 970), (312, 970), (313, 970), (314, 970), (315, 970), (315, 971), (315, 972), (315, 973), (315, 974), (315, 975), (315, 976), (315, 977), (315, 978), (315, 979), (315, 980), (315, 981), (315, 982), (315, 983), (315, 984), (315, 985), (315, 986), (315, 987), (315, 988), (315, 989), (315, 990), (286, 990), (287, 990), (288, 990), (289, 990), (290, 990), (291, 990), (292, 990), (293, 990), (294, 990), (295, 990), (296, 990), (297, 990), (298, 990), (299, 990), (300, 990), (301, 990), (302, 990), (303, 990), (304, 990), (305, 990), (306, 990), (307, 990), (308, 990), (309, 990), (310, 990), (311, 990), (312, 990), (313, 990), and (314, 990).

The computing system 100 is not limited to highlighting multiple routable components in a routing diagram in response to a single selection from the routing diagram. For example, starting with the routing diagram as shown in the screen shot 400 in FIG. 11, the routable component segment 433, 435, 437, 439, 441, 443, 445, 447, 449, 451, 453, 455 can be individually selected, in any order, to cause to the processor 102 to highlight each of those routable component segments in the order selected. As a result of making those individual selections, the routing diagram 405 appears as shown in the screen shot 400. As another example, starting with the routing diagram as shown in the screen shot 400 in FIG. 11, the routable components 421, 423, 425, 427, 429, 431 can be individually selected, in any order, to cause to the processor 102 to highlight each of those routable components in the order selected. As a result of making those individual selections, the routing diagram 405 appears as shown in the screen shot 401.

Figure 13:
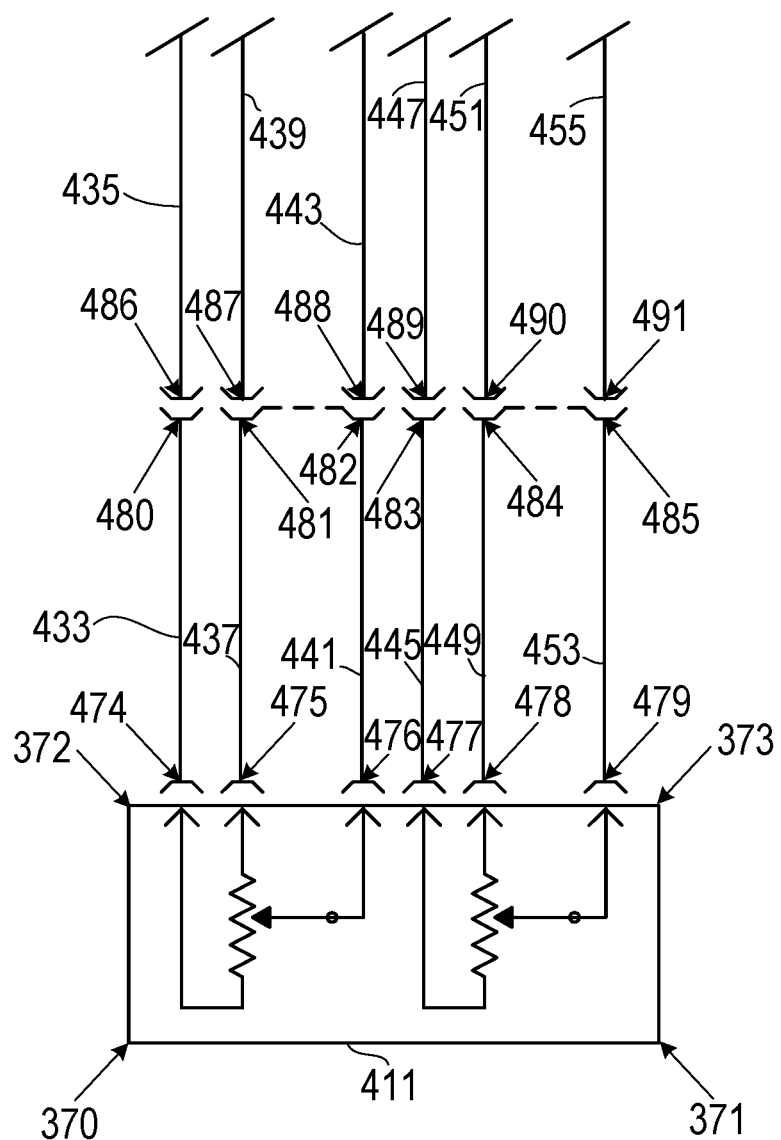
FIG. 13 shows a partial view of the screen shots shown in FIG. 11 and FIG. 12.

Next, FIG. 13 shows a partial view of the screen shot 400, 401. In particular, FIG. 13 shows the connectable component 411, the routable component segment 433, 437, 441, 445, 449, 453, and a portion of the routable component segment 435, 439, 443, 447, 451, 455. Furthermore, FIG. 13 shows a corner 370, 371, 372, 373 of the connectable component 411.

A routable component segment can include a routable component segment end. In at least some implementations, each routable component segment includes two routable component segment ends at opposite ends of the routable component segment. The routable component segment 433 includes a routable component segment end 474, 480. The routable component segment 437 includes a routable component segment end 475, 481. The routable component segment 441 includes a routable component segment end 476, 482. The routable component segment 445 includes a routable component segment end 477, 483. The routable component segment 449 includes a routable component segment end 478, 484. The routable component segment 453 includes a routable component segment end 479, 485. The routable component segment 435, 439, 443, 447, 451, 455 include a routable component segment end 486, 487, 488, 489, 490, 491, respectively. As shown in FIG. 11 and FIG. 12, the routable component segment 435, 439, 443, 447, 451, 455 also include a routable component segment end 492, 493, 494, 495, 496, 497, respectively.

Figure 14:
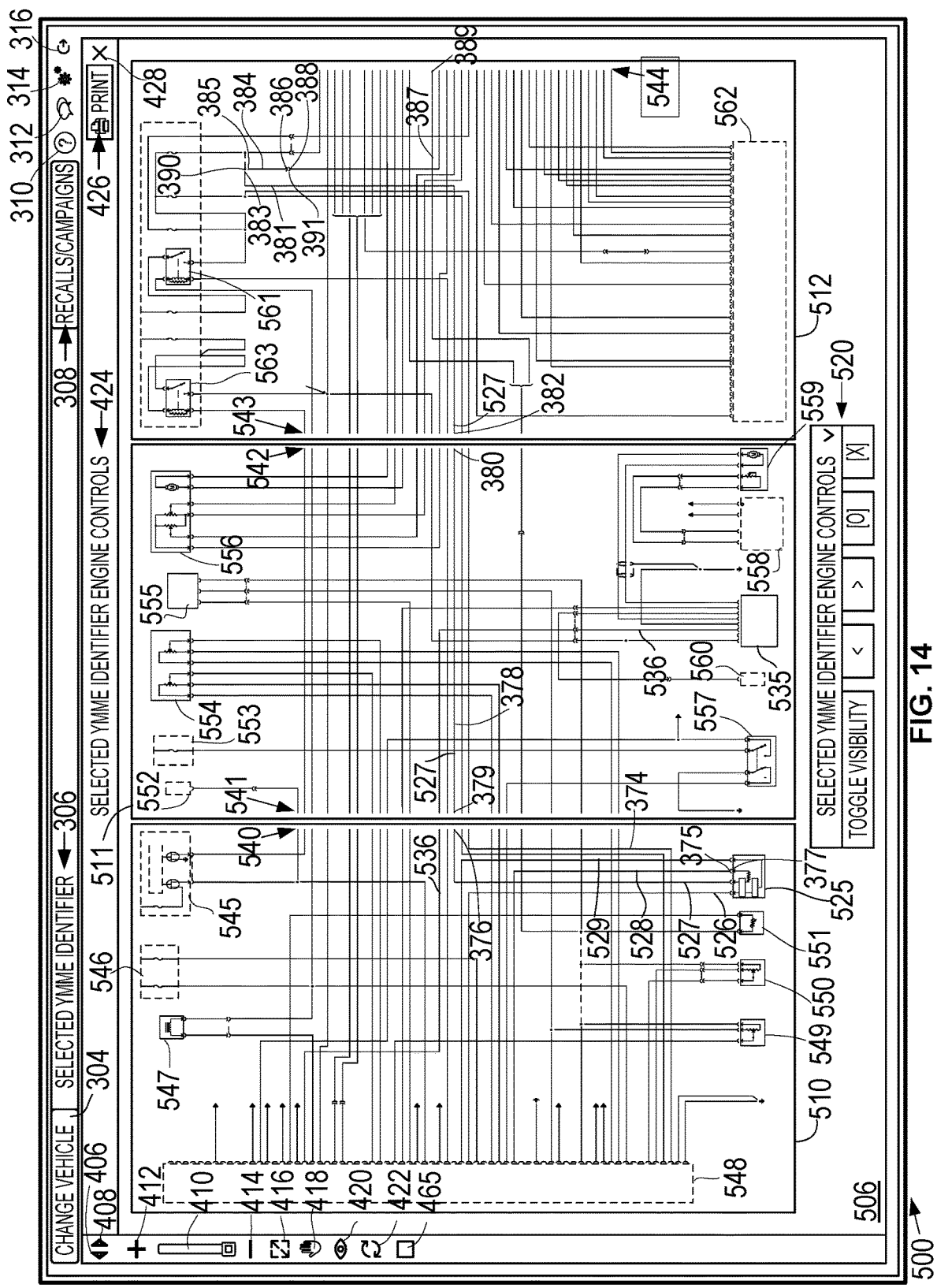
FIG. 14, FIG. 15, FIG. 16, FIG. 17, FIG. 18, FIG. 19, FIG. 20, FIG. 21, FIG. 22, FIG. 23, FIG. 24, FIG. 25, FIG. 26, and FIG. 27 show screen shots of a display in accordance with the example implementation(s) described herein.

Next, FIG. 14 shows a screen shot 500 of a display, such as the display 108. The screen shot 500 includes a GUI 506. The GUI 506 includes a routing diagram 510, 511, 512 and a single-diagram view selector 465. Accordingly, the GUI 506 shows that a GUI can include multiple routing diagrams. The routing diagram 510, 511, 512 each includes multiple connectable components and multiple routable components. In particular, the routing diagram 510 includes a connectable component 525, 545, 546, 547, 548, 549, 550, 551, the routing diagram 511 includes a connectable component 535, 552, 553, 554, 555, 556, 557, 558, 559, 560 and the routing diagram 512 includes a connectable component 561, 562, 563. The GUI 506 includes a user control interface 520 that includes controls selectable to make selections to change what routing diagrams are displayed on the GUI 506 and/or how the displayed routing diagrams appear within the GUI 506.

The routing diagram 510 includes a routable component 526, 527, 528, 529, 536, among other routable components that are not labeled. The routing diagram 511 includes the routable component 527, 536, among other routable components that are not labeled. The routing diagram 512 includes the routable component 527 among other routable components that are not labeled. All of the routable components of the routing diagram 510, 511, 512 are shown as not highlighted in FIG. 14.

The routable component 526, 528, 529 are connectable to the connectable component 525 and to the connectable component 548. The routable component 536 is connectable to the connectable component 535 and to the connectable component 548. A respective portion of the routable component 536 is disposed both on the routing diagram 510 and the routing diagram 511. A respective portion of the routable component 527 is disposed on the routing diagram 510, the routing diagram 511, the routing diagram 512 and at least one other routing diagram.

Each routing diagram 510, 511, 512 and at least one other routing diagram (not shown) is part of a set of routing diagrams. Each routing diagram of the set of routing diagrams can be associated with the diagram subject indicated by the routing diagram identifier 424. The routing diagram 510 includes a set of change-diagram nodes 540. A change-diagram node is an end of a routable component shown at an edge of a routing diagram. The routing diagram 511 includes a set of change-diagram nodes 541 and a set of change-diagram nodes 542. The routing diagram 512 includes a set of change-diagram nodes 543 and a set of change-diagram nodes 544. Each change-diagram node of the set of change-diagram nodes 540 corresponds to a respective change-diagram node of the set of change-diagram nodes 541. Each change-diagram node of the set of change-diagram nodes 542 corresponds to a respective change-diagram node of the set of change-diagram nodes 543. Each change-diagram node of the set of change-diagram nodes 544 corresponds to a respective change-diagram node of a set of change-diagram nodes (not shown) on another routing diagram of the set of routing diagrams.

The set of change-diagram nodes 540 and the set of change-diagram nodes 541 both include twenty-four change-diagram nodes. The set of change-diagram nodes 542 and the set of change-diagram nodes 543 both include seventeen change-diagram nodes. The set of change-diagram nodes 544 includes thirty-seven change-diagram nodes.

The routable component 527 includes multiple routable component segments including at least (1) a routable component segment 374 that extends from a routable component segment end 375 to a change-diagram node 376, (2) a routable component segment 378 that extends from a change-diagram node 379 to a change-diagram node 380, (3) a routable component segment 381 that extends from a change-diagram node 382 to a routable component segment end 383, (4) a routable component segment 384 that extends from a routable component segment end 385 to a routable component segment end 386, and (5) a routable component segment 387 that extends from a routable component segment end 388 to a change-diagram node 389. The routable component segment end 375 is connectable to the connectable component 525 at a node 377. The routable component segment end 383 and the routable component segment end 385 meet at a node 390. The routable component segment end 386 and the routable component segment end 388 meet at a node 391.

The routable component segment end 375 and the change-diagram node 376 can be associated with a respective x coordinate and y coordinate of the routing diagram 510. The change-diagram node 379 and the change-diagram node 380 can be associated with a respective x coordinate and y coordinate of the routing diagram 511. The change-diagram node 382, the routable component segment end 383, the routable component segment end 385, the routable component segment end 386, the routable component segment end 388, and the change-diagram node 389 can be associated with a respective x coordinate and y coordinate of the routing diagram 512.

A routable component segment on a routing diagram can be associated with a set of x-y coordinate pairs that are indicative of a path of the routable component segment. The set of X-Y coordinate pairs can includes a respective X-Y coordinate pairs for each routable component segment end of that routable component segment. In at least some implementations, a unique routable component segment identifier is associated with each routable component segment, and a multi-segmented routable component is associated with multiple routable component segment identifiers. In at least some other implementations, each routable component segment of a multi-segmented routable component is associated with a common routable component identifier. A file including a routing diagram can include the multiple routable component segment identifiers and/or the common routable component identifier.

The processor 102 can determine the single-diagram view selector 465 is selected and responsively cause the display 108 to switch from displaying multiple routing diagrams to displaying a single routing diagram, such as a single routing diagram that is in focus at a time the single-diagram view selector 465 is selected. The description of FIG. 28 and FIG. 29 discuss a routing diagram being in focus.

Figure 15:
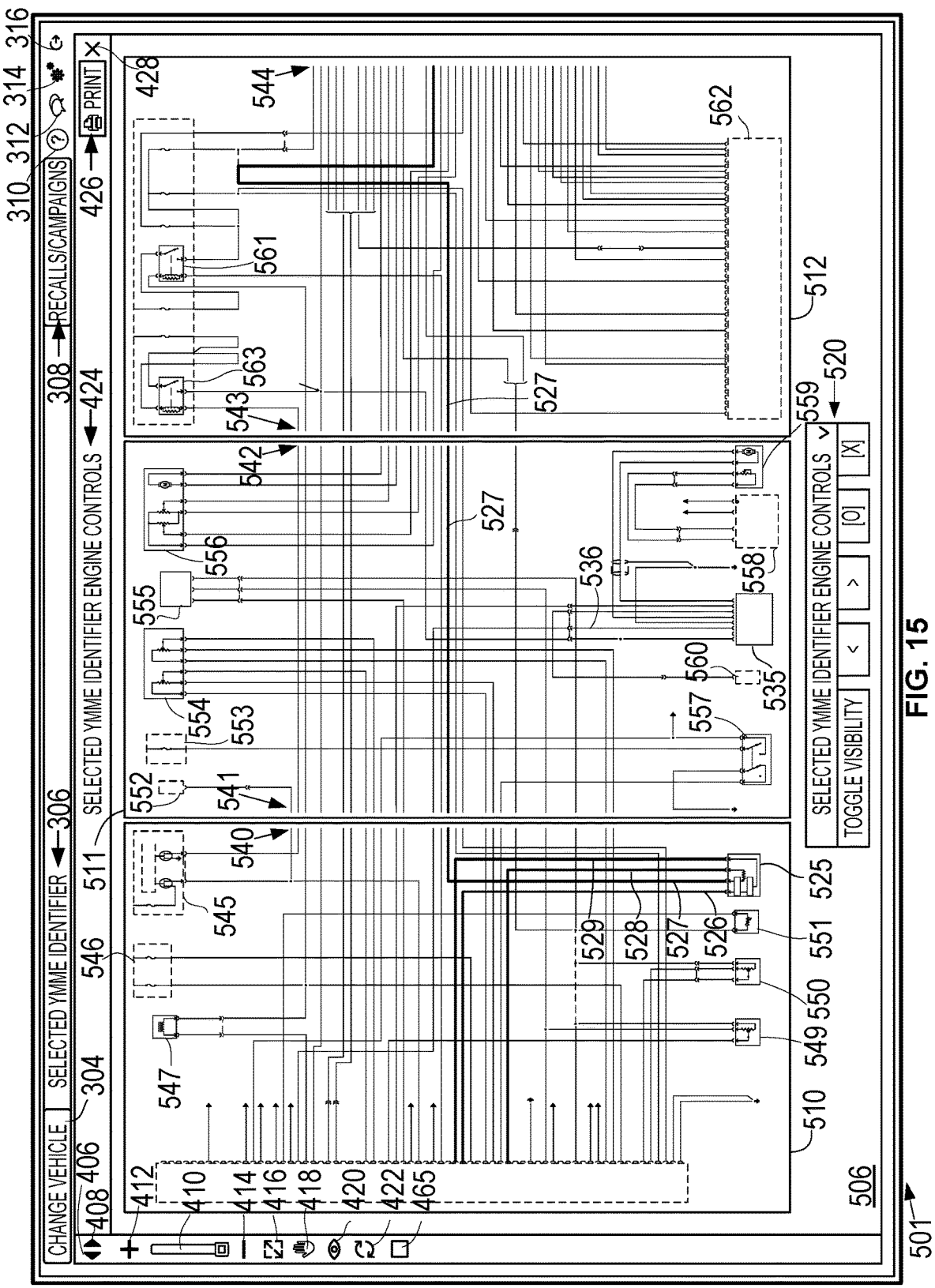

Next, FIG. 15 shows a screen shot 501 of a display, such as the display 108. The screen shot 501 shows a variation of the GUI 506 shown in FIG. 14. In this variation, the routable component 526, 527, 528, 529 is highlighted. The processor 102 can cause the routable component 526, 527, 528, 529 to be highlighted in response to the connectable component 525 being selected from the routing diagram 510. The routable component 527 extends from the routing diagram 510 to the routing diagram 511, from the routing diagram 511 to the routing diagram 512, and from the routing diagram 512 to another routing diagram (not shown).

When the routable component 526, 527, 528, 529 is highlighted in the routing diagram 510 (as shown in FIG. 15), the processor 102 can cause the routable component 526, 527, 528, 529 to be un-highlighted (as shown in FIG. 14) in response to the connectable component 525 being selected from the routing diagram 510. Accordingly, multiple routable components in a routing diagram can be highlighted or un-highlighted in response to a single selection of the connectable component to which the multiple routable components extend.

The routable component 527 includes the routable component segment 374, 378, 381, 384, 387. Highlighting the routable component 527 from end-to-end can include (1) the processor 102 determining that the routable component segment end 375 of the routable component segment 374 is within a threshold number of pixels of the connectable component 525, (2) the processor 102 determining that the routable component segment 378 includes the change-diagram node 379 that corresponds to the change-diagram node of the routable component segment 374, (3) the processor 102 determining that the routable component segment 381 includes the change-diagram node 382 that corresponds to the change-diagram node 380 of the routable component segment 378, (4) the processor 102 determining that the routable component segment 384 includes a routable component segment end 385 within a threshold number of pixels of the routable component segment end 383 of the routable component segment 384, and (5) the processor 102 determining that the routable component segment 387 includes a routable component segment end 388 within a threshold number of pixels of the routable component segment end 386 of the routable component segment 384.

Figure 16:
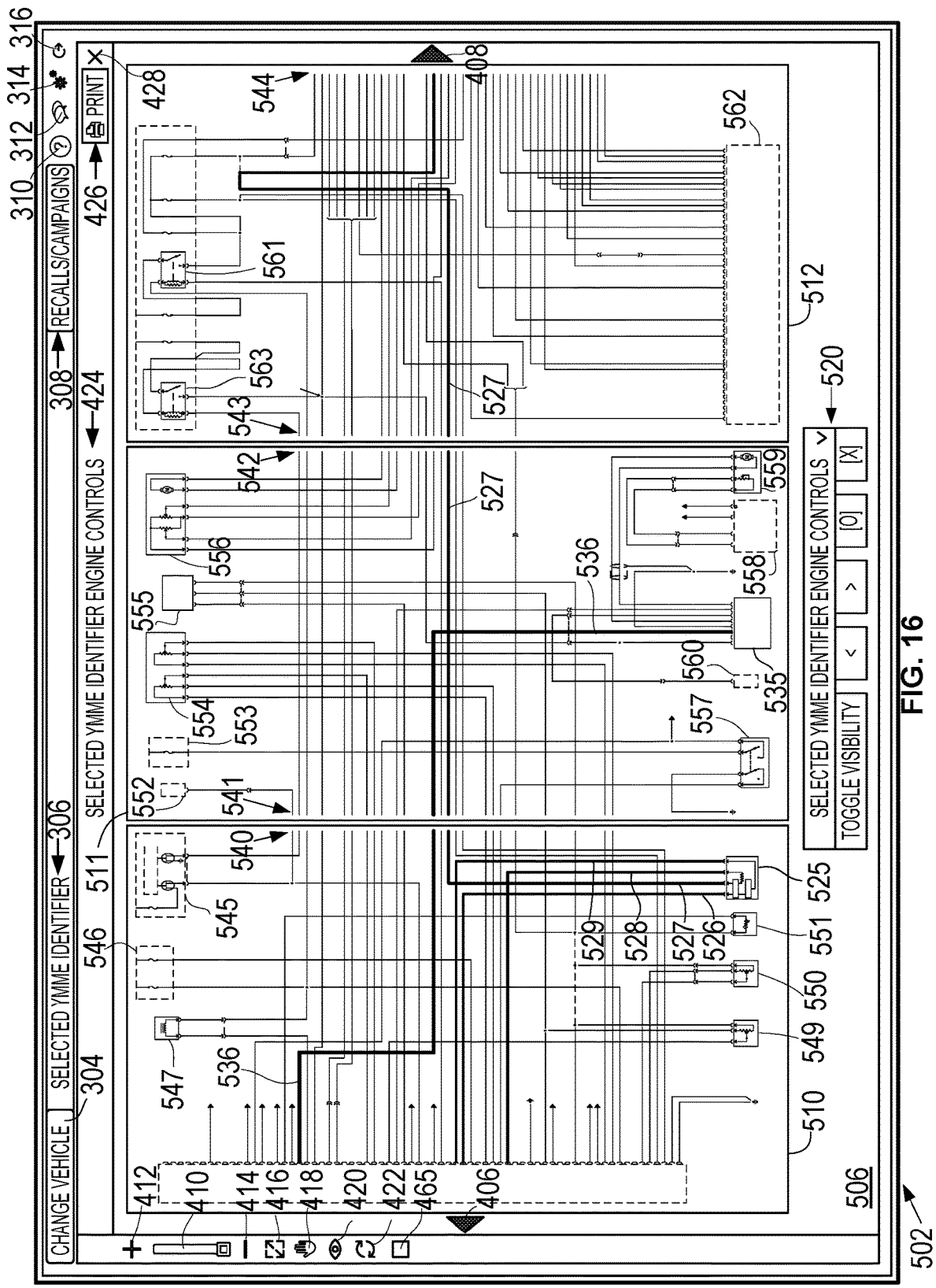
Figure 17:
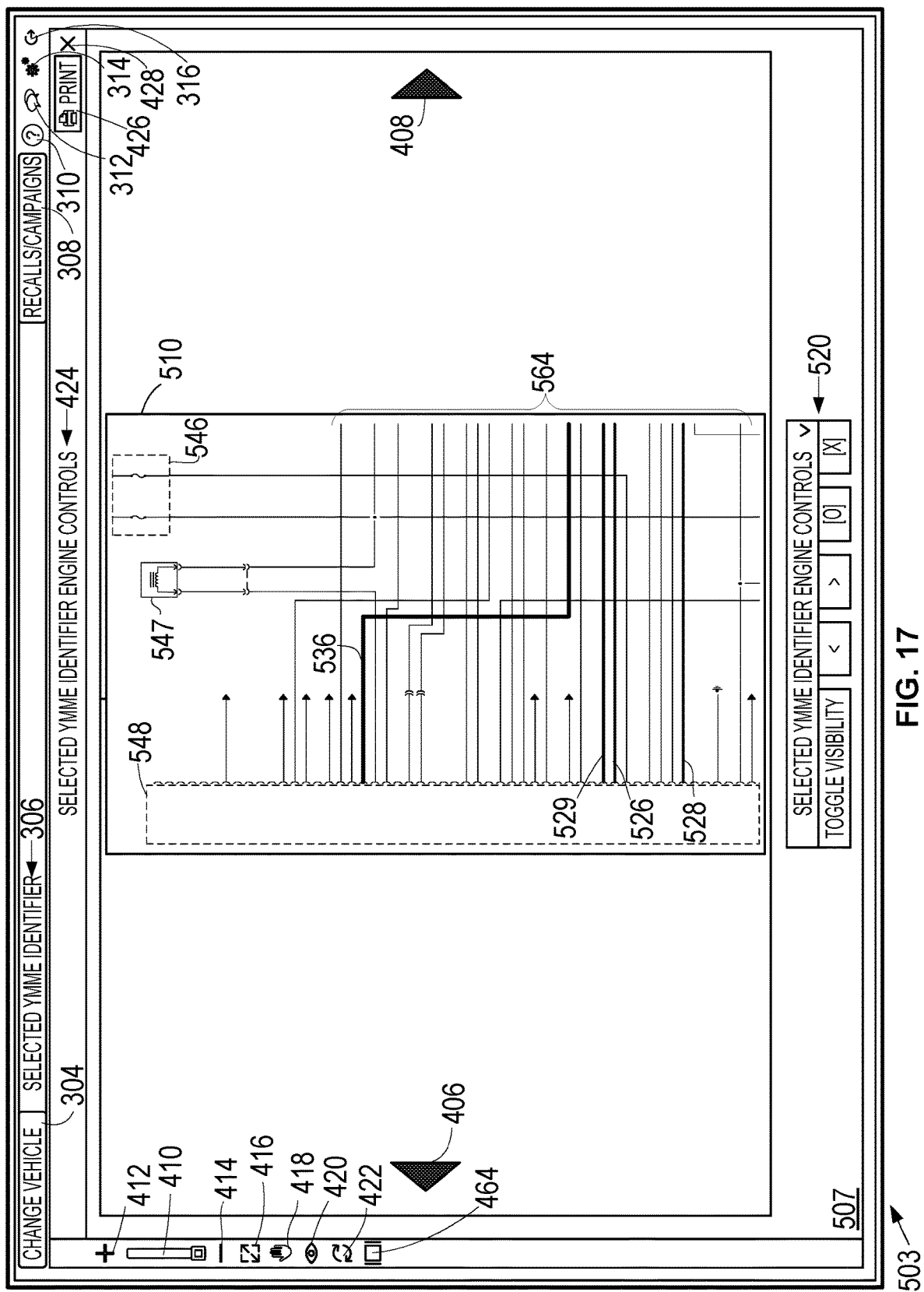

Next, FIG. 16 shows a screen shot 502 of a display, such as the display 108. The screen shot 502 shows a variation of the GUI 506 shown in FIG. 14 and in FIG. 15. In this variation, the routable component 526, 527, 528, 529, 536 is highlighted. The processor 102 can cause the routable component 536 to be highlighted in response to the routable component 536 being selected from the routing diagram 510 or the routing diagram 511. The highlighting of the routable component 536 extends from the connectable component 535 to the connectable component 548. The highlighting of the routable component 536 in the routing diagram 510 extends to a change-diagram node of the set of change-diagram nodes 540. The highlighting of the routable component 536 continues at a respective change-diagram of the set of change-diagram nodes 541. FIG. 16 and FIG. 17 show a variation of the routing diagram selector 406 and the routing diagram selector 408. In this variation, the routing diagram selector 406 displayed in proximity to a left edge of the displayed GUI and the routing diagram selector 408 is displayed in proximity to a right edge of the displayed GUI. In accordance with this variation or any other variation of a GUI including the routing diagram selector 406, 408, the routing diagram selector 406 may be disabled when a left-most routing diagram of a set of multiple routing diagrams is displayed on the display 108 and the routing diagram selector 408 may be displayed when a right-most routing diagram of the set of multiple routing diagrams is displayed on the display.

Next, FIG. 17 shows a screen shot 503 of a display, such as the display 108. The screen shot 503 includes a GUI 507. The GUI 507 shows an upper left portion of the routing diagram 510. In at least some implementations, the GUI 507 can show the upper left portion of the routing diagram 510 in response to the processor 102 determining that the routing diagram 510 is selected from the GUI 506 and then determining the zoom user-selectable control 410 and/or the zoom-in selector 412 is used to zoom in within the routing diagram 510. In those or in other implementations, the GUI 507 can alternatively show the upper left portion of the routing diagram 510 by toggling visibility of the routing diagram 511, 512 from the GUI 506 using the user control interface 520 and then zooming in within the routing diagram 510 using the zoom user-selectable control 410 and/or the zoom-in selector 412.

The GUI 507 shows that the routable component 526, 528, 529, 536 as highlighted. Those routable components, among other(s), are highlighted in the screen shot 502 (shown in FIG. 16). The other routable components shown in FIG. 17 are un-highlighted. The processor 102 can be configured to cause the display 108 to continue displaying a routable component as highlighted or at least a portion of the routable component as highlighted in a new view of a routing diagram including the routable component or the portion of the routable component if that routable component or a portion of the routable component was highlighted on the display at the time a request to display the new view of the routable diagram was made.

Moreover, the processor 102 can be configured to cause the display 108 to display a routable component as highlighted or at least a portion of the routable component as highlighted in a new view of the routable component if that routable component is part of a set of routable components that have been selected to currently be highlighted, regardless of whether any portion of the routable component was displayed on the display at the time a request to display the new view of the routing diagram was made. As an example, the request to display the new view of the routing diagram (that results in displaying the routing diagram 510 as shown in FIG. 17) can include selecting the routing diagram selector 406 once while the routing diagram 511 is displayed (as shown in FIG. 18), or selecting the routing diagram selector 406 twice while the routing diagram 512 is displayed (as shown in FIG. 19), or selecting the routing diagram selector 406 three times while a routing diagram that includes a set of change-diagram nodes that correspond to the set of change-diagram nodes 568 shown in FIG. 19.

FIG. 17 also shows the connectable component 546, 547, 548 and a set of change-diagram nodes 564. The set of change-diagram nodes 564 shown in a partial view of routing diagram 510 includes twenty-one change-diagram nodes, whereas the set of change-diagram nodes 540 shown in the full view of the routing diagram 510 shown in FIG. 16 includes twenty-four change-diagram nodes. Accordingly, FIG. 17 shows that a quantity of change-diagram nodes visible on a routing diagram can change in response to changing a zoom setting for the displayed routing diagram.

Figure 18:
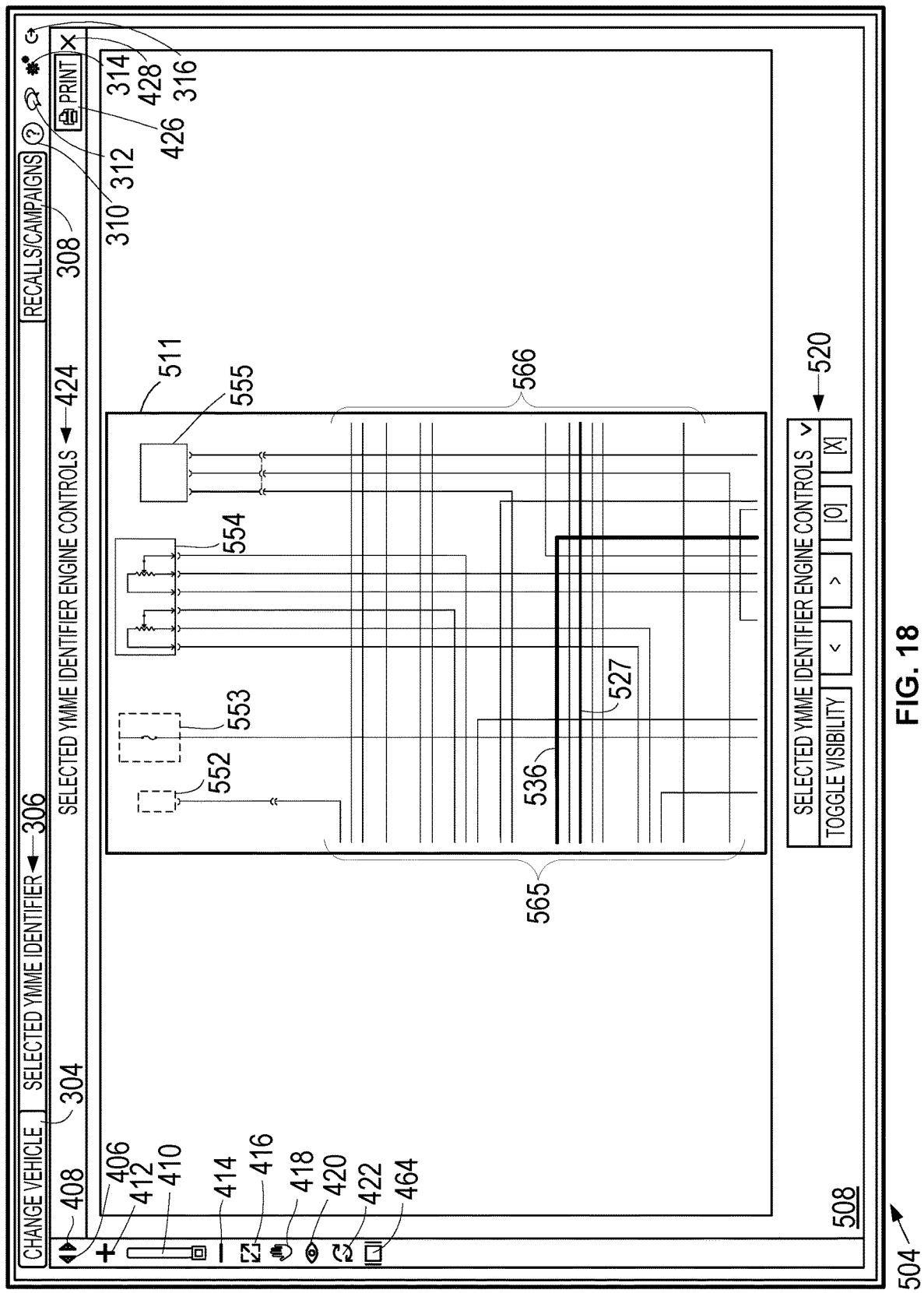
Figure 19:
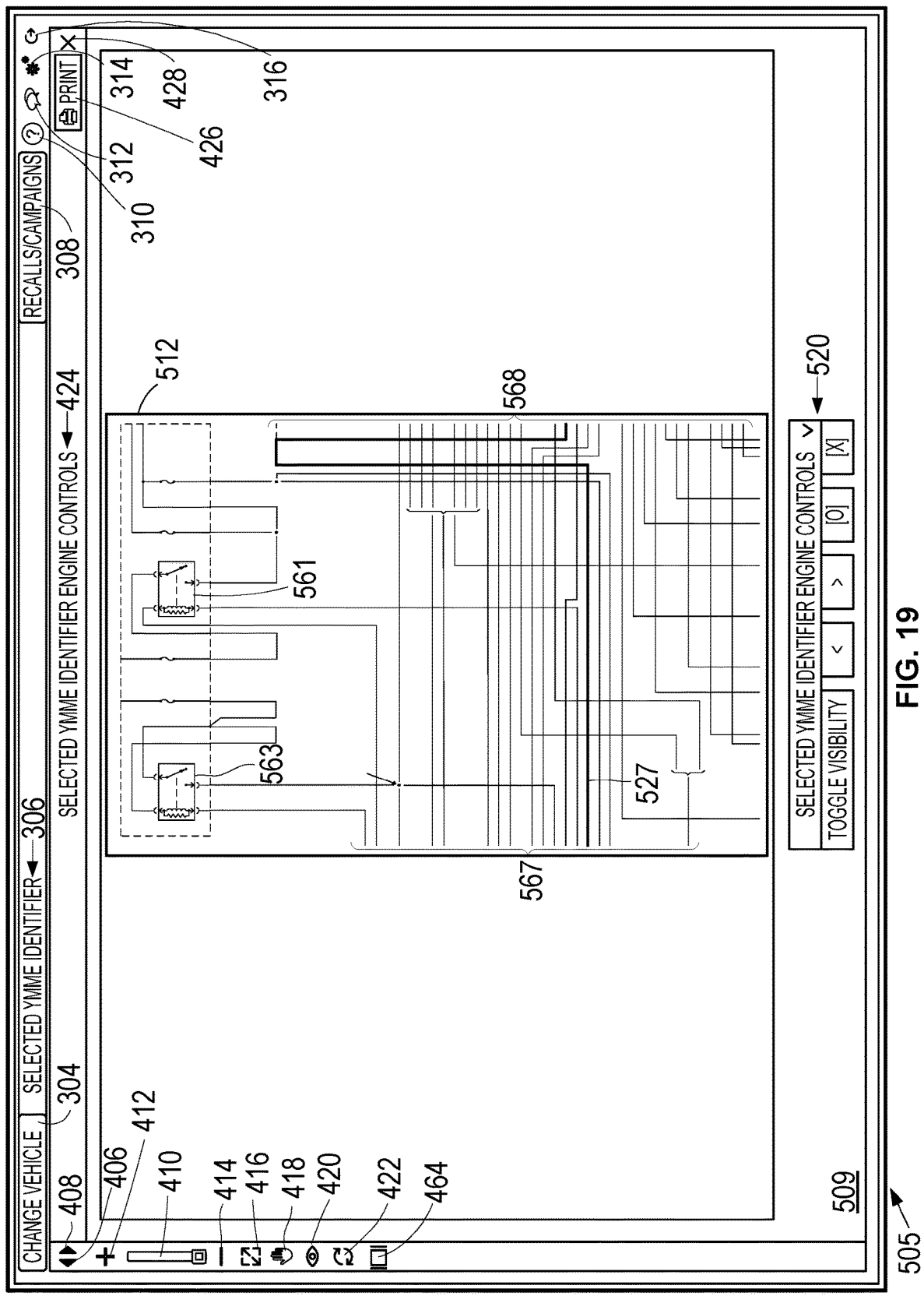

Next, FIG. 18 shows a screen shot 504 of a display, such as the display 108. The screen shot 504 includes a GUI 508. The GUI 508 shows an upper left portion of the routing diagram 511. In at least some implementations, the GUI 508 can show the upper left portion of the routing diagram 511 in response to the processor 102 determining that the routing diagram 511 is selected from the GUI 506 and then determining the zoom user-selectable control 410 and/or the zoom-in selector 412 is used to zoom in within the routing diagram 511. In those or in other implementations, the GUI 508 can alternatively show the upper left portion of the routing diagram 511 by toggling visibility of the routing diagram 510, 512 from the GUI 506 using the user control interface 520 and then zooming in within the routing diagram 511 using the zoom user-selectable control 410 and/or the zoom-in selector 412.

The GUI 508 shows that the routable component 527, 536 as highlighted. Those routable components, among other(s), are highlighted in the screen shot 502 (shown in FIG. 16). The other routable components shown in FIG. 18 are un-highlighted. The processor 102 can be configured to cause the display 108 to continue displaying a routable component as highlighted or at least a portion of the routable component as highlighted in a new view of a routing diagram including the routable component or the portion of the routable component if that routable component or a portion of the routable component was highlighted on the display at the time a request to display the new view of the routable diagram was made.

Moreover, the processor 102 can be configured to cause the display 108 to display a routable component as highlighted or at least a portion of the routable component as highlighted in a new view of the routable component if that routable component is part of a set of routable components that have been selected to currently be highlighted, regardless of whether any portion of the routable component was displayed on the display at the time a request to display the new view of the routing diagram was made. As an example, the request to display the new view of the routing diagram (that results in displaying the routing diagram 511 as shown in FIG. 18) can include selecting the routing diagram selector 406 once while the routing diagram 512 is displayed (as shown in FIG. 19), or selecting the routing diagram selector 406 twice while a routing diagram that includes a set of change-diagram nodes that correspond to the set of change-diagram nodes 568 shown in FIG. 19, or selecting the routing diagram selector 408 once while the routing diagram 510 is displayed (as shown in FIG. 17).

FIG. 18 also shows the connectable component 552, 553, 554, 555 and a set of change-diagram nodes 565, 566. The set of change-diagram nodes 565 shown in a partial view of routing diagram 511 includes twenty-one change-diagram nodes, whereas the set of change-diagram nodes 541 shown in the full view of the routing diagram 511 shown in FIG. 16 includes twenty-four change-diagram nodes. Similarly, the set of change-diagram nodes 566 shown in the partial view of routing diagram 511 includes eleven change-diagram nodes, whereas the set of change-diagram nodes 542 shown in the full view of the routing diagram 511 shown in FIG. 16 includes seventeen change-diagram nodes. Accordingly, FIG. 18 also shows that a quantity of change-diagram nodes visible on a routing diagram can change in response to changing a zoom setting for the displayed routing diagram.

Next, FIG. 19 shows a screen shot 505 of a display, such as the display 108. The screen shot 505 includes a GUI 509. The GUI 509 shows an upper left portion of the routing diagram 512. In at least some implementations, the GUI 509 can show the upper left portion of the routing diagram 512 in response to the processor 102 determining that the routing diagram 512 is selected from the GUI 506 and then determining the zoom user-selectable control 410 and/or the zoom-in selector 412 is used to zoom in within the routing diagram 512. In those or in other implementations, the GUI 509 can alternatively show the upper left portion of the routing diagram 512 by toggling visibility of the routing diagram 510, 511 from the GUI 506 using the user control interface 520 and then zooming in within the routing diagram 512 using the zoom user-selectable control 410 and/or the zoom-in selector 412.

The GUI 509 shows that the routable component 527 as highlighted. That routable component, among other(s), is highlighted in the screen shot 502 (shown in FIG. 16). The other routable components shown in FIG. 19 are un-highlighted. The processor 102 can be configured to cause the display 108 to continue displaying a routable component as highlighted or at least a portion of the routable component as highlighted in a new view of a routing diagram including the routable component or the portion of the routable component if that routable component or a portion of the routable component was highlighted on the display at the time a request to display the new view of the routable diagram was made.

Moreover, the processor 102 can be configured to cause the display 108 to display a routable component as highlighted or at least a portion of the routable component as highlighted in a new view of the routable component if that routable component is part of a set of routable components that have been selected to currently be highlighted, regardless of whether any portion of the routable component was displayed on the display at the time a request to display the new view of the routing diagram was made. As an example, the request to display the new view of the routing diagram (that results in displaying the routing diagram 512 as shown in FIG. 19) can include selecting the routing diagram selector 406 once while a routing diagram that includes a set of change-diagram nodes that correspond to the set of change-diagram nodes 568 shown in FIG. 19, or selecting the routing diagram selector 408 twice while the routing diagram 510 is displayed (as shown in FIG. 17), or selecting the routing diagram selector 408 once while the routing diagram 511 is displayed (as shown in FIG. 18).

FIG. 19 also shows the connectable component 561, 563 and a set of change-diagram nodes 567, 568. The set of change-diagram nodes 567 shown in a partial view of routing diagram 512 and the set of change-diagram nodes 543 shown in the full view of the routing diagram 512 shown in FIG. 16 both include seventeen change-diagram nodes. In contrast, the set of change-diagram nodes 568 shown in the partial view of routing diagram 512 includes twenty-eight change-diagram nodes, whereas the set of change-diagram nodes 544 shown in the full view of the routing diagram 512 shown in FIG. 16 includes thirty-seven change-diagram nodes. Accordingly, FIG. 19 also shows that a quantity of change-diagram nodes visible on a routing diagram can change in response to changing a zoom setting for the displayed routing diagram.

Figure 20:
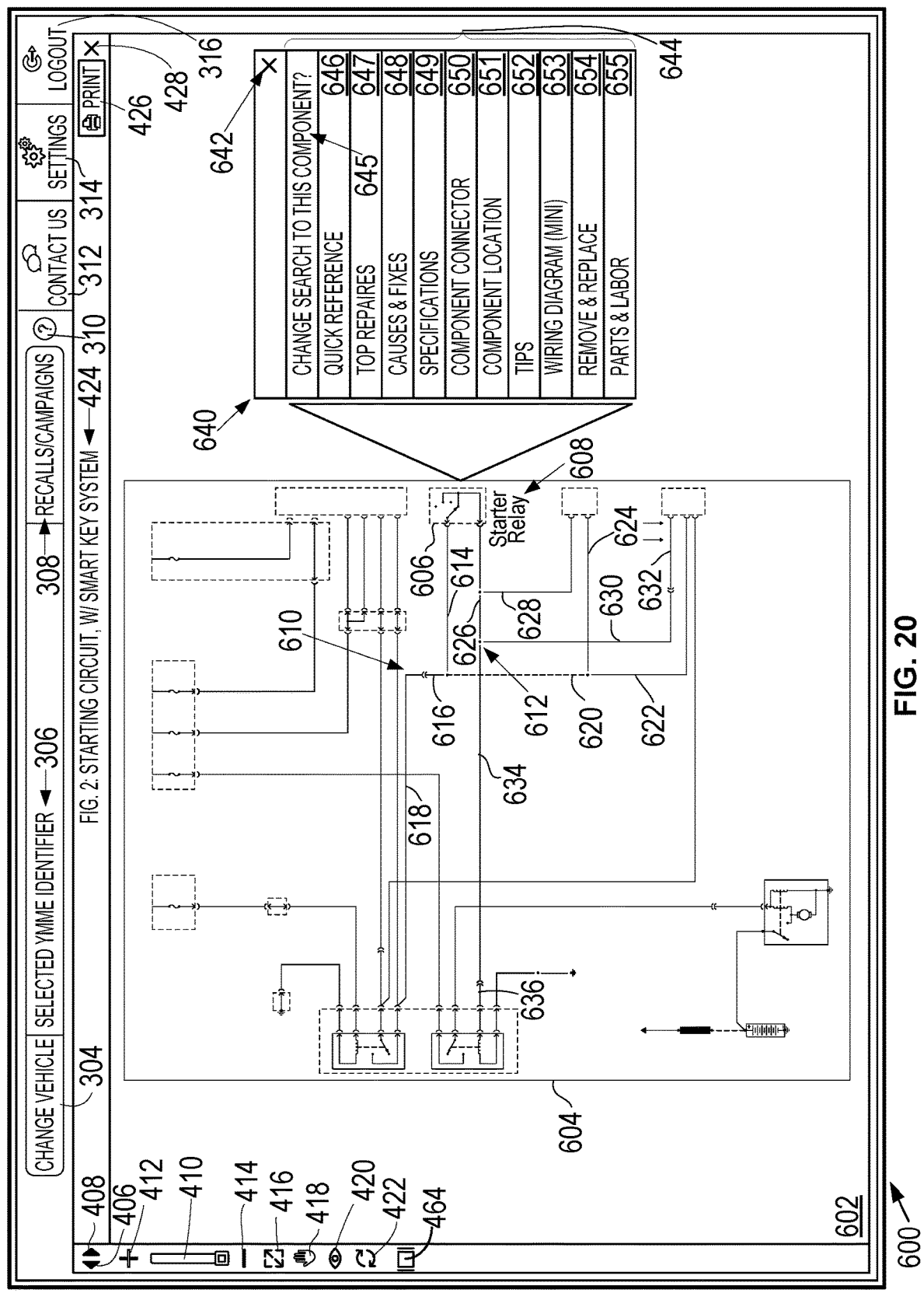

Next, FIG. 20 shows a screen shot 600 of a display, such as the display 108. The screen shot 600 shows a GUI 602. The GUI includes a routing diagram 604. The routing diagram identifier 424 indicates the routing diagram 604 pertains to a starting circuit, with a smart key system. The routing diagram 604 includes multiple connectable components and multiple routable components. The multiple connectable components of the routing diagram 604 include the connectable component 606.

The connectable component 606 is associated with a component identifier 608 that indicates the connectable component 606 is a starter relay. In at least some implementations, the component identifier 608 is located outside a perimeter that defines an outer boundary of the connectable component 606 on the routing diagram 604, but is the component identifier on the routing diagram 604 closest in proximity to the connectable component 606. In at least some other implementations, the component identifier 608 or at least a portion of the component identifier 608 is located in an area defined by a perimeter of the connectable component 606.

A routable component 610, 612 are connectable to the connectable component 606. The routable component 610 includes a routable component segment 614 616, 618, 620, 622, 624. The routable component 612 includes a routable component segment 626, 628, 630, 632, 634, 636.

The GUI 602 includes a menu associated with connectable component or a routable component. The menu of the GUI 602 is configured to be displayed while the GUI 602 is displayed, but the menu of the GUI 602 can be closed even those other parts of the GUI 602 continue to be displayed. As an example, GUI 602 can include a menu 640 that is associated with the connectable component 606. Additionally, the menu 640 can be displayed on the GUI 602 in response to a selection being made from the GUI 602. For instance, the selection can include a selection of the connectable component 606 or the component identifier 608 associated with the connectable component 606. The menu 640 includes a user-selectable control 642 selectable to cause closure of the menu 640. Closure of the menu 640 can result in the menu 640 being hidden (i.e., not being displayed on the GUI 602).

The menu of the GUI 602 can include a set of other user-selectable controls 644. The set of user-selectable controls can include one or more other user-selectable controls. Each of the other user-electable controls can be associated with an identifier. Each identifier associated with another user-selectable control of the GUI 602 can indicate a category of service information that can be requested in response to selection of the other user-selectable control. The processor 102 can determine the other user-selectable control has been selected from the menu 640 and responsively cause a local search for service information classified to be in the category of service information. Additionally or alternatively, the processor 102 can determine the other user-selectable control has been selected from the menu 640 and responsively cause transmission over an external communication network a request for service information classified to be in the category of service information. In response to locating and/or receiving service information classified to be in the category of service information, the processor 102 can cause that service information to be displayed on the display 108. Displaying the service information can, but need not necessarily, include displaying the service information overlaid upon the GUI 602.

FIG. 20 shows multiple examples of the other user-selectable control within the menu 640. In particular, FIG. 20 shows the menu 640 with a change search component user-selectable control 645, a quick reference user-selectable control 646, a top-repairs user-selectable control 647, a causes-and-fixes user-selectable control 648, a specifications user-selectable control 649, a component connector user-selectable control 650, a component location user-selectable control 651, a tips user-selectable control 652, a mini wiring diagram user-selectable control 653, a remove-and-replace user-selectable control 654, and a parts-and-labor user-selectable control 655.

In accordance with an example implementation in which a connectable component, routable component, or component identifier is selected from a routing diagram arranged as a hydraulic routing diagram, a menu including user-selectable controls associated with an identifier of service information categories associated with a connectable component, a routable component, add/or a component identifier shown on the hydraulic routing diagram can be displayed on a GUI showing that hydraulic routing diagram. A user-selectable control from that menu can be selected to cause the processor 102 to search for and/or request service information and to display service information located and/or received in response to that search and/or request.

In accordance with an example implementation in which a connectable component, routable component, or component identifier is selected from a routing diagram arranged as a pneumatic routing diagram, a menu including user-selectable controls associated with an identifier of service information categories associated with a connectable component, a routable component, add/or a component identifier shown on the pneumatic routing diagram can be displayed on a GUI showing that pneumatic routing diagram. A user-selectable control from that menu can be selected to cause the processor 102 to search for and/or request service information and to display service information located and/or received in response to that search and/or request.

In accordance with an example implementation in which a connectable component, routable component, or component identifier is selected from a routing diagram arranged as an optical routing diagram, a menu including user-selectable controls associated with an identifier of service information categories associated with a connectable component, a routable component, add/or a component identifier shown on the optical routing diagram can be displayed on a GUI showing that optical routing diagram. A user-selectable control from that menu can be selected to cause the processor 102 to search for and/or request service information and to display service information located and/or received in response to that search and/or request.

The GUI 403 (shown in FIG. 11, FIG. 12), the GUI 506 (shown in FIG. 14, FIG. 15, FIG. 16), the GUI 507 (shown in FIG. 17), the GUI 508 (shown in FIG. 18), the GUI 509 (shown in FIG. 19), and the GUI 602 also include the DUS GUI selector 304, the selected DUS identifier 306, the recalls/campaigns GUI selector 308, the help GUI selector 310, the contact GUI selector 312, the settings GUI selector 314, the logout GUI selector 316, the routing diagram selector 406, the routing diagram selector 408, the zoom user-selectable control 410 having the zoom-in selector 412 and the zoom-out selector 414, the resize user-selectable control 416, the pan selector 418, the hide-or-show user-selectable control 420, the reset routable components user-selectable control 422, the routing diagram identifier 424, the print user-selectable control 426, and the close GUI user-selectable control 428. Those GUI also include the multi-diagram view selector 464 or the single-diagram view selector 465.

FIG. 10 to FIG. 12 and FIG. 14 to FIG. 20 show implementations in which the GUI 402, 403, 506, 507, 508, 509, and 602 are displayed in a landscape orientation (i.e., the GUI is wider than it is tall). In alternative implementations, a GUI including one or more routing diagrams and user-selectable controls, like a GUI shown in FIG. 10 to FIG. 12 and FIG. 14 to FIG. 20, can be displayed in a portrait orientations (i.e., the GUI is taller than it is wide). In either of those implementations, the routing diagram selector 406, 408 can be used to select another GUI showing a different routing diagram as if the other GUI is to the left or right of the currently displayed GUI or as if the other GUI is above or below the currently displayed GUI.

Figure 21:
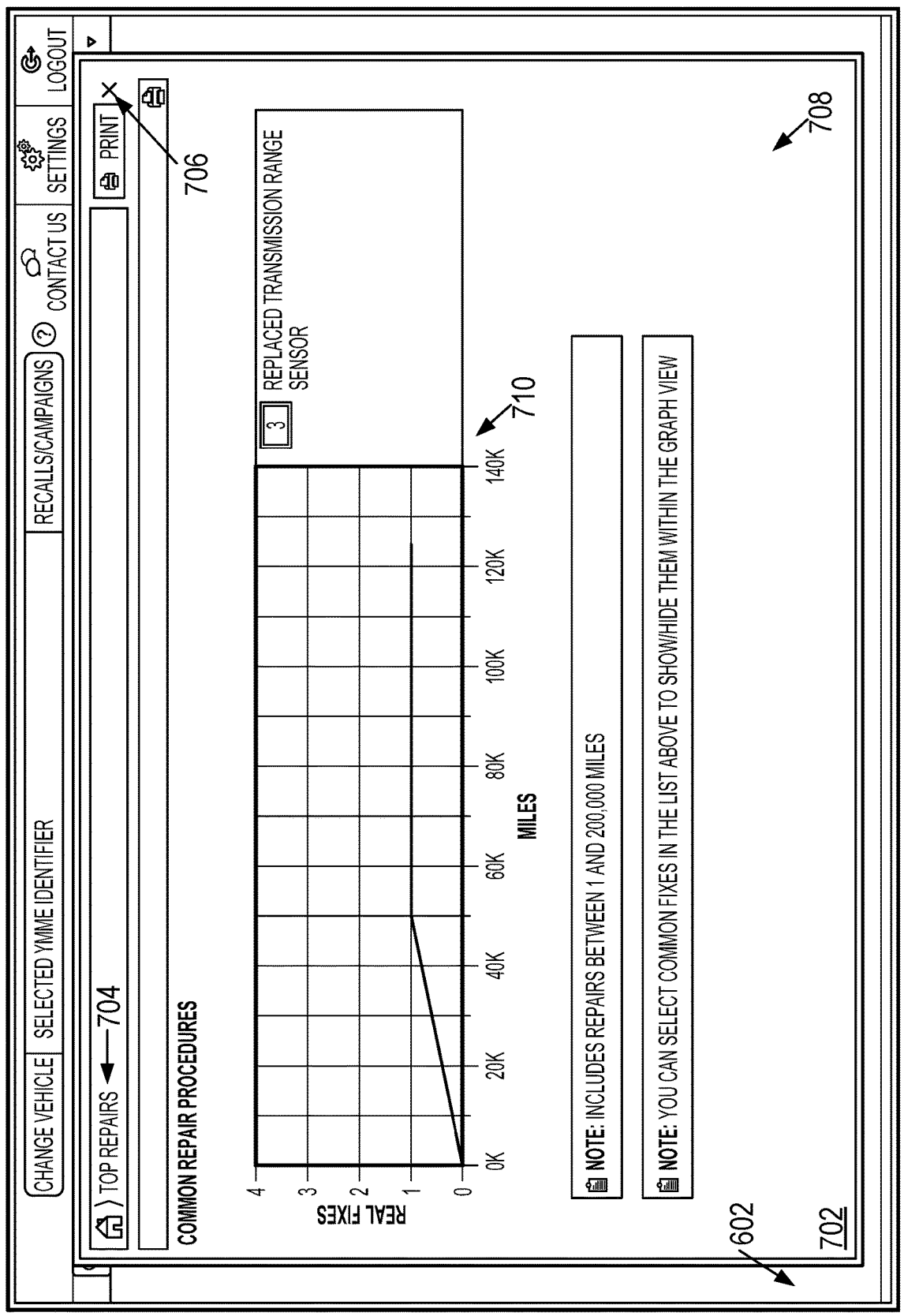

Next, FIG. 21 is a screen shot 700 of a display, such as the display 108. The screen shot 700 shows a GUI 702 overlaying the GUI 602 shown in FIG. 20. The GUI 702 can be displayed on the display 108 in response to the processor 102 determining the top-repairs user-selectable control 647 is selected from the menu 640. The GUI 702 includes an information category identifier 704 that is associated with the identifier of the top-repairs user-selectable control 647. The GUI 702 includes a close GUI user-selectable control 706 that is selectable to cause the processor 102 to close the GUI 702. The GUI 702 includes information 708 associated with the information category identifier 704. Moreover the information 708 can be associated with the subject of the routing diagram 604, such as the subject identified by the routing diagram identifier 424 on the GUI 602 (i.e., starting circuit, with a smart key system) and by a vehicle identified by the selected DUS identifier 306. As a particular example, the information 708 shown on the GUI 702 can include a graph, such as a graph 710 showing commonly repair procedure information.

Figure 22:
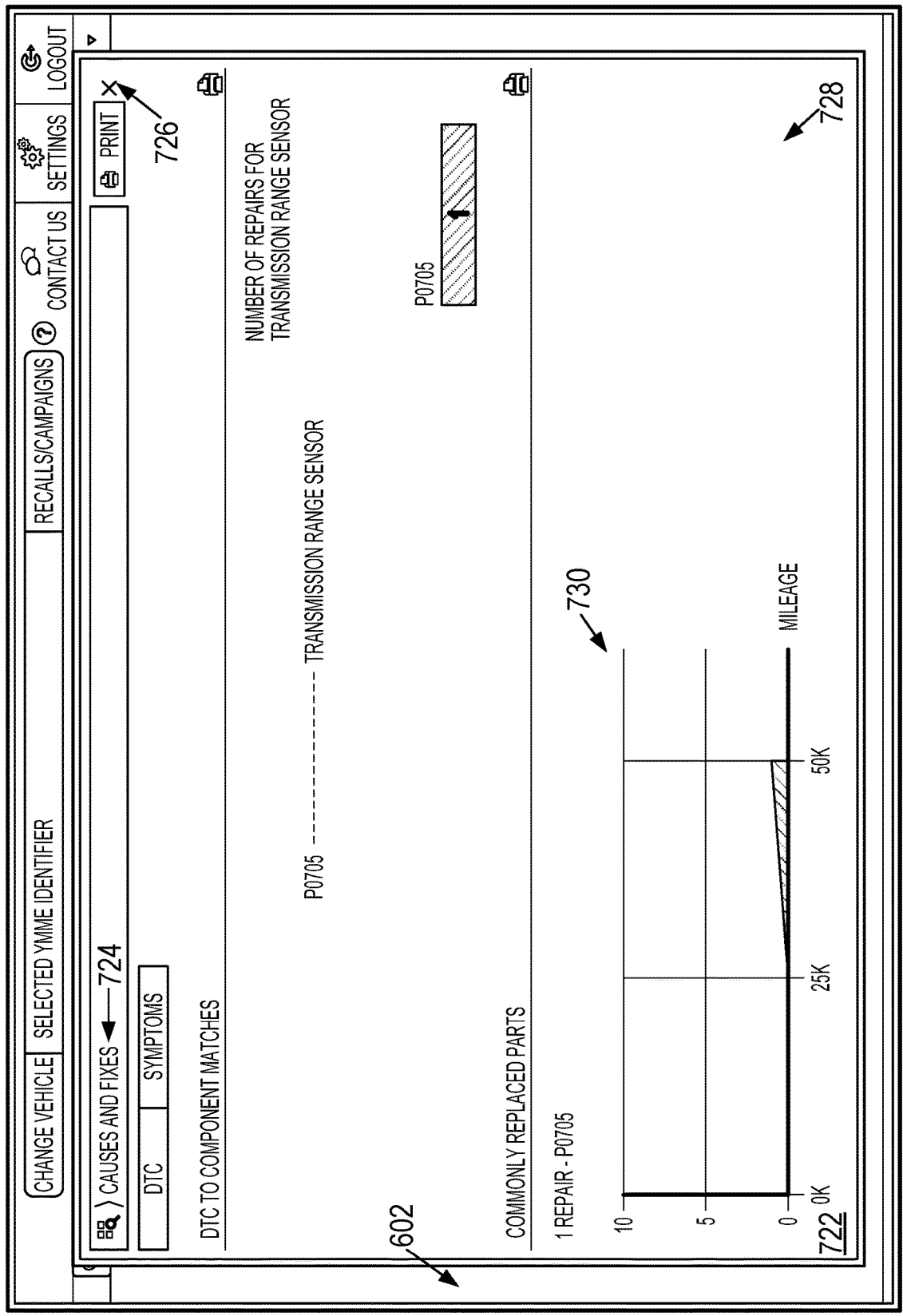

Next, FIG. 22 is a screen shot 720 of a display, such as the display 108. The screen shot 720 shows a GUI 722 overlaying the GUI 602 shown in FIG. 20. The GUI 722 can be displayed on the display 108 in response to the processor 102 determining the causes and fixes user-selectable control 648 is selected from the menu 640. The GUI 722 includes an information category identifier 724 that is associated with the identifier of the causes and fixes user-selectable control 648. The GUI 722 includes a close GUI user-selectable control 726 that is selectable to cause the processor 102 to close the GUI 722. The GUI 722 includes information 728 associated with the information category identifier 724. Moreover the information 728 can be associated with the subject of the routing diagram 604, such as the subject identified by the routing diagram identifier 424 on the GUI 602 (i.e., starting circuit, with a smart key system) and by a vehicle identified by the selected DUS identifier 306. As a particular example, the information 728 shown on the GUI 722 can include a graph, such as a graph 730 showing commonly replaced parts information.

Next, FIG. 23 is a screen shot 740 of a display, such as the display 108. The screen shot 740 shows a GUI 742 overlaying the GUI 602 shown in FIG. 20. The GUI 742 can be displayed on the display 108 in response to the processor 102 determining the specifications user-selectable control 649 is selected from the menu 640. The GUI 742 includes an information category identifier 744 that is associated with the identifier of the specifications user-selectable control 649. The GUI 742 includes a close GUI user-selectable control 746 that is selectable to cause the processor 102 to close the GUI 742. The GUI 742 includes information 748 associated with the information category identifier 744. Moreover the information 748 can be associated with the subject of the routing diagram 604, such as the subject identified by the routing diagram identifier 424 on the GUI 602 (i.e., starting circuit, with a smart key system) and by a vehicle identified by the selected DUS identifier 306. As a particular example, the information 748 shown on the GUI 742 can include torque specification information, such as an image 750 and/or a table 752, both of which show torque specification information.

A GUI displayed in response to selection of a user-selectable control from the menu 640 can include multiple GUI. Each GUI of those multiple GUI can include a GUI selector 754 selectable to cause the display 108 to display a different one of those multiple GUI.

Figure 24:
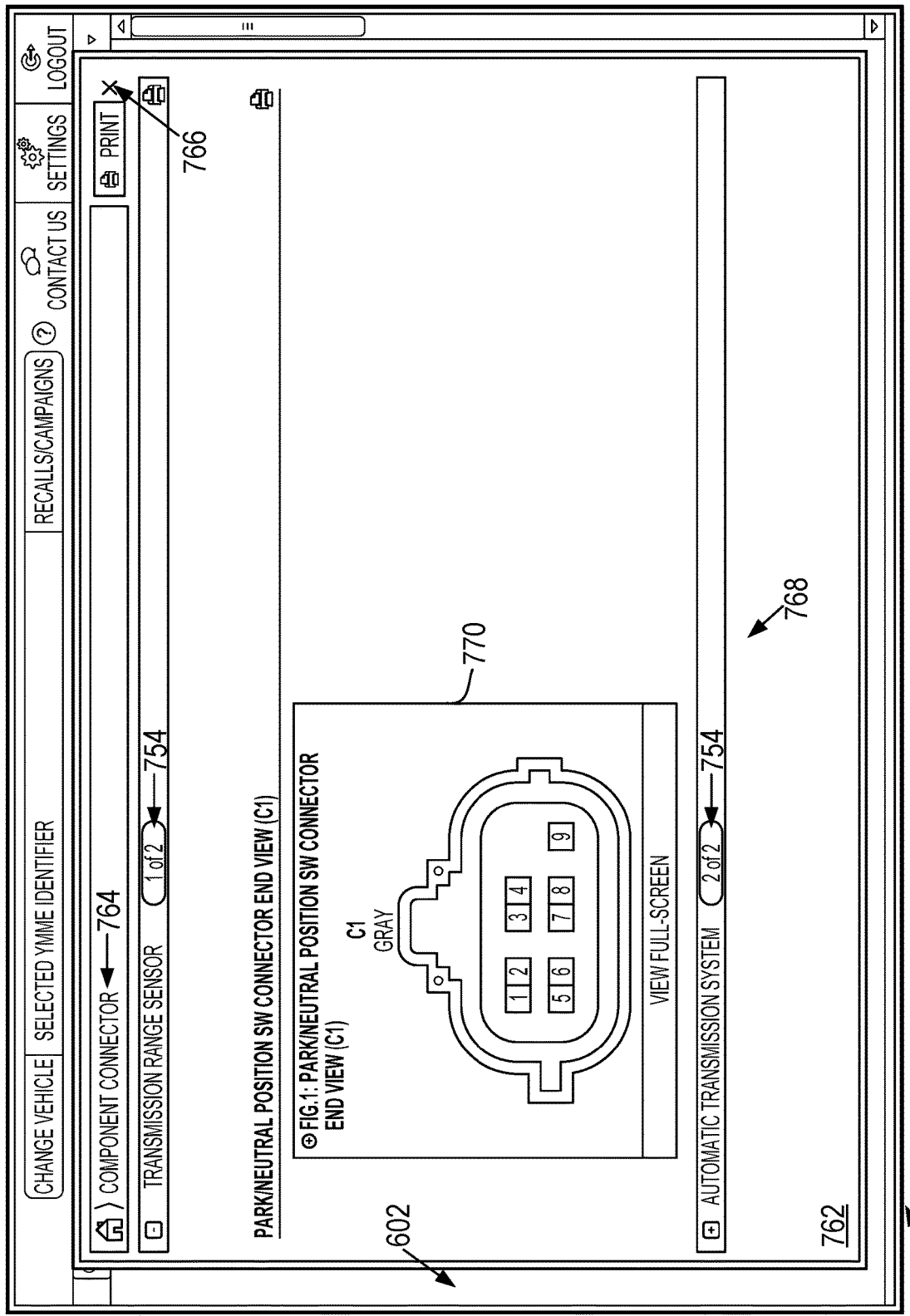

Next, FIG. 24 is a screen shot 760 of a display, such as the display 108. The screen shot 760 shows a GUI 762 overlaying the GUI 602 shown in FIG. 20. The GUI 762 can be displayed on the display 108 in response to the processor 102 determining the component connector user-selectable control 650 is selected from the menu 640. The GUI 762 includes an information category identifier 764 that is associated with the identifier of the component connector user-selectable control 650. The GUI 762 includes a close GUI user-selectable control 766 that is selectable to cause the processor 102 to close the GUI 762. The GUI 762 includes information 768 associated with the information category identifier 764. Moreover the information 768 can be associated with the subject of the routing diagram 604, such as the subject identified by the routing diagram identifier 424 on the GUI 602 (i.e., starting circuit, with a smart key system) and by a vehicle identified by the selected DUS identifier 306. As a particular example, the information 768 shown on the GUI 762 can include an image, such as an image 770 showing a connector end view of a park/neutral position switch connector.

Figure 25:
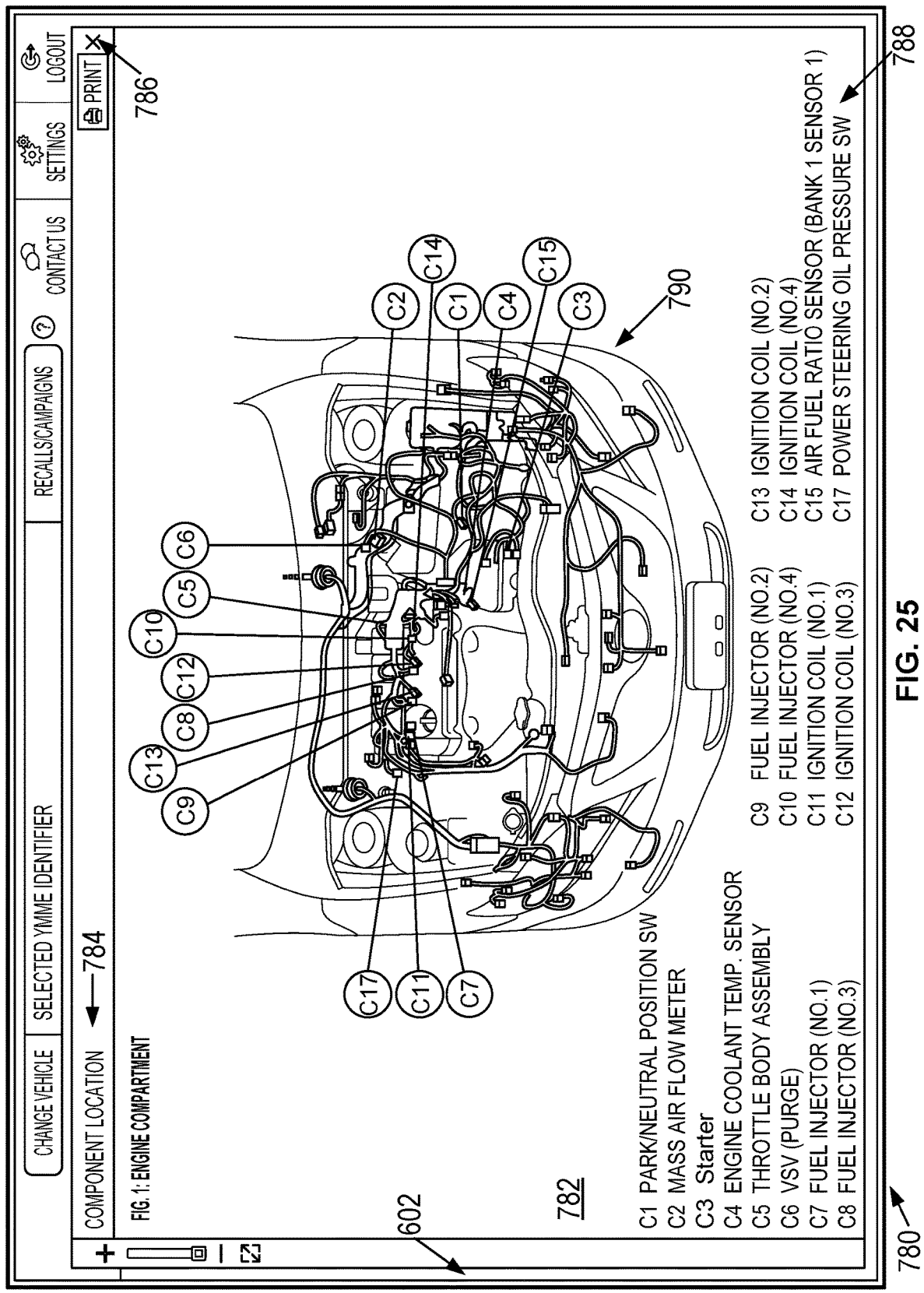

Next, FIG. 25 is a screen shot 780 of a display, such as the display 108. The screen shot 780 shows a GUI 782 overlaying the GUI 602 shown in FIG. 20. The GUI 782 can be displayed on the display 108 in response to the processor 102 determining the component location user-selectable control 651 is selected from the menu 640. The GUI 782 includes an information category identifier 784 that is associated with the identifier of the component location user-selectable control 651. The GUI 782 includes a close GUI user-selectable control 786 that is selectable to cause the processor 102 to close the GUI 782. The GUI 782 includes information 788 associated with the information category identifier 784. Moreover the information 788 can be associated with the subject of the routing diagram 604, such as the subject identified by the routing diagram identifier 424 on the GUI 602 (i.e., starting circuit, with a smart key system) and by a vehicle identified by the selected DUS identifier 306. As a particular example, the information 788 shown on the GUI 782 can include an image, such as an image 790 showing locations of vehicle components and wiring harness including routable components extending to and/or from the vehicle components.

Figure 26:
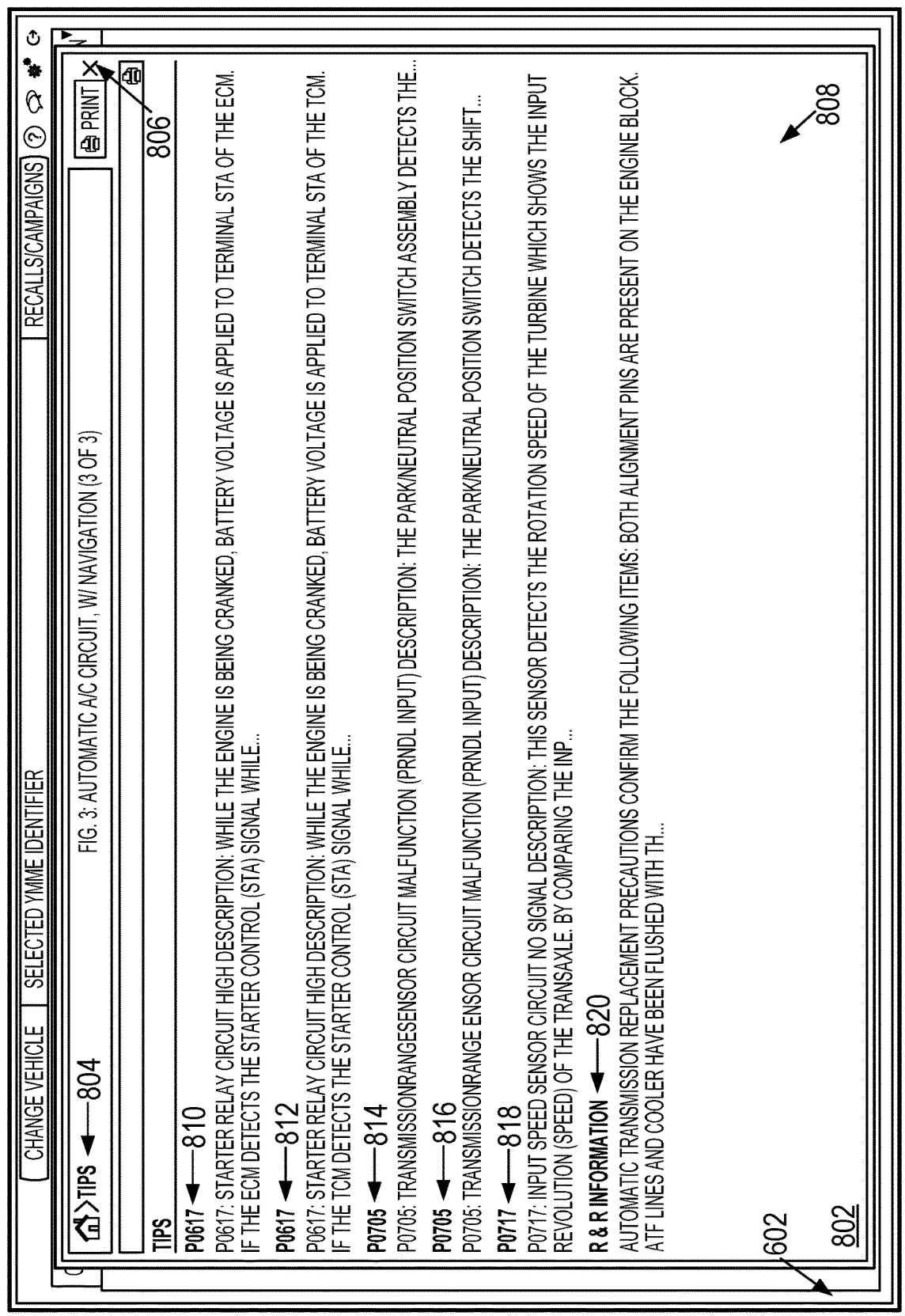

Next, FIG. 26 is a screen shot 800 of a display, such as the display 108. The screen shot 800 shows a GUI 802 overlaying the GUI 602 shown in FIG. 20. The GUI 802 can be displayed on the display 108 in response to the processor 102 determining the tips user-selectable control 652 is selected from the menu 640. The GUI 802 includes an information category identifier 804 that is associated with the identifier of the tips user-selectable control 652. The GUI 802 includes a close GUI user-selectable control 806 that is selectable to cause the processor 102 to close the GUI 802. The GUI 802 includes information 808 associated with the information category identifier 804. Moreover the information 808 can be associated with the subject of the routing diagram 604, such as the subject identified by the routing diagram identifier 424 on the GUI 602 (i.e., starting circuit, with a smart key system) and by a vehicle identified by the selected DUS identifier 306. As a particular example, the information 808 shown on the GUI 802 can include textual information regarding diagnosing or removing and replacing a connectable component on the vehicle identified by the selected DUS identifier 306. The textual information can include a user-selectable control 810, 812, 814, 816, 818, 820. The processor 102 can detect selection of the user-selectable control 810, 812, 814, 816, 818, 820 and cause the display 108 to display further information regarding a tip related to the user-selectable control 810, 812, 814, 816, 818, 820.

Figure 27:
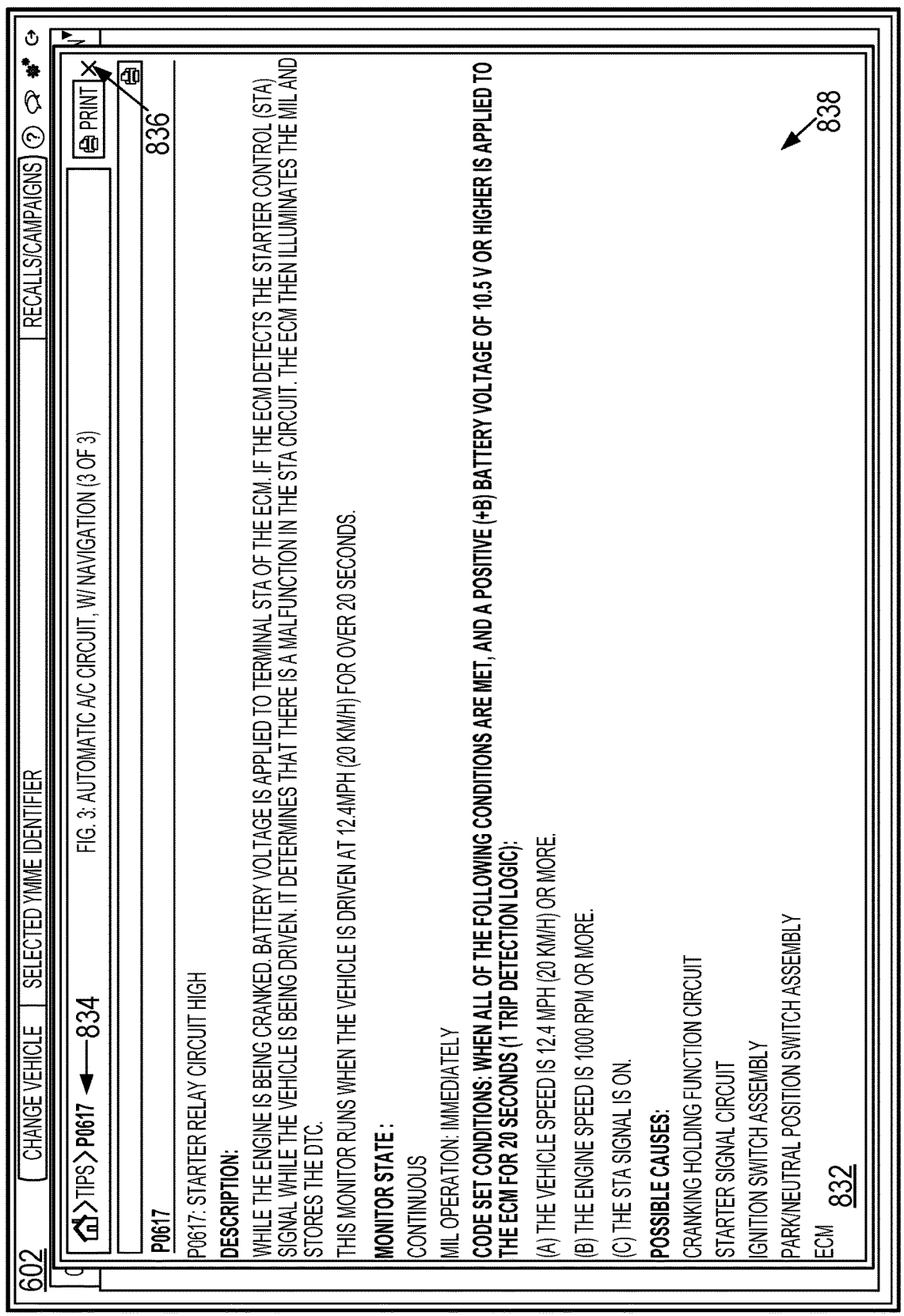

Next, FIG. 27 is a screen shot 830 of a display, such as the display 108. The screen shot 830 shows a GUI 832 overlaying the GUI 602 shown in FIG. 20. The GUI 832 can be displayed on the display 108 in response to the processor 102 determining the user-selectable control 810 is selected from the GUI 802 (shown in FIG. 26). The GUI 832 includes an information category identifier 834 that is associated with the identifier of the tips user-selectable control 652 and with an identifier associated with the user-selectable control 810. The GUI 832 includes a close GUI user-selectable control 836 that is selectable to cause the processor 102 to close the GUI 832. The GUI 832 includes information 838 associated with the information category identifier 704. Moreover the information 838 can be associated with the subject of the routing diagram 604, such as the subject identified by the routing diagram identifier 424 on the GUI 602 (i.e., starting circuit, with a smart key system) and by a vehicle identified by the selected DUS identifier 306. In particular, the information 838 includes information associated with a tip related to a DTC P0617 pertaining to a starter relay circuit.

With respect to FIG. 21 to FIG. 27, upon closing the GUI 702, 722, 742, 762, 782, 802, 832, the display 108 can continue to display the GUI 602 upon which the GUI 702, 722, 742, 762, 782, 802, 832, respectively, had been displayed. In some implementations, upon closing the GUI 702, 722, 742, 762, 782, 802, 832, the menu 640 continues to be shown in the GUI 602. In other implementations, upon closing the GUI 702, 722, 742, 762, 782, 802, 832, the menu 640 is not shown in the GUI 602 until a selection (associated with the menu 640) is made from the GUI 602. Examples of that selection are described above with respect to FIG. 20.

Figure 28:
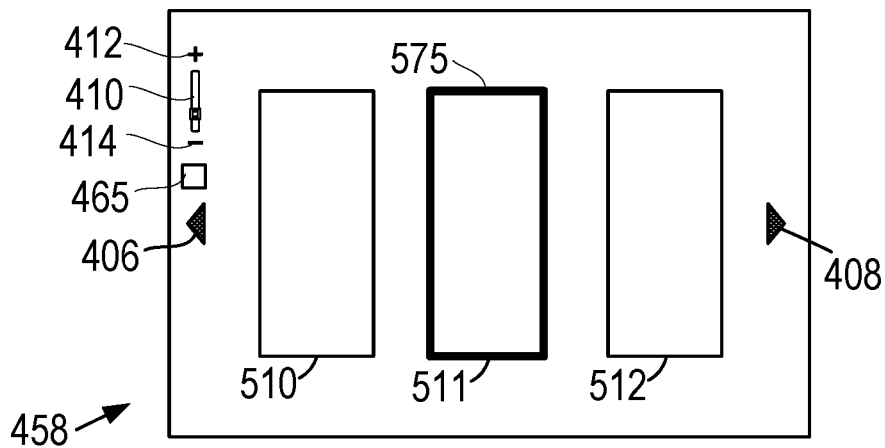
FIG. 28 and FIG. 29 show views of variations of simplified portions of a screen shot shown in other figures and results of using controls of a graphical user interface in accordance with the example implementation(s) described herein.
Figure 28:
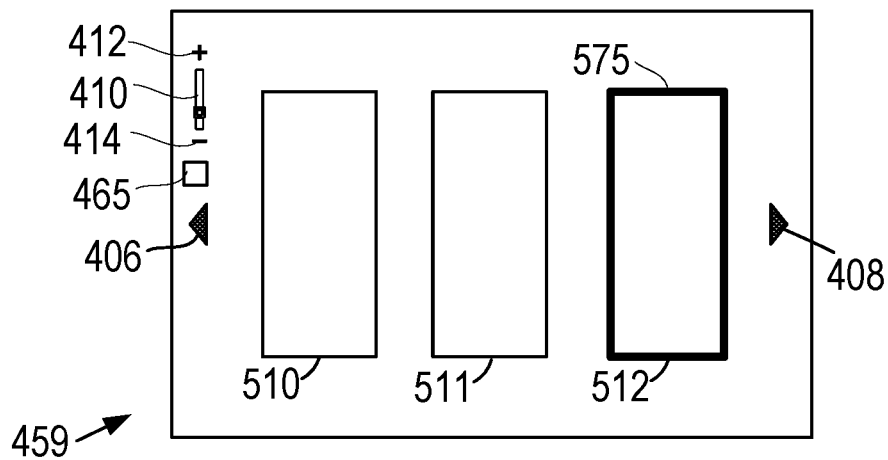
Figure 28:
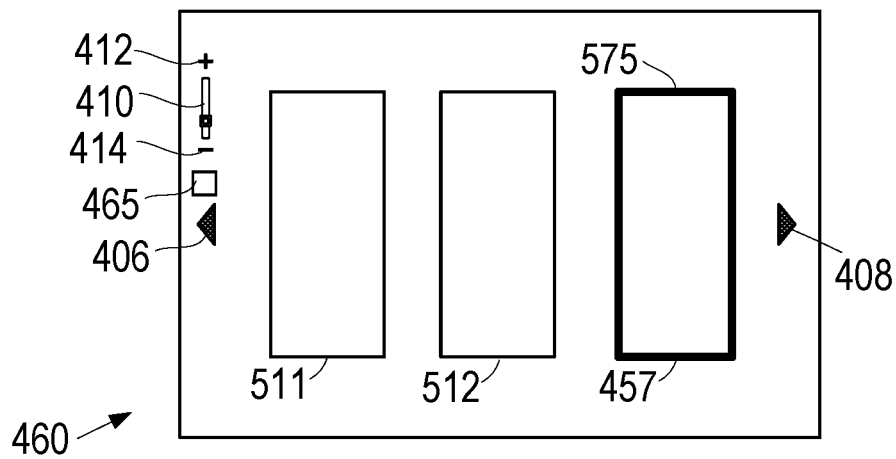
Figure 29:
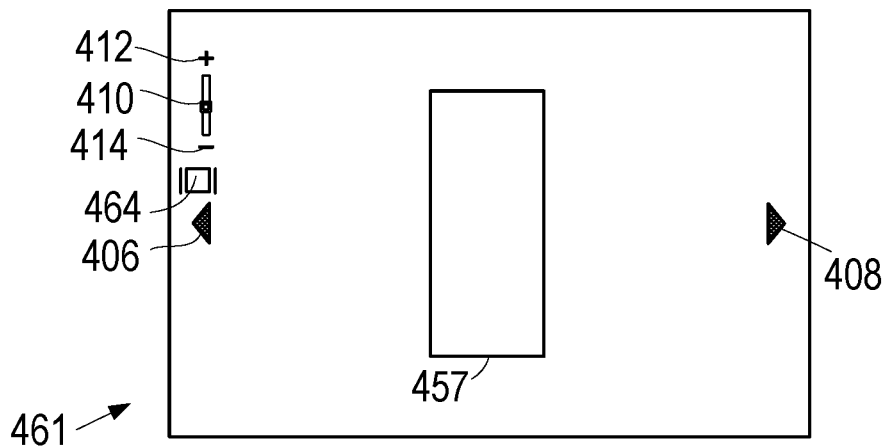
Figure 29:
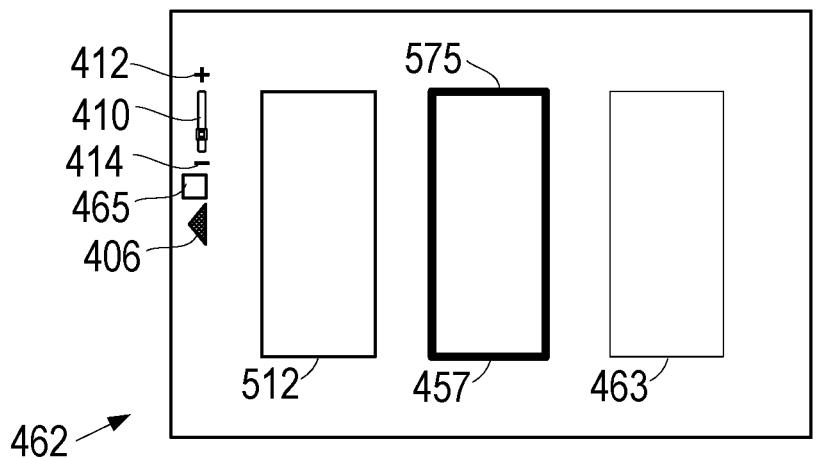
Figure 29:
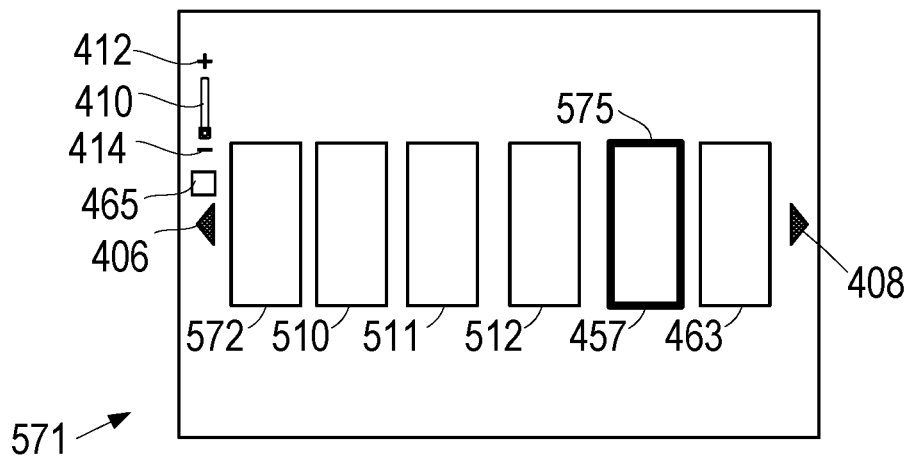

Next, FIG. 28 and FIG. 29 show views of variations of simplified portions of a screen shot shown in FIG. 10 to FIG. 12 or FIG. 14 to FIG. 20 and/or results of using controls of a graphical user interface in accordance with the example implementations described herein. Other aspects of the screens shots shown in FIG. 10 to FIG. 12 or FIG. 14 to FIG. 20 are not shown in FIG. 28 and FIG. 29 for clarity of FIG. 28 and FIG. 29.

First, FIG. 28 shows a view 458 including a simplified view of the routing diagram 510, 511, 512 and the variation of the routing diagram selector 406, 408, as shown in FIG. 16. The view 458 also shows the zoom user-selectable control 410, the zoom-in selector 412, the zoom-out selector 414, and the single-diagram view selector 465. The view 458 includes a variation not shown in FIG. 16. In particular, the view 458 shows a focus framework 575 to indicate that the routing diagram 511 is a routing diagram in focus. Being "in focus" pertains to which diagram would be shown alone if the single-diagram view selector 465 is selected from the view 458. A routing diagram being 'in focus' does not mean that the visibility or quality of that routing diagram is superior to the other routing diagrams shown with the routing diagram in focus or that those other routing diagrams are fuzzy. The focus framework 575 in the view 458, as in other views on FIG. 28 and FIG. 29, is represented by the thick border around a routing diagram as compared to the thin borders shown in those views. The view 458 can appear on the display 108.

Next, FIG. 28 shows a view 459. The view 459 can appear on the display 108 in response to the processor 102 determining that the routing diagram selector 408 was selected in view 458. In the view 459, the focus framework 575 is around the routing diagram 512, such that the routing diagram 512 is now in focus instead of the routing diagram 511. In accordance with this implementation, the focus framework 575 moved rightward from a center position shown in the view 458. In an alternative implementation, the focus framework 575 could remain in a center position and the routing diagrams could shift leftward in response to selection of the routing diagram selector 408 or rightward in response to selection of the routing diagram selector 406.

Next, FIG. 28 shows a view 460. The view 460 can appear on the display 108 in response to the processor 102 determining that the routing diagram selector 408 was selected while the view 459 appeared on the display 108. In the view 460, the focus framework 575 is around a routing diagram 457 as the routing diagram, 511, 512 moved leftward and the routing diagram 510 was removed from the display 108 in response to selection of the routing diagram selector 408. In the view 460, as well as in the view 459, the focus framework 575 is positioned at a right-most displayed routing diagram. Accordingly, the focus framework 575 was not repositioned in response to the routing diagram selector 408 being selected from the view 459.

Turning to FIG. 29, a view 461 is shown at the top of the figure. The view 461 can be displayed on the display 108 in response to the processor 102 determining that the single-diagram view selector 465 was selected while the view 460 (or some other view in which the routing diagram 457 is in focus) is displayed on the display 108. In an implementation based on the view 461, a focus frame is displayed on the display when a single routing diagram is displayed on the display 108. In an alternative implementation, the focus framework 575 can be displayed around a single routing diagram that is displayed on the display 108. The view 461 shows that the multi-diagram view selector 464 is displayed on the display 108 when a single routing diagram is displayed on the display 108. Displaying the multi-diagram view selector 464 on the display 108 can be conditioned on a set of routing diagrams selected for display having multiple routing diagrams.

Next, FIG. 29 shows a view 462. The view 462 can be displayed on the display 108 in response to the processor 102 determining that the multi-diagram view selector 464 was selected while the view 461 appeared on the display 108. In at least some implementations, as shown in the view 462, the focus framework 575 is around the routing diagram 457 and both the focus framework 575 and the routing diagram 457 are in the center of the view 462. Since the routing diagram 457 is in the center of the view 462, another routing diagram 463 appears to a right side of the routing diagram 457. In at least some other implementations, in response to selecting the multi-diagram view selector 464 while the view 461 is displayed on the display 108, the display 108 can return to displaying a view like the view 460 shown in FIG. 28.

Next, FIG. 29 shows a view 571. The view 571 can be displayed in response to the processor 102 determining that the zoom-out selector 414 is selected (or a slider of the zoom user-selectable control 410 is slid downward) while the view 462 is displayed on the display. The focus framework 575 remains around the routing diagram 457. By zooming out, the view can include additional routing diagrams than compared to the quantity of routing diagrams displayed when the zoom-out selector 414 is selected. As shown in FIG. 29, the view includes the routing diagram 572, 510, 511, 512, 457, 463. The routing diagram 572 could be displayed on the display 108 in response to the routing diagram selector 406 being selected when the view 458, 459 shown in FIG. 28 are displayed on the display 108.

V. Example Operation

Figure 30:
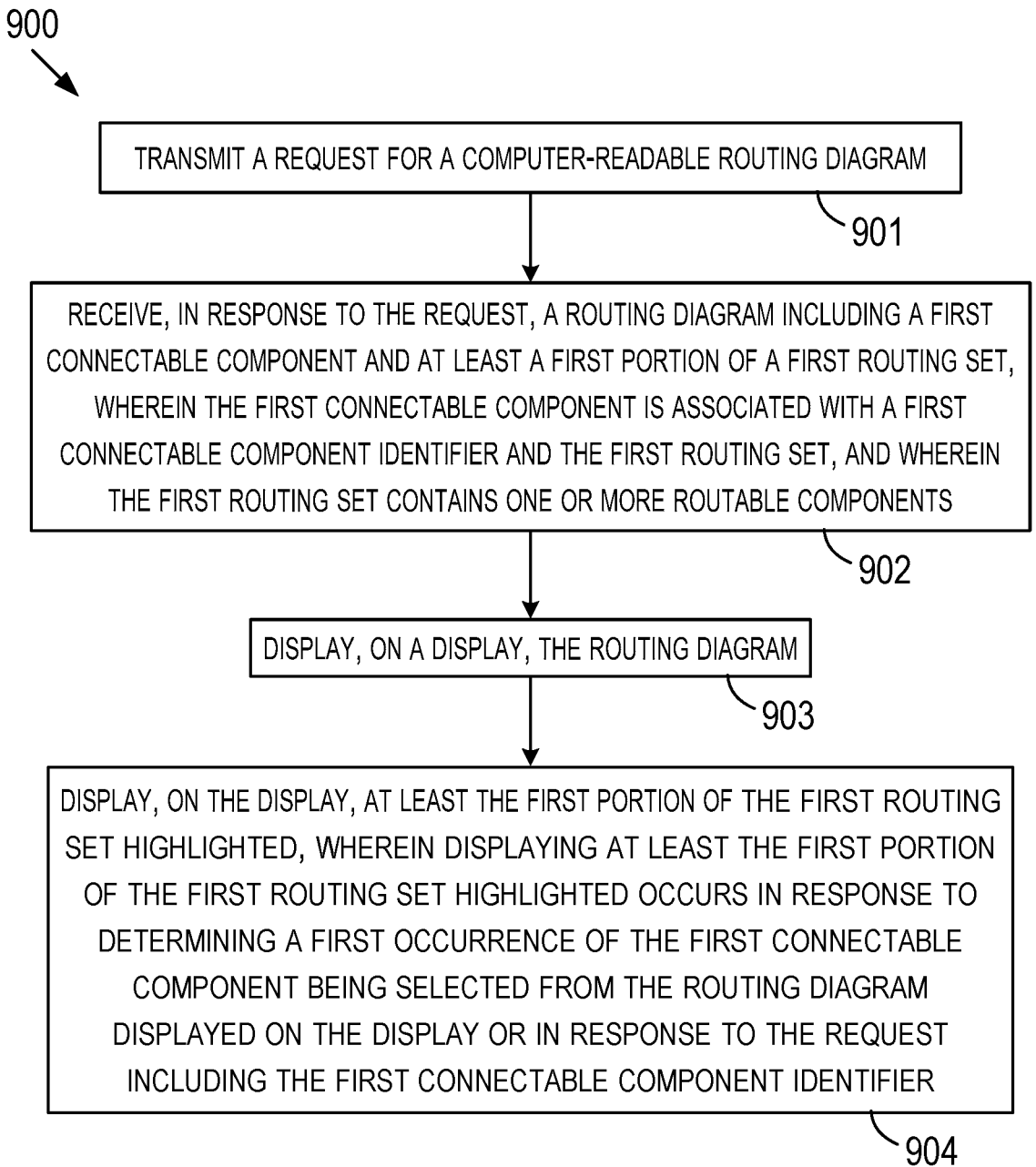
FIG. 30 depicts a flow chart showing an example method in accordance with the example implementations described herein.

Next, FIG. 30 shows a flowchart depicting a set of functions 900 (or more simply "the set 900") that can be carried out in accordance with the example implementations described in this description. The set 900 includes the functions shown in block 901 through 904. The following description of the set 900 includes references to elements shown in other figures described in this description, but the functions of the set 900 are not limited to being carried out only by the referenced elements. A variety of methods can be performed using all of the functions shown in the set 900 or any proper subset of the functions shown in the set 900. Any of those methods can be performed with other functions such as one or more of the other functions described in this description.

Block 901 includes transmitting a request for a computer-readable routing diagram. In at least some implementations, transmission of the request occurs over the data bus 116. In at least some other implementations, transmission of the request occurs over the communication network 16. As an example, the processor 102 causes the communication network interface 110 to transmit the request over communication network 16, the communication network interface 206 receives that request, and the processor 202 searches the memory 204 to determine a response to the request.

Next, block 902 includes receiving, in response to the request, a routing diagram including a first connectable component and at least a first portion of a first routing set. The first connectable component is associated with both a first connectable component identifier and the first routing set. The first routing set contains one or more routable components. In at least some implementations, receiving the response includes the processor 102 receiving the response based on a search of the memory 104. In at least some other implementations, receiving the response includes the communication network interface 110 receiving the response from the communication network 16 and the processor 102 receiving the response from the communication network interface 110.

Next, block 903 includes displaying, on a display, the routing diagram.

Next, block 904 includes displaying, on the display, at least the first portion of the first routing set highlighted. Displaying at least the first portion of the first routing set highlighted occurs in response to determining a first occurrence of the first connectable component being selected from the routing diagram displayed on the display or in response to the request including the first connectable component identifier.

In accordance with at least a first further implementation, the routing diagram includes an electrical wiring diagram, the first connectable component includes a first electrical component, and the one or more routable components include one or more electrical circuits. Additionally or alternatively, the routing diagram includes an optical cable diagram, the first connectable component includes a first optical component, and the one or more routable components include one or more optical cables. Additionally or alternatively, the routing diagram includes a hydraulic line diagram, the first connectable component includes a first hydraulic component, and the one or more routable components include one or more hydraulic lines. Additionally or alternatively, the routing diagram includes a pneumatic line diagram the first connectable component includes a first pneumatic component, and the one or more routable components include one or more pneumatic line.

In accordance with at least a second further implementation, the first connectable component is associated with one or more coordinates indicative of where the first connectable component is disposed on the routing diagram. Each routable component of the first routing set is associated with one or more node coordinates indicative of where a node of each routable component of the first routing set is disposed on the routing diagram. In accordance with these example implementations, the method further includes determining, based on at least a portion of the one or more coordinates indicative of where the first connectable component is disposed on the routing diagram and at least a portion of the one or more node coordinates indicative of where a node of each routable component of the first routing set is disposed on the routing diagram, each routable component contained within the first routing set.

As an example, coordinates indicative of where the connectable component 411 (shown in FIG. 11 and FIG. 12) is disposed on the routing diagram 405 include the example coordinate pairs (described above) that define the perimeter of the area in which connectable component is disposed plus all coordinate pairs within that area.

In accordance with at least the second further implementation, determining each routable component contained within the first routing set includes determining that a node coordinate associated with one or more routable components of the first routing set is within a threshold number of pixels of the first connectable component on the routing diagram.

In accordance with at least the second further implementation, determining each routable component contained within the first routing set further includes determining that a node coordinate associated with one or more routable components of the first routing set is common with a coordinate of the first connectable component or is within an area bounded by a perimeter based on the one or more coordinates of the first connectable component.

In accordance with at least the second further implementation, the one or more coordinates indicative of where the first connectable component is disposed on the routing diagram define a perimeter of the first connectable component. Furthermore, determining each routable component contained within the first routing set includes performing a proximity search outward from the perimeter of the first connectable component. Furthermore still, performing the proximity search includes determining each and every routable component having a node component within a threshold number of pixels from the perimeter of the first connectable component.

In accordance with the aforementioned implementation(s), performing the proximity search includes performing a first proximity search outward from the perimeter of the first connectable component and one or more subsequent proximity searches outward from the perimeter of the first connectable component after the first proximity search. Moreover, the threshold number of pixels from the perimeter of the first connectable component includes a first threshold number of pixels for the first proximity search and a respective threshold number of pixels for each of the one or more subsequent proximity searches. Additionally, a threshold number of pixels for each of the one or more subsequent proximity searches is greater than the first threshold number of pixels and is greater than a threshold number of pixels used for any intervening proximity search of the one or more subsequent proximity searches.

As an example, the threshold number of pixels for the example implementations can include ten pixels, and each respective threshold number of pixels is an additional five pixels such that the first three threshold numbers of pixels are ten pixels, fifteen pixels, and twenty pixels. As another example, the threshold number of pixels for the example implementations can include ten pixels, and each respective threshold number of pixels is an additional ten pixels such that the first three threshold numbers of pixels are ten pixels, twenty pixels, and thirty pixels. Other example threshold numbers of pixels are also possible.

In accordance with at least the second further implementation, a first routable component of the first routing set includes multiple, non-contiguous routable component segments. Moreover, the multiple, non-contiguous routable component segments include a first routable component segment and a second routable component segment. The first routable component segment includes a first routable component segment end associated with a first node coordinate, and a second routable component segment end associated with a second node coordinate, and the second routable component segment includes a third routable component segment end associated with a third node coordinate, and a fourth routable component segment end associated with a fourth node coordinate. Furthermore, in this implementation, determining the first routable component is contained within the first routing set includes determining that the first node coordinate is within a threshold distance of the first connectable component on the routing diagram. Furthermore still, in this implementation, displaying the first routing set highlighted includes: (1) determining the second routable component segment is part of the first routable component, and (2) displaying both the first routable component segment and the second routable component segment as highlighted.

In at least some of the aforementioned implementations, determining the second routable component segment is part of the first routable component includes determining that the second node coordinate is within a threshold distance of either the third node coordinate or the fourth node coordinate.

Additionally or alternatively, for at least some of the aforementioned implementations, the routing diagram includes a first routing diagram and a second routing diagram, the first connectable component and the first routable component segment are disposed on the first routing diagram, and the first routable component segment includes a first change-diagram node or extends to, on the first routing diagram, a routable component segment having the first change-diagram node. Moreover, the second routable component segment is disposed on the second routing diagram, and the second routable component segment includes a second change-diagram node or extends to, on the second routing diagram, a routable component segment having the second change-diagram node. Additionally, determining the second routable component segment is part of the first routable component includes determining the first change-diagram node corresponds to the second change-diagram node.

In accordance with at least a third further implementation, displaying the first routing set highlighted includes displaying a first routable component of the first routing set defined by a first stroke width, a first color, and a path and displaying highlighting defined by a second stroke width, a second color, an opacity value, and the path. As an example, the first color can, but need not necessarily, be a dark color and the second color can, but need not necessarily, be a light color so that the first color is visible when the first routing set is highlighted.

In accordance with at least a fourth further implementation, the method further includes determining a set of routable component identifiers associated with the first connectable component, and determining each routable component segment, of a routable component on the routing diagram, that is associated with a routable component identifier of the set of routable component identifiers. Displaying the first routing set highlighted includes displaying each routable component segment that is associated with the routable component identifier of the set of routable component identifiers. In accordance with at least some of those implementation(s), displaying the first routing set highlighted includes displaying any node on the routing diagram that represents an interconnection of two or more routable component segments associated with the routable component identifier of the set of routable component identifiers.

In accordance with at least a fifth further implementation, receiving the routing diagram includes receiving a first graphics file. In accordance with at least some of those implementation(s), the first graphics file can include a vector graphics file, such as a vector graphics file having a file extension of SVG (Scalable Vector Graphics), EPS (Encapsulated PostScript), PDF (Portable Document Format), AI (Adobe Illustrator Artwork) or DXF (Drawing eXchange Format), or some other type of vector graphics file extension. In accordance with at least some other implementation(s), the first graphics file can include a raster graphics file, such as a raster graphics file having a file extension of BMP (bitmap), TIF (Tagged Image File), JPG (Joint Photographic Experts Group), GIF (Graphical Interchange Format), PNG (Portable Network Graphic), or some other type of raster graphics file extension.

Furthermore, the routing diagram can be part of a set of routing diagrams including multiple routing diagrams. In such case, each routing diagram of the set of routing diagrams can include a separate graphics file, such as a separate vector graphics file for each routing diagram. In at least some implementations in which the set of routing diagrams is provided from the server computing system 200 to the computing system 100, all routing diagrams of the set of routing diagrams can be sent in response to a single request from the computing system 100. Alternatively, the computing system 100 sends multiple requests to the server computing system 200 to obtain two or more of the routing diagrams from the server computing system 200. For instance, the computing system 100 sends a respective request to the server computing system 200 to receive a single routing diagram of the set of routing diagrams. Each respective request can, but need not necessarily, be sent in response to the processor 102 determining that the routing diagram selector 406 or the routing diagram selector 408 is selected from a GUI.

In accordance with at least a sixth further implementation, the routing diagram further includes a second connectable component and a second routing set, the second connectable component is associated with the second routing set, and the second routing set contains one or more routable components. For these further implementations, the method further includes determining a selection of the second connectable component occurs while the display is displaying the routing diagram, and displaying, on the display in response to determining the selection of the second connectable component, the routing diagram with the second routing set highlighted. For at least some of these further implementations, displaying the first routing set highlighted includes displaying each of the one or more routable components of the first routing set using a first highlighting color, and displaying the second routing set highlighted includes displaying each of the one or more routable components of the second routing set using a second highlighting color. Moreover, the first highlighting color is different than the second highlighting color.

In accordance with at least a seventh further implementation, the method further includes receiving, on the display, a selection of a particular routable component of the routing diagram. The method also includes displaying, on the display in response to receiving the selection of the particular routable component, the routing diagram with the particular routable component highlighted if the particular routable component is not highlighted when the selection of the particular routable component is received, or with the particular routable component not highlighted if the particular routable component is highlighted when the selection of the particular routable component is received.

In accordance with at least some of the aforementioned implementations, the particular routable component includes multiple routable component segments, and the routing diagram includes one or more nodes that represent an interconnection of two or more routable component segments of the particular routable component. Moreover, displaying the routing diagram with the particular routable component highlighted includes displaying the multiple routable component segments as highlighted and displaying the one or more nodes that represent the interconnection of two or more routable component segments of the particular routable component as highlighted.

The particular routable component can include one or more segments. Highlighting a particular routable component with only a single segment includes highlighting the particular routable component end-to-end. In at least some implementations, highlighting a particular routable component with multiple segments includes highlighting each of the multiple segments of the particular routable component end-to-end. Alternatively, highlighting a particular routable component with multiple segments includes highlighting only a portion of the multiple segments (such as one segment of the particular routable component) in response to selection the portion of the multiple segments.

In accordance with at least an eighth further implementation, the routing diagram is a first routing diagram of a set of multiple routing diagrams, and the first routing set includes multiple portions of the first routing set. Moreover, the method includes receiving one or more other routing diagrams of the set of multiple routing diagrams, and displaying the one or more other routing diagrams of the set of multiple routing diagrams along with the first routing diagram. Furthermore, displaying the one or more other routing diagrams includes displaying at least one other portion of the first routing set highlighted on the other routing diagram that includes at least one other portion of the first routing set.

In accordance with at least a ninth further implementation, the routing diagram is a first routing diagram, and a set of multiple routing diagrams includes the first routing diagram and a second routing diagram. Moreover, the method includes receiving the second routing diagram and at least a second portion of the first routing set, and displaying, on the display, the second routing diagram. Furthermore, the first portion of the first routing set is disposed on the first routing diagram and the second portion of the first routing set is disposed on the second routing diagram.

In accordance with at least the ninth further implementation, the method further includes applying a zoom level to the first routing diagram, maintaining the zoom level for applying to the second routing diagram, and applying the zoom level to the second routing diagram in response to determining the second routing diagram was selected for displaying on the display.

In accordance with at least the ninth further implementation, displaying the routing diagram includes displaying, within a window on the display, the first routing diagram at a first zoom level. Moreover, the method further includes displaying, on the display along with the window, a first user-selectable control. Furthermore, the method includes displaying, within the window in response to use of the first user-selectable control, the first routing diagram at a second zoom level. Furthermore still, the method includes displaying, on the display, a second user-selectable control configured to select the second routing diagram when the second routing diagram is not displayed on the display, and displaying, within the window in response to use of the second user-selectable control, the second routing diagram at the second zoom level.

In accordance with at least some of the aforementioned implementations, displaying the first routing diagram at the first zoom level includes displaying any routable component of the first routing set contained in the first routing diagram at the first zoom level and visible in the window as highlighted. Furthermore, displaying the first routing diagram at the second zoom level includes displaying any routable component of the first routing set contained in the first routing diagram at the second zoom level and visible in the window as highlighted. Furthermore still, displaying the second routing diagram at the second zoom level includes displaying any routable component of the first routing set contained in the second routing diagram at the second zoom level and visible in the window as highlighted.

In accordance with at least some of the aforementioned implementations, a top-most, left-most portion of the first routing diagram when configured for displaying at the first zoom level has a first x-coordinate and a first y-coordinate. Moreover, a top-most, left-most portion of the first routing diagram, when displayed at the second zoom level during use of the second user-selectable control, has a second x-coordinate and a second y-coordinate. Furthermore, a top-most, left-most portion of the second routing diagram when configured for displaying at the second zoom level has the first x-coordinate and the first y-coordinate. Furthermore still, a top-most, left-most portion of the second routing diagram, when initially displayed at the second zoom level in response to use of the second user-selectable control, has the second x-coordinate and the second y-coordinate.

In accordance with at least some of the aforementioned implementations, the first x-coordinate is identical to the second x-coordinate and/or the first y-coordinate is identical to the second y-coordinate.

In accordance with at least a tenth further implementation, the request also includes a vehicle identifier of a particular vehicle, and another connectable component included on the routing diagram is representative of a first vehicle component in the particular vehicle. For this implementation, the method also includes displaying, on the display, a menu in response to determining an occurrence of the other connectable component being selected from the routing diagram, wherein the menu includes a first user-selectable control. The method also includes displaying, on the display in response to determining an occurrence of the first user-selectable control being selected, information pertaining to the first vehicle component in the particular vehicle and an identifier associated with the first user-selectable control. In at least some of these implementations, the other connectable component is the first connectable component. The menu of these further implementations can be arranged like the menu 640 and/or include user-selectable controls of the menu 640.

In accordance with at least the tenth further implementation, determining the occurrence of the other connectable component being selected from the routing diagram includes determining an identifier of the other connectable component is selected. The identifier of the other connectable component is: (i) located outside of a perimeter of the other connectable component, or (ii) is located within an area defined by the perimeter of the other connectable component and is selectable using a first type of selection. Moreover, if the identifier of the other connectable component is located within the area defined by the perimeter of the other connectable component, then the other connectable component is selectable using a second type of selection in order to highlight or un-highlight each and every routable component associated with the other connectable component.

In accordance with at least the tenth further implementation, the method further includes transmitting, in response to determining the occurrence of the first user-selectable control being selected, a request over an external communication network, such as the communication network 16. The request over the external communication network includes the first connectable component identifier, the vehicle identifier of the particular vehicle, and the identifier associated with the first user-selectable control. Moreover, the method includes receiving, in response to transmitting the request over the external communication network, the information pertaining to the first vehicle component in the particular vehicle and the first user-selectable control.

In accordance with at least the tenth further implementation, the identifier associated with the first user-selectable control identifies a top repairs category, a causes and fixes category, a specifications category, a component connector category, a component location category, a tips category, a mini routing diagram category, a remove and replace category, or a parts and labor category. Other examples of an information category are also possible.

VI. Example Vehicle

In accordance with the example implementations, a routable component can be a routable component within a vehicle. Examples of a routable component within a vehicle include a wire within a wire harness, a hydraulic line for a transmission, a fiber optic cable for a communication system, and a pneumatic line for an air brake system.

Similarly, in accordance with the example implementations, a connectable component can be a component within a vehicle (i.e., a vehicle component). A vehicle component can include a computing system, such as an electronic control unit (ECU) manufactured by and/or for an OEM of a vehicle. A vehicle component can include a sensor manufactured by or for an original equipment manufacturer (OEM) of a vehicle. Other examples of a vehicle component are possible.

A vehicle is a mobile machine that can be used to transport a person, people, and/or cargo. A vehicle can, but need not necessarily, be driven and/or otherwise guided along a path (e.g., a paved road or otherwise) on land, in water, in the air, and/or outer space. A vehicle can, but need not necessarily, be wheeled, tracked, railed, and/or skied. A vehicle can, but need not necessarily, include an automobile, a motorcycle, an all-terrain vehicle (ATV) defined by ANSI/SVIA-1-2007, a snowmobile, a personal watercraft (e.g., a JET SKI® personal watercraft), a light-duty truck, a medium-duty truck, a heavy-duty truck, a semi-tractor, a drone, and/or a farm machine. A vehicle can, but need not necessarily, include and/or use any appropriate voltage and/or current source, such as a battery, an alternator, a fuel cell, and the like, providing any appropriate current and/or voltage, such as about 12 volts, about 42 volts, and the like. A vehicle can, but need not necessarily, include and/or use any system and/or engine to provide its mobility. Those systems and/or engines can include vehicle components that use fossil fuels, such as gasoline, natural gas, propane, and the like, electricity, such as that generated by a battery, magneto, fuel cell, solar cell and the like, wind and hybrids and/or combinations thereof. A vehicle can, but need not necessarily, include an ECU, a data link connector (DLC), and a vehicle communication bus that connects the DLC to the ECU. A vehicle can be configured to operate as an autonomous vehicle.

Some vehicles can be identified by characteristics of the vehicle such as characteristics indicative of when the vehicle was built (e.g., a vehicle year), who built the vehicle (e.g., a vehicle make), marketing names associated with vehicle (e.g., a vehicle model name, or more simply "model"), and features of the vehicle (e.g., an engine type). This description uses an abbreviation YMME and/or Y/M/M/E, where each letter in the order shown represents a model year, vehicle make, vehicle model name, and engine type, respectively. This description uses an abbreviation YMM and/or Y/M/M, where each letter in the order shown represents a model year, vehicle make, and vehicle model name, respectively. An example Y/M/M/E shown in the drawings is 2019/Toyota/Camry/4Cyl, in which "2019" represents the model year the vehicle was built, "Toyota" represents the name of the vehicle manufacturer Toyota Motor Corporation, Aichi Japan, "Camry" represents a vehicle model built by that manufacturer, and "4Cyl" represents a an engine type a four cylinder internal combustion engine) within the vehicle. A person skilled in the art will understand that other features in addition to or as an alternative to "engine type" can be used to identify a vehicle. These other features can be identified in various manners, such as a regular production option (RPO) code, such as the RPO codes defined by the General Motors Company LLC, Detroit Michigan. In some example implementations, the tag array(s) associated with a content file include one or more characteristic identifiers of a vehicle.

Some vehicles, such as automobiles, are associated with a unique vehicle identification number (VIN). Some VIN include seventeen alpha-numeric characters. Some of the characters for at least some VIN represent a YMME or a YMM. In some instances, a vehicle includes a one dimensional bar code indicative of a VIN associated with that vehicle. In some example implementations, the tag array(s) associated with a content file include one or more VIN characters and data representative of positions of the VIN characters in a VIN.

A vehicle communication bus within a vehicle can include one or more conductors (e.g., copper wire conductors) and/or can be wireless. As an example, a vehicle communication bus can include one or two conductors for carrying vehicle data messages in accordance with a vehicle data message (VDM) protocol. A VDM protocol can include a Society of Automotive Engineers (SAE) J1850 (PWM or VPW) VDM protocol, an International Organization of Standardization (ISO) 15764-4 controller area network (CAN) VDM protocol, an ISO 9141-2 K-Line VDM protocol, an ISO 14230-4 KWP2000 K-Line VDM protocol, or some other protocol presently defined for performing communications within a vehicle.

The DLC can include an on-board diagnostic (OBD) connector, such as an OBD II connector. An OBD II connector can include slots for retaining up to sixteen connector terminals, but can include a different number of slots or no slots at all. As an example, a DLC connector can include an OBD II connector that meets the SAE J1962 specification such as a connector 16M, part number 12110252, available from Aptiv LLC of Dublin, Ireland. The DLC can include conductor terminals that connect to a conductor in a vehicle. For instance, the DLC can include connector terminals that connect to conductors that respectively connect to positive and negative terminals of a vehicle battery. The DLC can include one or more conductor terminals that connect to a conductor of the vehicle communication bus such that the DLC is operatively connected to the ECU. The data carried in a VDM can, but need not necessarily, include a parameter identifier (PID) and data (PID data) parameters associated with the PID. The data carried in the VDM can, but need not necessarily, include a diagnostic trouble code (DTC).

An ECU can control various aspects of vehicle operation and/or components within a vehicle. For example, the ECU can include a powertrain (PT) system ECU, an engine control module (ECM) ECU, a supplemental inflatable restraint (SIR) system (i.e., an air bag system) ECU, an entertainment system ECU, or some other ECU. The ECU can receive inputs (e.g., a sensor input), control output devices (e.g., a solenoid), generate a vehicle data message (VDM) (such as a VDM based on a received input or a controlled output), and set a DTC to a particular state (such as active or history).

VII. Conclusion

It should be understood that the arrangements described herein and/or shown in the drawings are for purposes of example only and are not intended to be limiting. As such, those skilled in the art will appreciate that other arrangements and elements (e.g., machines, interfaces, functions, orders, and/or groupings of functions) can be used instead, and some elements can be omitted altogether. Furthermore, various functions described and/or shown in the drawings as being performed by one or more elements can be carried out by a processor executing computer-readable program instructions or by a combination of hardware, firmware, and/or software. For purposes of this description, execution of CRPI contained in some computer-readable medium to perform some function can include executing all of the program instructions of those CRPI or only a portion of those CRPI.

While various aspects and implementations are described herein, other aspects and implementations will be apparent to those skilled in the art. The various aspects and implementations disclosed herein are for purposes of illustration and are not intended to be limiting, with the true scope being indicated by the claims, along with the full scope of equivalents to which such claims are entitled. It is also to be understood that the terminology used herein for the purpose of describing particular implementations only, and is not intended to be limiting.

In this description, the articles "a," "an," and "the" are used to introduce elements and/or functions of the example implementations. The intent of using those articles is that there is one or more of the introduced elements and/or functions.

In this description, the intent of using the term "and/or" within a list of at least two elements or functions and the intent of using the terms "at least one of," "at least one of the following," "one or more of," and "one or more of the following" immediately preceding a list of at least two components or functions is to cover each implementation including a listed component or function independently and each implementation including a combination of the listed components or functions. For example, an implementation described as including A, B, and/or C, or at least one of A, B, and C, or at least one of: A, B, and C, or at least one of A, B, or C, or at least one of: A, B, or C, or one or more of A, B, and C, or one or more of: A, B, and C, or one or more of A, B, or C, or one or more of: A, B, or C is intended to cover each of the following possible implementations: (i) an implementation including A, but not B and not C, (ii) an implementation including B, but not A and not C, (iii) an implementation including C, but not A and not B, (iv) an implementation including A and B, but not C, (v) an implementation including A and C, but not B, (v) an implementation including B and C, but not A, and/or (vi) an implementation including A, B, and C. For the implementations including component or function A, the implementations can include one A or multiple A. For the implementations including component or function B, the implementations can include one B or multiple B. For the implementations including component or function C, the implementations can include one C or multiple C. The use of ordinal numbers such as "first," "second," "third" and so on is to distinguish respective elements rather than to denote a particular order of those elements unless the context of using those terms explicitly indicates otherwise. The use of the symbol "$" as prefix to a number indicates the number is a hexadecimal number.

Implementations of the present disclosure may thus relate to one of the enumerated example embodiments (EEEs) listed below.

EEE 1 is a method comprising: transmitting a request for a computer-readable routing diagram; receiving, in response to the request, a routing diagram including a first connectable component and at least a first portion of a first routing set, wherein the first connectable component is associated with both a first connectable component identifier and the first routing set, and wherein the first routing set contains one or more routable components; displaying, on a display, the routing diagram; and displaying, on the display, at least the first portion of the first routing set highlighted, wherein displaying at least the first portion of the first routing set highlighted occurs in response to determining a first occurrence of the first connectable component being selected from the routing diagram displayed on the display or in response to the request including the first connectable component identifier.

EEE 2 is the method of EEE 1, wherein the routing diagram includes an electrical wiring diagram, the first connectable component includes a first electrical component, and the one or more routable components include one or more electrical circuits, wherein the routing diagram includes an optical cable diagram, the first connectable component includes a first optical component, and the one or more routable components include one or more optical cables, wherein the routing diagram includes a hydraulic line diagram, the first connectable component includes a first hydraulic component, and the one or more routable components include one or more hydraulic lines, or wherein the routing diagram includes a pneumatic line diagram the first connectable component includes a first pneumatic component, and the one or more routable components include one or more pneumatic line.

EEE 3 is the method of any one of EEE 1 to 2, wherein the first connectable component is associated with one or more coordinates indicative of where the first connectable component is disposed on the routing diagram, and wherein each routable component of the first routing set is associated with one or more node coordinates indicative of where a node of each routable component of the first routing set is disposed on the routing diagram. The method further comprises: determining, based on at least a portion of the one or more coordinates indicative of where the first connectable component is disposed on the routing diagram and at least a portion of the one or more node coordinates indicative of where a node of each routable component of the first routing set is disposed on the routing diagram, each routable component contained within the first routing set.

EEE 4 is the method of EEE 3, wherein determining each routable component contained within the first routing set includes determining that a node coordinate associated with one or more routable components of the first routing set is within a threshold number of pixels of the first connectable component on the routing diagram.

EEE 5 is the method of EEE 3, wherein determining each routable component contained within the first routing set further includes determining that a node coordinate associated with one or more routable components of the first routing set is common with a coordinate of the first connectable component or is within an area bounded by a perimeter based on the one or more coordinates of the first connectable component.

EEE 6 is the method of any one of EEE 3 to 5, wherein the one or more coordinates indicative of where the first connectable component is disposed on the routing diagram define a perimeter of the first connectable component, wherein determining each routable component contained within the first routing set includes performing a proximity search outward from the perimeter of the first connectable component, and wherein performing the proximity search includes determining each and every routable component having a node component within a threshold number of pixels from the perimeter of the first connectable component.

EEE 7 is the method of EEE 6, wherein performing the proximity search includes performing a first proximity search outward from the perimeter of the first connectable component and one or more subsequent proximity searches outward from the perimeter of the first connectable component after the first proximity search, wherein the threshold number of pixels from the perimeter of the first connectable component includes a first threshold number of pixels for the first proximity search and a respective threshold number of pixels for each of the one or more subsequent proximity searches, and wherein a threshold number of pixels for each of the one or more subsequent proximity searches is greater than the first threshold number of pixels and is greater than a threshold number of pixels used for any intervening proximity search of the one or more subsequent proximity searches.

EEE 8 is the method of EEE 3, wherein a first routable component of the first routing set includes multiple, non-contiguous routable component segments, wherein the multiple, non-contiguous routable component segments include a first routable component segment and a second routable component segment, wherein the first routable component segment includes a first routable component segment end associated with a first node coordinate, and a second routable component segment end associated with a second node coordinate, wherein the second routable component segment includes a third routable component segment end associated with a third node coordinate, and a fourth routable component segment end associated with a fourth node coordinate, wherein determining the first routable component is contained within the first routing set includes determining that the first node coordinate is within a threshold distance of the first connectable component on the routing diagram; and wherein displaying the first routing set highlighted includes: determining the second routable component segment is part of the first routable component, and displaying both the first routable component segment and the second routable component segment as highlighted.

EEE 9 is the method of EEE 8, wherein determining the second routable component segment is part of the first routable component includes determining that the second node coordinate is within a threshold distance of either the third node coordinate or the fourth node coordinate.

EEE 10 is the method of EEE 8, wherein the routing diagram includes a first routing diagram and a second routing diagram, wherein the first connectable component and the first routable component segment are disposed on the first routing diagram, wherein the first routable component segment includes a first change-diagram node or extends to, on the first routing diagram, a routable component segment having the first change-diagram node, wherein the second routable component segment is disposed on the second routing diagram, wherein the second routable component segment includes a second change-diagram node or extends to, on the second routing diagram, a routable component segment having the second change-diagram node, wherein determining the second routable component segment is part of the first routable component includes determining the first change-diagram node corresponds to the second change-diagram node.

EEE 11 is the method of any one of EEE 1 to 10, wherein displaying the first routing set highlighted includes displaying a first routable component of the first routing set defined by a first stroke width, a first color, and a path and displaying highlighting defined by a second stroke width, a second color, an opacity value, and the path.

EEE 12 is the method of any one of EEE 1 to 11, further comprising: determining a set of routable component identifiers associated with the first connectable component; and determining each routable component segment, of a routable component on the routing diagram, that is associated with a routable component identifier of the set of routable component identifiers, wherein displaying the first routing set highlighted includes displaying each routable component segment that is associated with the routable component identifier of the set of routable component identifiers.

EEE 13 is the method of EEE 12, wherein displaying the first routing set highlighted includes displaying any node on the routing diagram that represents an interconnection of two or more routable component segments associated with the routable component identifier of the set of routable component identifiers.

EEE 14 is the method of any one of EEE 1 to 13, wherein receiving the routing diagram includes receiving a first graphics file.

EEE 15 is the method of any one of EEE 1 to 14, wherein the routing diagram further includes a second connectable component and a second routing set, wherein the second connectable component is associated with the second routing set, and wherein the second routing set contains one or more routable components. The method further comprising: determining a selection of the second connectable component occurs while the display is displaying the routing diagram; and displaying, on the display in response to determining the selection of the second connectable component, the routing diagram with the second routing set highlighted.

EEE 16 is the method of EEE 15, wherein displaying the first routing set highlighted includes displaying each of the one or more routable components of the first routing set using a first highlighting color, wherein displaying the second routing set highlighted includes displaying each of the one or more routable components of the second routing set using a second highlighting color, and wherein the first highlighting color is different than the second highlighting color.

EEE 17 is the method of any one EEE 1 to 16, further comprising: receiving, on the display, a selection of a particular routable component of the routing diagram; and displaying, on the display in response to receiving the selection of the particular routable component, the routing diagram with the particular routable component highlighted if the particular routable component is not highlighted when the selection of the particular routable component is received, or with the particular routable component not highlighted if the particular routable component is highlighted when the selection of the particular routable component is received.

EEE 18 is the method of EEE 17, wherein the particular routable component includes multiple routable component segments, wherein the routing diagram includes one or more nodes that represent an interconnection of two or more routable component segments of the particular routable component, and wherein displaying the routing diagram with the particular routable component highlighted includes displaying the multiple routable component segments as highlighted and displaying the one or more nodes that represent the interconnection of two or more routable component segments of the particular routable component as highlighted.

EEE 19 is the method of any one of EEE 1 to 18, wherein the routing diagram is a first routing diagram of a set of multiple routing diagrams, and wherein the first routing set includes multiple portions of the first routing set. The method further comprises: receiving one or more other routing diagrams of the set of multiple routing diagrams; and displaying the one or more other routing diagrams of the set of multiple routing diagrams along with the first routing diagram. Displaying the one or more other routing diagrams includes displaying at least one other portion of the first routing set highlighted on the other routing diagram that includes at least one other portion of the first routing set.

EEE 20 is the method of any one of EEE 1 to 19, wherein the routing diagram is a first routing diagram, and wherein a set of multiple routing diagrams includes the first routing diagram and a second routing diagram. The method further comprises receiving the second routing diagram and at least a second portion of the first routing set; and displaying, on the display, the second routing diagram. The first portion of the first routing set is disposed on the first routing diagram and the second portion of the first routing set is disposed on the second routing diagram.

EEE 21 is the method of EEE 20, further comprising: applying a zoom level to the first routing diagram; maintaining the zoom level for applying to the second routing diagram; and applying the zoom level to the second routing diagram in response to determining the second routing diagram was selected for displaying on the display.

EEE 22 is the method of EEE 20, wherein displaying the routing diagram includes displaying, within a window on the display, the first routing diagram at a first zoom level. The method further comprises: displaying, on the display along with the window, a first user-selectable control; displaying, within the window in response to use of the first user-selectable control, the first routing diagram at a second zoom level; displaying, on the display, a second user-selectable control configured to select the second routing diagram when the second routing diagram is not displayed on the display; and displaying, within the window in response to use of the second user-selectable control, the second routing diagram at the second zoom level.

EEE 23 is the method of EEE 22, wherein displaying the first routing diagram at the first zoom level includes displaying any routable component of the first routing set contained in the first routing diagram at the first zoom level and visible in the window as highlighted, wherein displaying the first routing diagram at the second zoom level includes displaying any routable component of the first routing set contained in the first routing diagram at the second zoom level and visible in the window as highlighted, and wherein displaying the second routing diagram at the second zoom level includes displaying any routable component of the first routing set contained in the second routing diagram at the second zoom level and visible in the window as highlighted.

EEE 24 is the method of EEE 23, wherein a top-most, left-most portion of the first routing diagram when configured for displaying at the first zoom level has a first x-coordinate and a first y-coordinate, wherein a top-most, left-most portion of the first routing diagram, when displayed at the second zoom level during use of the second user-selectable control, has a second x-coordinate and a second y-coordinate, wherein a top-most, left-most portion of the second routing diagram when configured for displaying at the second zoom level has the first x-coordinate and the first y-coordinate, and wherein a top-most, left-most portion of the second routing diagram, when initially displayed at the second zoom level in response to use of the second user-selectable control, has the second x-coordinate and the second y-coordinate.

EEE 25 is the method of EEE 24, wherein the first x-coordinate is identical to the second x-coordinate and/or the first y-coordinate is identical to the second y-coordinate.

EEE 26 is the method of any one of EEE 1 to 25, wherein the routing diagram is a first routing diagram of a set of multiple routing diagrams, the method further comprising: displaying, on the display with the routing diagram, a multi-diagram view selector; determining the multi-diagram view selector is selected while the first routing diagram is displayed on the display while no other routing diagram of the set of multiple routing diagrams is displayed; and displaying, on the display in response to determining the multi-diagram view selector is selected, multiple routing diagrams of the set of multiple routing diagrams.

EEE 27 is the method of EEE 26, further comprising: displaying, on the display with the multiple routing diagrams, a single-diagram view selector; determining the single-diagram view selector is selected while the multiple routing diagrams are displayed on the display; and displaying, on the display in response to determining the multi-diagram view selector is selected, a single routing diagram of the set of multiple routing diagrams.

EEE 28 is the method of EEE 27, wherein the single routing diagram is a routing diagram in focus while the multiple routing diagrams are displayed on the display, and optionally wherein a focus framework identifies the single routing diagram is in focus when displayed as part of the multiple routing diagrams.

EEE 29 is the method of any one of EEE 1 to 28, wherein the request also includes a vehicle identifier of a particular vehicle, and wherein another connectable component included on the routing diagram is representative of a first vehicle component in the particular vehicle. The method further comprises: displaying, on the display, a menu in response to determining an occurrence of the other connectable component being selected from the routing diagram, wherein the menu includes a first user-selectable control; and displaying, on the display in response to determining an occurrence of the first user-selectable control being selected, information pertaining to the first vehicle component in the particular vehicle and an identifier associated with the first user-selectable control. Optionally, the other connectable component is the first connectable component.

EEE 30 is the method of EEE 29, wherein determining the occurrence of the other connectable component being selected from the routing diagram includes determining an identifier of the other connectable component is selected, wherein the identifier of the other connectable component is: (i) located outside of a perimeter of the other connectable component, or (ii) is located within an area defined by the perimeter of the other connectable component and is selectable using a first type of selection, and wherein if the identifier of the other connectable component is located within the area defined by the perimeter of the other connectable component, then the other connectable component is selectable using a second type of selection in order to highlight or un-highlight each and every routable component associated with the other connectable component.

EEE 31 is the method of any one of EEE 29 to 30, further comprising: transmitting, in response to determining the occurrence of the first user-selectable control being selected, a request over an external communication network, wherein the request over the external communication network includes the first connectable component identifier, the vehicle identifier of the particular vehicle, and the identifier associated with the first user-selectable control; and receiving, in response to transmitting the request over the external communication network, the information pertaining to the first vehicle component in the particular vehicle and the first user-selectable control.

EEE 32 is the method of any one of EEE 29 to 31, wherein the identifier associated with the first user-selectable control identifies a technical bulletin category, a real fix tip category, a top repairs category, a causes and fixes category, a specifications category, an original equipment manufacturer testing data category, a component connector category, a component location category, a component operation category, a tips category, a routable diagram category, a mini routing diagram category, a waveform information category, a parameter identifier (PID) data category, an after-repair information category, a community category, an image category, an exploded image category, a remove and replace category, or a parts and labor category.

EEE 33 is a computing system comprising: a processor; and a non-transitory computer readable medium configured to store at least executable instructions, wherein the executable instructions, when executed by the processor, cause the computing system to perform functions comprising: transmitting a request for a computer-readable routing diagram; receiving, in response to the request, a routing diagram including a first connectable component and at least a first portion of a first routing set, wherein the first connectable component is associated with both a first connectable component identifier and the first routing set, and wherein the first routing set contains one or more routable components; displaying, on a display, the routing diagram; and displaying, on the display, at least the first portion of the first routing set highlighted, wherein displaying at least the first portion of the first routing set highlighted occurs in response to determining a first occurrence of the first connectable component being selected from the routing diagram displayed on the display or in response to the request including the first connectable component identifier.

EEE 34 is a computing system comprising: a processor; and a non-transitory computer readable medium configured to store at least executable instructions, wherein the executable instructions, when executed by the processor, cause the computing system to perform the method of any one of EEE 1 to 32.

EEE 35 is a non-transitory computer readable medium having stored therein instructions executable by one or more processors to cause a computing system to perform functions comprising: transmitting a request for a computer-readable routing diagram; receiving, in response to the request, a routing diagram including a first connectable component and at least a first portion of a first routing set, wherein the first connectable component is associated with both a first connectable component identifier and the first routing set, and wherein the first routing set contains one or more routable components; displaying, on a display, the routing diagram; and displaying, on the display, at least the first portion of the first routing set highlighted, wherein displaying at least the first portion of the first routing set highlighted occurs in response to determining a first occurrence of the first connectable component being selected from the routing diagram displayed on the display or in response to the request including the first connectable component identifier.

EEE 36 is a non-transitory computer readable medium having stored therein instructions executable by one or more processors to cause a computing system to perform the method of any one of EEE 1 to 32.

What is claimed is:

1. A method comprising:
receiving, via a first graphical user interface output on a display, entry of a component identifier associated with a first connectable component, and a display card selection corresponding to routing diagrams;
displaying, on the display in response to receiving entry of the component identifier and the display card selection, a second graphical user interface, wherein the second graphical user interface includes a list of routing diagrams corresponding to the component identifier;
receiving, via the second graphical user interface, a selection of a routing diagram from the list of routing diagrams;
transmitting, in response to the selection of the routing diagram, a request for the selected routing diagram, wherein the request includes the component identifier;
receiving the selected routing diagram in response to the request, wherein the selected routing diagram shows the first connectable component and a first portion of a first routing set, wherein the first portion of the first routing set includes multiple routable components; and
displaying, on the display after receiving the selected routing diagram and in response to the request including the component identifier, a third graphical user interface that shows the selected routing diagram with the multiple routable components of the first portion of the first routing set highlighted.

2. The method of claim 1,
wherein the selected routing diagram includes an electrical wiring diagram, the first connectable component includes a first electrical component, and the multiple routable components include multiple electrical circuits,
wherein the selected routing diagram includes an optical cable diagram, the first connectable component includes a first optical component, and the multiple routable components include multiple optical cables,
wherein the selected routing diagram includes a hydraulic line diagram, the first connectable component includes a first hydraulic component, and the multiple routable components include multiple hydraulic lines, or
wherein the selected routing diagram includes a pneumatic line diagram the first connectable component includes a first pneumatic component, and the multiple routable components include multiple pneumatic line.

3. The method of claim 1,
wherein the first connectable component is associated with one or more coordinates indicative of where the first connectable component is disposed on the selected routing diagram, and
wherein each routable component of the first routing set is associated with one or more node coordinates indicative of where a node of each routable component of the first routing set is disposed on the routing diagram,
the method further comprising:
determining, based on at least a portion of the one or more coordinates indicative of where the first connectable component is disposed on the selected routing diagram and at least a portion of the one or more node coordinates indicative of where a node of each routable component of the first routing set is disposed on the selected routing diagram, the multiple routable components of the first portion of the first routing set.

4. The method of claim 3, wherein determining the multiple routable components of the first portion of the first routing set includes determining that node coordinates associated with the multiple routable components of the first portion of the first routing set are within a threshold number of pixels of the first connectable component on the selected routing diagram.

5. The method of claim 3, wherein determining the multiple routable components of the first portion of the first routing set further includes determining that node coordinates associated with the multiple routable components of the first portion of the first routing set are common with a coordinate of the first connectable component or is within an area bounded by a perimeter based on the one or more coordinates of the first connectable component.

6. The method of claims 3,
wherein the one or more coordinates indicative of where the first connectable component is disposed on the selected routing diagram define a perimeter of the first connectable component,
wherein determining the multiple routable components of the first portion of the first routing set includes performing a proximity search outward from the perimeter of the first connectable component, and
wherein performing the proximity search includes determining each and every routable component having a node component within a threshold number of pixels from the perimeter of the first connectable component.

7. The method of claim 6,
wherein performing the proximity search includes performing a first proximity search outward from the perimeter of the first connectable component and one or more subsequent proximity searches outward from the perimeter of the first connectable component after the first proximity search,
wherein the threshold number of pixels from the perimeter of the first connectable component includes a first threshold number of pixels for the first proximity search and a respective threshold number of pixels for each of the one or more subsequent proximity searches, and
wherein a threshold number of pixels for each of the one or more subsequent proximity searches is greater than the first threshold number of pixels and is greater than a threshold number of pixels used for any intervening proximity search of the one or more subsequent proximity searches.

8. The method of claim 3,
wherein a first routable component of the first portion of the first routing set includes multiple, non-contiguous routable component segments,
wherein the multiple, non-contiguous routable component segments include a first routable component segment and a second routable component segment,
wherein the first routable component segment includes a first routable component segment end associated with a first node coordinate, and a second routable component segment end associated with a second node coordinate,
wherein the second routable component segment includes a third routable component segment end associated with a third node coordinate, and a fourth routable component segment end associated with a fourth node coordinate,
wherein determining the multiple routable components of the first portion of the first routing set includes determining the first routable component is contained within the first portion of the first routing set,
wherein determining the first routable component is contained within the first portion of the first routing set includes determining that the first node coordinate is within a threshold distance of the first connectable component on the routing diagram; and
wherein displaying the third graphical user interface that shows the selected routing diagram with the multiple routable components of the first portion of the first routing set highlighted includes:
determining the second routable component segment is part of the first routable component, and
displaying both the first routable component segment and the second routable component segment as highlighted.

9. The method of claim 8, wherein determining the second routable component segment is part of the first routable component includes determining that the second node coordinate is within a threshold distance of either the third node coordinate or the fourth node coordinate.

10. The method of claim 8,
wherein the selected routing diagram includes a first routing diagram and a second routing diagram,
wherein the first connectable component and the first routable component segment are disposed on the first routing diagram,
wherein the first routable component segment includes a first change-diagram node or extends to, on the first routing diagram, a routable component segment having the first change-diagram node,
wherein the second routable component segment is disposed on the second routing diagram,
wherein the second routable component segment includes a second change-diagram node or extends to, on the second routing diagram, a routable component segment having the second change-diagram node,
wherein determining the second routable component segment is part of the first routable component includes determining the first change-diagram node corresponds to the second change-diagram node.

11. The method of claim 1, wherein displaying the third graphical user interface that shows the selected routing diagram with the multiple routable components of the first portion of the first routing set highlighted includes displaying a first routable component of the first portion of the first routing set defined by a first stroke width, a first color, and a path and displaying highlighting defined by a second stroke width, a second color, an opacity value, and the path.

12. The method of claim 1, further comprising:
determining a set of routable component identifiers associated with the first connectable component; and
determining each routable component segment of a routable component on the selected routing diagram that is associated with a routable component identifier of the set of routable component identifiers,
wherein displaying the third graphical user interface that shows the selected routing diagram with the multiple routable components of the first portion of the first routing set highlighted includes displaying each routable component segment that is associated with the routable component identifier of the set of routable component identifiers.

13. The method of claim 12, wherein displaying the third graphical user interface that shows the selected routing diagram with the multiple routable components of the first portion of the first routing set highlighted includes displaying any node on the selected routing diagram that represents an interconnection of two or more routable component segments associated with the routable component identifier of the set of routable component identifiers.

14. The method of claim 1, wherein receiving the selected routing diagram includes receiving a first graphics file.

15. The method of claim 1,
wherein the selected routing diagram further includes a second connectable component and a second routing set,
wherein the second connectable component is associated with the second routing set, and wherein the second routing set contains one or more routable components, the method further comprising:

determining a selection of the second connectable component occurs while the display is displaying the selected routing diagram; and displaying, on the display in response to determining the selection of the second connectable component, the selected routing diagram with the second routing set highlighted.

16. The method of claim 15, wherein displaying the third graphical user interface that shows the selected routing diagram with the multiple routable components of the first portion of the first routing set highlighted includes displaying the multiple routable components of the first portion of the first routing set using a first highlighting color, wherein displaying the second routing set highlighted includes displaying each of the one or more routable components of the second routing set using a second highlighting color, and wherein the first highlighting color is different than the second highlighting color.

17. The method of claim 1, further comprising:

receiving, on the display, a selection of a particular routable component of the selected routing diagram; and displaying, on the display in response to receiving the selection of the particular routable component, the selected routing diagram with the particular routable component highlighted if the particular routable component is not highlighted when the selection of the particular routable component is received, or with the particular routable component not highlighted if the particular routable component is highlighted when the selection of the particular routable component is received.

18. The method of claim 17, wherein the particular routable component includes multiple routable component segments, wherein the selected routing diagram includes one or more nodes that represent an interconnection of two or more routable component segments of the particular routable component, and wherein displaying the selected routing diagram with the particular routable component highlighted includes displaying the multiple routable component segments as highlighted and displaying the one or more nodes that represent the interconnection of two or more routable component segments of the particular routable component as highlighted.

19. The method of claim 1, wherein the selected routing diagram is a first routing diagram of a set of multiple routing diagrams, and wherein the first routing set includes multiple portions of the first routing set, the method further comprising:

receiving one or more other routing diagrams of the set of multiple routing diagrams; and displaying the one or more other routing diagrams of the set of multiple routing diagrams along with the first routing diagram, wherein displaying the one or more other routing diagrams includes displaying at least one other portion of the first routing set highlighted on the other routing diagram that includes at least one other portion of the first routing set.

20. The method of claim 1, wherein the selected routing diagram is a first routing diagram, wherein a set of multiple routing diagrams includes the first routing diagram and a second routing diagram, the method further comprising:

receiving the second routing diagram and at least a second portion of the first routing set; and displaying, on the display, the second routing diagram, wherein the first portion of the first routing set is disposed on the first routing diagram and the second portion of the first routing set is disposed on the second routing diagram.

21. The method of claim 20, further comprising:

applying a zoom level to the first routing diagram;

maintaining the zoom level for applying to the second routing diagram; and applying the zoom level to the second routing diagram in response to determining the second routing diagram was selected for displaying on the display.

22. The method of claim 20, wherein displaying the selected routing diagram includes displaying, within a window on the display, the first routing diagram at a first zoom level, the method further comprising:

displaying, on the display along with the window, a first user-selectable control;

displaying, within the window in response to use of the first user-selectable control, the first routing diagram at a second zoom level;

displaying, on the display, a second user-selectable control configured to select the second routing diagram when the second routing diagram is not displayed on the display; and displaying, within the window in response to use of the second user-selectable control, the second routing diagram at the second zoom level.

23. The method of claim 22, wherein displaying the first routing diagram at the first zoom level includes displaying any routable component of the first routing set contained in the first routing diagram at the first zoom level and visible in the window as highlighted, wherein displaying the first routing diagram at the second zoom level includes displaying any routable component of the first routing set contained in the first routing diagram at the second zoom level and visible in the window as highlighted, and wherein displaying the second routing diagram at the second zoom level includes displaying any routable component of the first routing set contained in the second routing diagram at the second zoom level and visible in the window as highlighted.

24. The method of claim 23, wherein a top-most, left-most portion of the first routing diagram when configured for displaying at the first zoom level has a first x-coordinate and a first y-coordinate, wherein a top-most, left-most portion of the first routing diagram, when displayed at the second zoom level during use of the second user-selectable control, has a second x-coordinate and a second y-coordinate, wherein a top-most, left-most portion of the second routing diagram when configured for displaying at the second zoom level has the first x-coordinate and the first y-coordinate, and wherein a top-most, left-most portion of the second routing diagram, when initially displayed at the second zoom level in response to use of the second user-selectable control, has the second x-coordinate and the second y-coordinate.

25. The method of claim 24, wherein the first x-coordinate is identical to the second x-coordinate and/or the first y-coordinate is identical to the second y-coordinate.

26. The method of claim 1,
wherein the selected routing diagram is a first routing diagram of a set of multiple routing diagrams,
the method further comprising:
displaying, on the display with the first routing diagram, a multi-diagram view selector;
determining the multi-diagram view selector is selected while the first routing diagram is displayed on the display while no other routing diagram of the set of multiple routing diagrams is displayed; and
displaying, on the display in response to determining the multi-diagram view selector is selected, multiple routing diagrams of the set of multiple routing diagrams.

27. The method of claim 26, further comprising:
displaying, on the display with the multiple routing diagrams, a single-diagram view selector;
determining the single-diagram view selector is selected while the multiple routing diagrams are displayed on the display; and
displaying, on the display in response to determining the multi-diagram view selector is selected, a single routing diagram of the set of multiple routing diagrams.

28. The method of claim 27,
wherein the single routing diagram is a routing diagram in focus while the multiple routing diagrams are displayed on the display.

29. The method of claim 27, wherein a focus framework identifies the single routing diagram is in focus when displayed as part of the multiple routing diagrams.

30. The method of claim 1,
wherein the request also includes a vehicle identifier of a particular vehicle, and
wherein a second connectable component included on the selected routing diagram is representative of a first vehicle component in the particular vehicle,
the method further comprising:
displaying, on the display, a menu in response to determining an occurrence of the second connectable component being selected from the selected routing diagram, wherein the menu includes a first user-selectable control; and
displaying, on the display in response to determining an occurrence of the first user-selectable control being selected, information pertaining to the first vehicle component in the particular vehicle and an identifier associated with the first user-selectable control.

31. The method of claim 30,
wherein determining the occurrence of the second connectable component being selected from the selected routing diagram includes determining an identifier of the second connectable component is selected,
wherein the identifier of the second connectable component is: (i) located outside of a perimeter of the second connectable component, or (ii) is located within an area defined by the perimeter of the second connectable component and is selectable using a first type of selection, and
wherein if the identifier of the second connectable component is located within the area defined by the perimeter of the second connectable component, then the second connectable component is selectable using a second type of selection in order to highlight or un-highlight each and every routable component associated with the second connectable component.

32. The method of claim 30, further comprising:
transmitting, in response to determining the occurrence of the first user-selectable control being selected, a request over an external communication network, wherein the request over the external communication network includes the component identifier associated with the first connectable component, the vehicle identifier of the particular vehicle, and the identifier associated with the first user-selectable control; and
receiving, in response to transmitting the request over the external communication network, the information pertaining to the first vehicle component in the particular vehicle and the first user-selectable control.

33. The method of claim 30, wherein the identifier associated with the first user-selectable control identifies a technical bulletin category, a real fix tip category, a top repairs category, a causes and fixes category, a specifications category, an original equipment manufacturer testing data category, a component connector category, a component location category, a component operation category, a tips category, a routable diagram category, a mini routing diagram category, a waveform information category, a parameter identifier (PID) data category, an after-repair information category, a community category, an image category, an exploded image category, a remove and replace category, or a parts and labor category.

34. The method of claim 30, wherein the second connectable component is the first connectable component.

35. The method of claim 1, further comprising:
determining the first connectable component is selected from the selected routing diagram while the first portion of the first routing set is highlighted and responsively un-highlighting the first portion of the first routing set; and
determining the first connectable component is selected from the selected routing diagram while the first portion of the first routing set is un-highlighted and responsively highlighting the first portion of the first routing set.

36. The method of claim 1,
wherein the selected routing diagram further includes a second connectable component and one or more other routable components,
wherein the second connectable component is associated with the one or more other routable components, and
the method further comprises determining the second connectable component within the selected routing diagram is selected from the selected routing diagram while the one or more other routable components are un-highlighted and responsively highlighting the one or more other routable components within the selected routing diagram.

37. The method of claim 1,
wherein the selected routing diagram shows one or more other connectable components and a second portion of the first routing set,
wherein the second portion of the first routing set includes one or more routable components that lead to or from the one or more other connectable components, and
wherein displaying the third graphical user interface that shows the selected routing diagram with each routable component of the first portion of the first routing set highlighted includes displaying the second portion of the first routing set unhighlighted after receiving the selected routing diagram and in response to the request including the component identifier.

38. The method of claim 1, wherein the multiple routable components include every routable component that leads to or from the first connectable component.

39. A computing system comprising:
a processor;
a display; and
a non-transitory computer readable medium configured to store at least executable instructions, wherein the executable instructions, when executed by the processor, cause the computing system to perform functions comprising:
receiving, via a first graphical user interface output on the display, entry of a component identifier associated with a first connectable component, and a display card selection corresponding to routing diagrams;
displaying, on the display in response to receiving entry of the component identifier and the display card selection, a second graphical user interface, wherein the second graphical user interface includes a list of routing diagrams corresponding to the component identifier;
receiving, via the second graphical user interface, a selection of a routing diagram from the list of routing diagrams;
transmitting, in response to the selection of the routing diagram, a request for the selected routing diagram, wherein the request includes the component identifier;
receiving the selected routing diagram in response to the request, wherein the selected routing diagram shows the first connectable component and a first portion of a first routing set, wherein the first portion of the first routing set includes multiple routable components; and
displaying, on the display after receiving the selected routing diagram and in response to the request including the component identifier, a third graphical user interface that shows the selected routing diagram with the multiple routable components of the first portion of the first routing set highlighted.

40. The computing system of claim 39, wherein the multiple routable components include every routable component that leads to or from the first connectable component.

41. A non-transitory computer readable medium having stored therein instructions executable by one or more processors to cause a computing system to perform functions comprising:
receiving, via a first graphical user interface output on a display, entry of a component identifier associated with a first connectable component, and a display card selection corresponding to routing diagrams;
displaying, on the display in response to receiving entry of the component identifier and the display card selection, a second graphical user interface, wherein the second graphical user interface includes a list of routing diagrams corresponding to the component identifier;
receiving, via the second graphical user interface, a selection of a routing diagram from the list of routing diagrams;
transmitting, in response to the selection of the routing diagram, a request for the selected routing diagram, wherein the request includes the component identifier;
receiving the selected routing diagram in response to the request, wherein the selected routing diagram shows the first connectable component and a first portion of a first routing set, wherein the first portion of the first routing set includes multiple routable components; and
displaying, on the display after receiving the selected routing diagram and in response to the request including the component identifier, a third graphical user interface that shows the selected routing diagram with the multiple routable components of the first portion of the first routing set highlighted.

42. The non-transitory computer readable medium of claim 41, wherein the multiple routable components include every routable component that leads to or from the first connectable component.

* * * * *